US012621250B2

(12) United States Patent
Sukoff et al.

(10) Patent No.: US 12,621,250 B2
(45) Date of Patent: May 5, 2026

(54) SYSTEM, APPARATUS, AND METHOD FOR CONTROLLING INTERNET DEVICES VIA A MOBILE DEVICE SESSION

(71) Applicant: Sookbox LLC, Plano, TX (US)

(72) Inventors: David Sukoff, Summit, NJ (US); Cyrus Vafadari, Cambridge, MA (US); Adam Mustafa, Secaucus, NJ (US); Mathew Peterson, Boston, MA (US)

(73) Assignee: Sookbox LLC, Plano, TX (US)

( * ) Notice: Subject to any disclaimer, the term of this patent is extended or adjusted under 35 U.S.C. 154(b) by 0 days.

(21) Appl. No.: 18/490,526

(22) Filed: Oct. 19, 2023

(65) Prior Publication Data

US 2024/0129257 A1      Apr. 18, 2024

Related U.S. Application Data

(63) Continuation of application No. 17/240,622, filed on Apr. 26, 2021, now Pat. No. 11,831,561, which is a
(Continued)

(51) Int. Cl.
| | |
|---|---|
| *H04L 47/70* | (2022.01) |
| *H04L 9/40* | (2022.01) |
(Continued)

(52) U.S. Cl.
CPC .......... *H04L 47/70* (2013.01); *H04L 12/2818* (2013.01); *H04L 63/10* (2013.01);
(Continued)

(58) Field of Classification Search
None
See application file for complete search history.

(56) References Cited

U.S. PATENT DOCUMENTS

| | | | | |
|---|---|---|---|---|
| 9,110,929 B2 * | 8/2015 | Garcia | .................. | G06F 3/0481 |
| 2012/0174157 A1 * | 7/2012 | Stinson, III | .......... | H04N 21/482 |
| | | | | 725/40 |

* cited by examiner

*Primary Examiner* — Angela Nguyen
(74) *Attorney, Agent, or Firm* — Sterne, Kessler, Goldstein & Fox P.L.L.C.

(57)      ABSTRACT

Methods, a system, and apparatus for managing the separation and distribution of digital controls wherein the digital content in a network system includes receiving a request from any one of control devices, host server response to control device request (and output devices), host server may either non-discriminatively or discriminatively broadcast to any of the control devices, and control device handling responses throughout home network system. The methods, system, and computer readable medium include user experience optimized application types for (optimally) separating and distributing the associated control and associated status information elements during active sessions from the host server to the control devices and output devices within a network system. Configuring a control session comprises receiving a request to execute an input/output application from a control application executing on a mobile control device Configuring the control session also includes aggregating a plurality of real-world connectable processing nodes into an application session set of processing nodes by allocating at least one function required by the input/output application for execution on each processing node in the set of processing nodes, wherein the set of processing nodes is determined based on processing requirements of the input/output application.

29 Claims, 47 Drawing Sheets

Related U.S. Application Data continuation of application No. 16/656,147, filed on Oct. 17, 2019, now Pat. No. 11,025,556, which is a continuation of application No. 15/997,305, filed on Jun. 4, 2018, now abandoned, which is a continuation-in-part of application No. 15/357,982, filed on Nov. 21, 2016, now abandoned, which is a continuation of application No. 15/351,379, filed on Nov. 14, 2016, now abandoned, said application No. 15/997, 305 is a continuation of application No. 15/351,379, filed on Nov. 14, 2016, now abandoned, which is a continuation of application No. 14/149,541, filed on Jan. 7, 2014, now Pat. No. 9,497,137, said application No. 15/357,982 is a continuation-in-part of application No. 14/149,541, filed on Jan. 7, 2014, now Pat. No. 9,497,137, and a continuation of application No. 14/149,726, filed on Jan. 7, 2014, now Pat. No. 9,503,486, said application No. 14/149,541 is a continuation-in-part of application No. 14/147,397, filed on Jan. 3, 2014, now abandoned, and a continuation-in-part of application No. 13/734,511, filed on Jan. 4, 2013, now abandoned, said application No. 14/147, 397 is a continuation-in-part of application No. 13/734,511, filed on Jan. 4, 2013, now abandoned.

(60) Provisional application No. 61/857,369, filed on Jul. 23, 2013, provisional application No. 61/749,430, filed on Jan. 7, 2013, provisional application No. 61/749,436, filed on Jan. 7, 2013.

(51) Int. Cl.

| | | |
|---|---|---|
| *H04L 12/28* | (2006.01) | |
| *H04L 67/14* | (2022.01) | |
| *H04N 21/436* | (2011.01) | |
| *H04N 21/441* | (2011.01) | |

(52) U.S. Cl.
CPC ....... *H04L 67/14* (2013.01); *H04N 21/43615* (2013.01); *H04N 21/441* (2013.01)

Audio Device (Zone 1 - Mess Hall)

403

Audio Device (Zone 2-Orange Lounge)

404

290

(Step 3)
408

Handling
Response

Host Server

Control Device (1)

401

407

Control Device (2-n)

402

(Step 3)
408

Audio Device (Zone 1 - Mess Hall)

403

Audio Device (Zone 2-Orange Lounge)

404

290

Host Server (Step 4)
412

Handling
Request

Control Device (1)

401

406

(Step 4)

Session Settings

Session Locked

407

Control Device (2-n)

402

Audio Device (Zone 1 - Mess Hall)

403

Audio Device (Zone 2-Orange Lounge)

404

290

Host Server (Step 5)
413

Handling
Response

Control Device (1)

401

Control Device (2-n)

402

(Step 5)
413

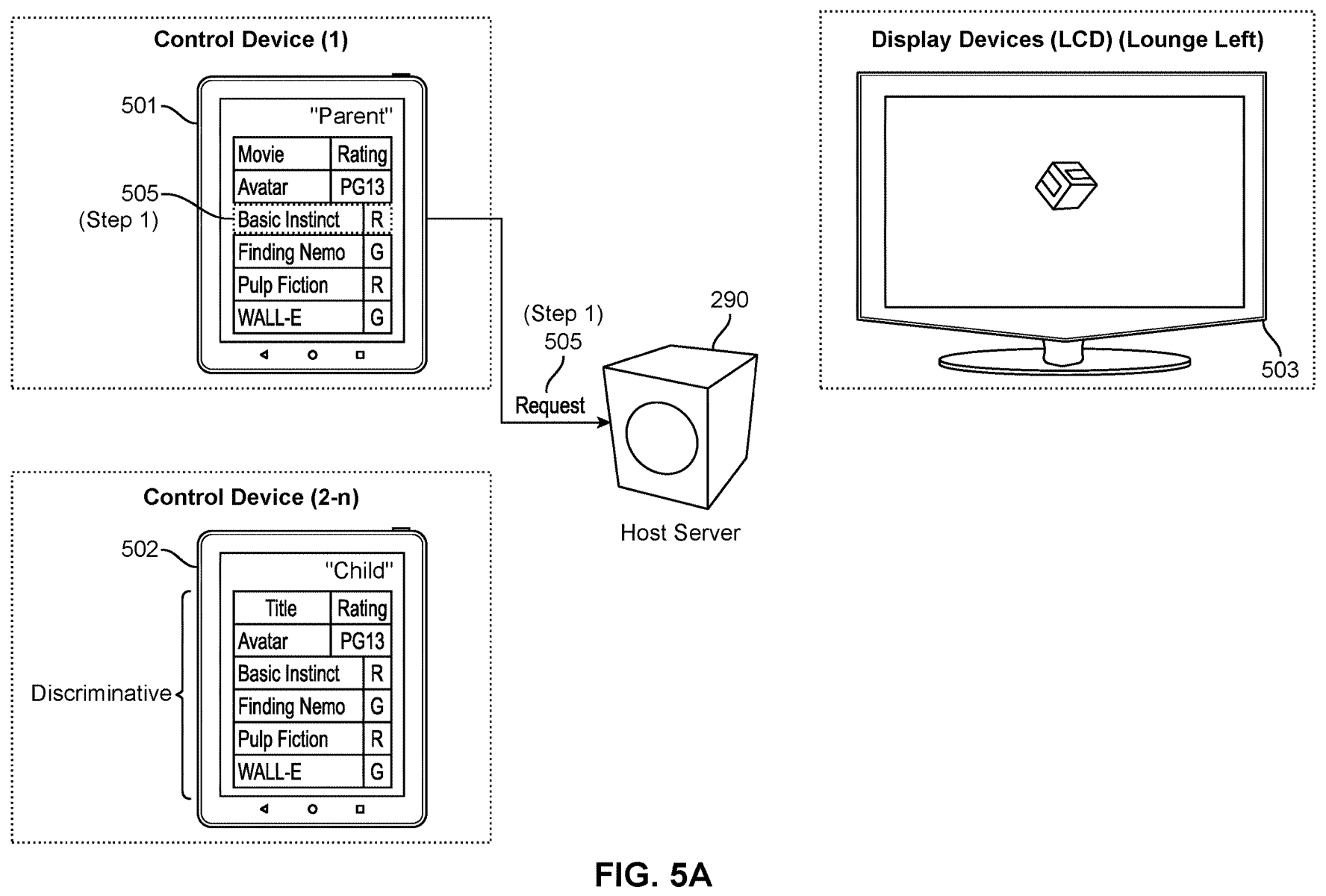

Display Devices (LCD) (Lounge Left)

503

Control Device (1)

501

"Parent"

| Movie | Rating |
|---|---|
| Avatar | PG13 |
| Basic Instinct | R |
| Finding Nemo | G |
| Pulp Fiction | R |
| WALL-E | G |

505
(Step 1)

(Step 1)
505
Request

290

Host Server

Control Device (2-n)

502

"Child"

| Title | Rating |
|---|---|
| Avatar | PG13 |
| Basic Instinct | R |
| Finding Nemo | G |
| Pulp Fiction | R |
| WALL-E | G |

Discriminative

FIG. 5A

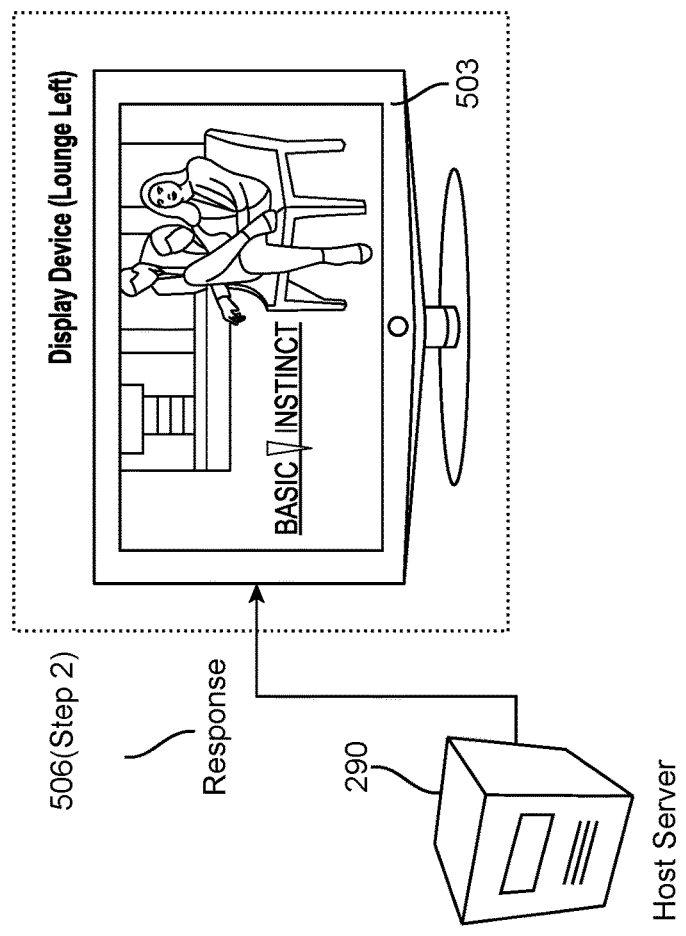
506(Step 2)
Response
290
Host Server
503
Display Device (Lounge Left)
BASIC INSTINCT
FIG. 5B
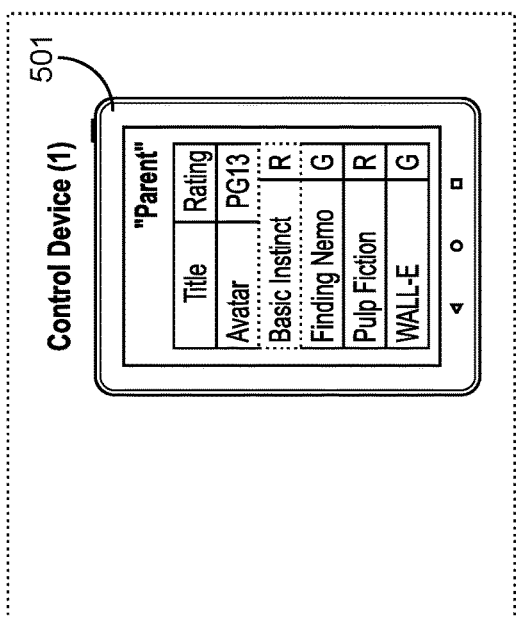
501
Control Device (1)
| "Parent" | |
|---|---|
| Title | Rating |
| Avatar | PG13 |
| Basic Instinct | R |
| Finding Nemo | G |
| Pulp Fiction | R |
| WALL-E | G |
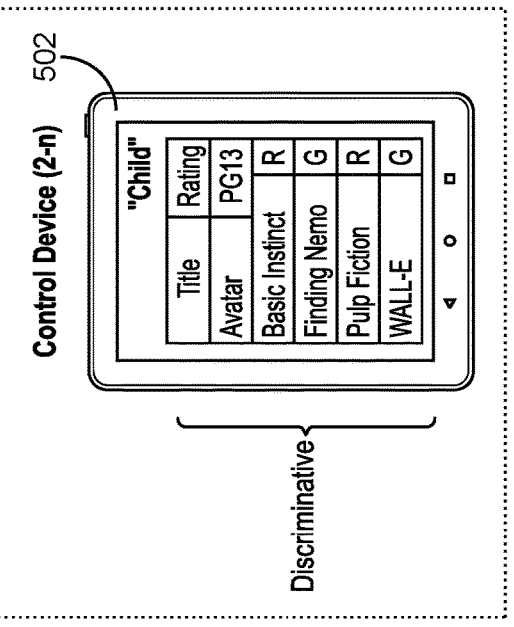
502
Control Device (2-n)
| "Child" | |
|---|---|
| Title | Rating |
| Avatar | PG13 |
| Basic Instinct | R |
| Finding Nemo | G |
| Pulp Fiction | R |
| WALL-E | G |
Discriminative

| FIG. 6 |
| FIG. 6A |
| FIG. 6B | FIG. 6C |

Display Devices (Lounge Left)

904

Control Device (2-n)

903

290

Host Server

Control Device (1)

901

905 (Step 1)

DJ/Party 905
(Step 1)

Request

Control Device (2-n)

902

Display Devices (Lounge Left)

1004

Control Device (2-n)

1003

290

Host Server

Control Device (1)

Texas Holdem:

1001

1005 (Step 1)

(Step 1) 1005 Request

Control Device (2-n)

1002

SYSTEM, APPARATUS, AND METHOD FOR CONTROLLING INTERNET DEVICES VIA A MOBILE DEVICE SESSION

CROSS-REFERENCE TO RELATED APPLICATIONS

This application is a continuation of U.S. patent application Ser. No. 17/240,622, filed Apr. 26, 2021, which is a continuation of U.S. patent application Ser. No. 16/656,147, filed Oct. 17, 2019. That application is a continuation of U.S. patent application Ser. No. 15/997,305. That application is a continuation of U.S. patent application Ser. No. 15/351,379 and a continuation-in-part of U.S. patent application Ser. No. 15/357,982. U.S. patent application Ser. No. 15/351,379 is a continuation of U.S. patent application Ser. No. 14/149,541. U.S. patent application Ser. No. 15/357,982 is a continuation of U.S. patent application Ser. No. 14/149,726, now U.S. Pat. No. 9,503,486, issued on Nov. 22, 2016, and a continuation-in-part of U.S. Pat. No. 14,149,541, now U.S. Pat. No. 9,497,137, issued on Nov. 15, 2016. Each referenced application is incorporated herein by reference.

U.S. patent application Ser. No. 14/149,541 claims the benefit of the following provisional applications, each of which is hereby incorporated by reference in its entirety: U.S. provisional application 61/749,436, filed Jan. 7, 2013, U.S. provisional application 61/749,430, filed Jan. 7, 2013, and U.S. provisional application 61/857,369, filed Jul. 23, 2013.

U.S. patent application Ser. No. 14/149,541 is a continuation-in-part of U.S. patent application Ser. No. 14/147,397 filed Jan. 3, 2014 that is incorporated by reference herein in its entirety and that claims the benefit of the following provisional applications, each of which is hereby incorporated by reference in its entirety: U.S. provisional application 61/749,436, filed Jan. 7, 2013, U.S. provisional application 61/749,430, filed Jan. 7, 2013, and U.S. provisional application 61/857,369, filed Jul. 23, 2013.

U.S. patent application Ser. No. 14/149,541 is a continuation-in-part of U.S. patent application Ser. No. 13/734,511, filed Jan. 4, 2013. All of the foregoing are hereby incorporated by reference in their entirety.

BACKGROUND OF THE INVENTION

Field

The methods and systems described, depicted, and claimed herein may relate to managing and distributing the separation of internet device information and associated controls within a network system.

Description of the Related Art

In the modern homes of today there typically are multiple means for receiving and displaying digital content on various display devices. Also, there are various electronic devices throughout the home that are networked together in a fashion for providing the user with a means for entertainment which often include, but are not limited to, personal computers, televisions, Internet television ("smart" televisions), digital video disk (DVD) players, compact disk (CD) players, set-top boxes (STBs), audio/video receivers (AVRs), digital video recorders (DVRs), gaming devices, digital cameras, smart-phones tablets, etc. Also, networked connected devices may also be adapted to receive content from multiple inputs representing Internet Protocol (IP) input connections.

Even with all of the advancements discussed above, there still are vast limitations in user experience for many of the devices and especially when used together. For example, while browsing the Internet on digital television (either directly or indirectly through a set-top box), the user experience is typically negated by cumbersome navigation of a complicated website, either with an attached keyboard, or limited static unidirectional remote control. Typically, personal computers (PC) work better for controlling than an Internet connected television for a user to browse the web. However, the Internet connected television can surpass the user experience than that of the personal computer (PC) experience in cases where it is used for playing high-resolution video, surround sound audio, and/or displaying content in a social/entertainment settings.

Conversely/similarly, in displaying digital content on a television that is typically viewed on a personal computer (PC) is also cumbersome. Typically, typing/searching for a webpage URL on a browser window of the television display is often challenging and limited by the television's remote control with static and unidirectional buttons features rather than the easier and more commonly known utilization of a mouse and keyboard on a personal computer (PC).

Another recent trend with respect to consumer electronic devices (more specifically, mobile devices, such as smart-phones, tablets, etc.) is that they have become increasingly affordable. In addition, the consumer electronic devices increasingly include more advanced features. These features allow homeowners to enhance their home entertainment user experience for the specific implementations of which those electronic devices are designed and sold for. As consumer electronics devices continue to become more available and improved for the user, the user's desire to access various types of digital content provided by various digital content sources (providers) also continues to grow. Unfortunately, since these consumer electronic devices such as, but not limited to, smart-phones, tablets are capable of retrieving and rendering digital content from the Internet or other networks, they are more typically designed to present the content in personal manner (smaller screen) for the single device user. Larger display devices, such as, but not limited to televisions are more typically designed to present better quality formats of video, such as high definition televisions (HDTVs) for a better and shared (more than one user) user experience.

Currently, users' access to and control of digital content throughout their home is often limited to the fractional utilization of which that device is designed for application types (e.g. watching movies, listening to music, playing games, etc.) and the various associated output and control device types throughout the various zones. Additionally, in the paradigm of consumer electronics growth and affordability it has become increasingly difficult for users to easily manage (control) and stream digital content seamlessly and transparently throughout the various output devices and associated locations (zones) cognizant of growing device control needs and associated digital content implementations (use cases) for a seamless user experience.

SUMMARY OF THE INVENTION

Embodiments of the present disclosure include methods, systems, or computer readable medium, with program codes embodied thereon, for managing and distributing the separation of media content and associated controls within a network system.

An embodiment of the disclosure comprises a host server for managing and distributing digital media content in association with a network system that may include a plurality of computing devices with varying user interface features and capabilities as described throughout this invention.

The host server may include one or more processors, a memory, and other circuitry generally included with a network-enabled host server that is connected to the Internet. In addition, the host server may include a client manager configured to receive requests from a control device to deliver digital content stored in the memory, or provided via Internet access through the network system, from the host server. The control device can be one control device among a plurality of control devices that have access to the host server anywhere the within a network system. Since there are typically more than one display device within a home network, the viewable content items, (e.g. web content windows) may be controlled and hosted through one central location (e.g. the host server) yet viewed simultaneously and controlled independently of each other throughout various display device locations (zones) that may be serviced by the home network. Separate processing via distinct host servers in a commonly shared network may be used as central nodes logically arranged between control devices in the network and output devices in the various zones while enabling access to Internet content.

The client manager may be further configured to receive, using the one or more processors, a command from any one of a plurality of control devices to serve via a selected output at least one item of digital content, the session state information associated with the digital content, or the session state information for the plurality of outputs of the host server, the selected outputs being selected by a user of the control devices based on at least the session state information associated with the plurality of outputs all of which are non-discriminately managed by and connected to the host server within a home network system. The client manager can be further configured to authorize access, using the one or more processors, between any one of the control devices and the host server in the network system when receiving any request (e.g. initialization request) from the control devices. The control device is a device that allows two-way communication between the host server and other control devices within the network system (e.g. transmit/receive unit (TRU) configured to communicate). Given the application type, or the launched session, the client manager can be further configured to transmit/receive requests from the control devices. This will allow the host server to message unique session state information to control devices in the network system.

Also, the host server may be configured to broadcast, using the one or more processors, to the plurality of control devices with session state information associated with the digital content and/or status information in response to receiving the request. The zone manager can be configured to associate, using the one or more processors, each of the plurality of outputs with a corresponding unique identifier. The zone manager, using the one or more processors, can be further configured to change a presentation state of the item of the digital content or various application types being served via the selected output in response to receiving a command from any one of the control devices to change the session state, such as the digital content presentation state.

Also, the zone manager, using the one or more processors, can be configured to change presentation of the session state of one output of the plurality of outputs via which digital content is being served in response to receiving a command from any one of the control devices to change the presentation of the session of the output.

The session/application manager, using the one or more processors, can be further configured to monitor session state information of each of the plurality of outputs and the digital content, maintain the session state information associated with each of the plurality of outputs and the digital content in the host server memory or provided via the Internet, and provide the plurality of control devices with the status information and the unique identifier associated of the control and output devices. Also, the session/application manager can be further configured to simultaneously provide, using the one or more processors, the session state information to the plurality of control devices, given the various application types and multiple active session instances thereof.

Another example embodiment of the present disclosure includes a non-transitory computer readable medium having computer readable program codes embodied therein for managing and distributing digital content media and associated controls given the application type in a network system, the computer readable program codes including instructions that, when executed by a processor, cause the processor to receive a request from any one of a plurality of control devices to deliver at least one item of digital content either stored on or provided via Internet access of a host server through the network system from the host server. Further, the code causes the processor to uniquely identify and decide to discriminate between any of the plurality of control devices and similarly to any of the plurality of output devices when a given specific application types requires the host server to do so. Further, the code causes the processor to serve the at least one item of digital content and/or the session state information via the selected outputs in response to receiving the command from any one of the control devices.

In addition, the code causes the processor to provide control devices with session state information associated with the digital content and session state information for a plurality of outputs of the host server connected to the network system in response to receiving the request. The code also causes the processor to receive a command from the any one of the control devices to serve the at least one item of digital content or the session state information associated with the digital content or the session state information for the plurality of outputs of the host server via a selected output, the selected output being selected by a user of any one of the plurality of control devices based on at least the session state information associated with the plurality of outputs connected to the network system. Further, the code causes the processor to serve the at least one item of digital content or the session state information via the selected outputs in response to receiving the command from any one of the control devices.

Separation of content and control in heads-up and heads-down modes is embodied in utilization of socket protocols for parsing, packaging, sending, and receiving messages and information. A library of functions, features, and methods is described which can be integrated into any computer-readable program. A socket protocol is ideal as it enables low-overhead, live ("open") connections for data exchange, as compared to HTTP client-server packages. The host server may maintain live connections with any number of control devices, and identify each control device uniquely. Then, an application can be designed such that part of the application is on the host server and the other part on control devices. The host server portion of the application can identify the sender of a message and use sender information to determine how the host server should handle, and the host server can send a message to any specified control device or any subset of control devices. The control device portion of the application can use messages from the host server to update the user interface aesthetic, behavior, or underlying models. By using live socket connections between host server and control devices and uniquely identifying sender and receiver information, an application can be designed to provide a unified, multi-screen (or multi-device in general) application, where the application's ability to discriminate messaging between users allows for an efficient and secure applications where each control device gets only information intended for it.

Host server managed application sessions for either non-discriminative or discriminative control of one or more control devices that have access to the host include various application types each with potentially unique method flows. Within these method flows are candidate examples where the host server manages the separation of content and control cognizant of the various application types the control devices. Particular application types may include, but are not limited to, applications such as 1) single/multiple player games, and/or 2) entertainment applications (e.g. karaoke).

An application of a discriminative socket-based messaging is an implementation of a social or group playlist generation for a collaborative DJ at a party. In this embodiment, each participant uses a hand-held control device to communicate within the application session. Users are divided into two classes upon joining the application session: the "DJ" class and the "guest" class. The host server serves a full content list to "guest" class control devices to display options to the "guest" users. The users may select content to submit a "vote" for that content to the application session. The "DJ," on the other hand, receives messages from the host server indicating the votes that have been cast. The "DJ" user interface allows the "DJ" user to select songs to be played at the party. The host server only accepts "add to playlist" commands from the "DJ" user. In the meantime, the host server displays the upcoming playlist on an output device and plays the desired playlist. Thus, discriminative, live messaging allows for design of an application session across multiple classes of control devices and a host server.

Another application of a discriminative socket-based messaging is an implementation of the card game Texas Hold'em poker. In this embodiment, each player uses a hand-held control device to play, where the control device displays private information such as the two private "pocket" cards and control interfaces such as buttons and fields for placing bets. The host server displays community cards (the "flop," "turn," and "river"), chip counts, and other community information on a "heads-up" display device such as a television or projector. The application session code on the host server will organize and coordinate information between users and send and receive messages using sender/receiver information to correctly distribute cards, accept betting strategies, etc., while the application session code on the control device, while identical on all control devices, will display a different set of cards, betting options, etc., depending on control device identification and game state.

The present disclosure provides a method for controlling access to a control session. The method includes receiving control data from a control device that is configured as a participant of a content distribution control session that is managed by session manager executing on a content distribution host server in a local network. The control session includes a set of participant control devices identifiable from a plurality of control devices with which the host server has established socket protocol-based communication via the network. The method further includes analyzing the control data to determine a participant class of the control device and if the control data includes a session lock request. The method also includes analyzing status information of the control session to determine if the session lock request can be accepted. The method further includes locking the control session by configuring the control session as a control device discriminative control session; removing all participant control devices of the session other than the control device from which the accepted session lock request was received; and signaling to the plurality of control devices, other than the control device from which the accepted session lock request was received, that the control session is no longer available.

In an example, the determination of an acceptance of a session lock request is based on the participant class of the requesting control device being greater than or equal to a session lock authorization threshold value. Alternatively, the determination of an acceptance of a session lock request is based on the participant class being one of session requester, session host, session owner, network administrator, and host server administrator. Otherwise, the determination of an acceptance of a session lock request is based on the set of participating control devices sharing a common participant class.

In an example, the analyzing status information of the control session includes determining if the control session is a control device discriminative control session. Alternatively, the analyzing status information of the control session includes determining if the control session is a control device non-discriminative control session. In an example, the plurality of control devices establishes socket protocol-based communication via the network with the host server through a content distribution control application executing on each control device. The method further includes marking all output devices that are configured as participant output devices in the control session as unavailable.

The present disclosure discloses a method of selecting a discriminative heads up audio/video content item. The method includes distributing audio and/or video to at least one of a plurality of HDMI/audio-connected output devices. A subset of the plurality of HDMI/audio-connected output devices participate in a control session based on user input from at least one uniquely identifiable mobile device from a plurality of uniquely identifiable mobile devices some of which also participate in the control session via the device's native user interface and operating system. The control session data entered through the user interface is displayable on the mobile device and content items displayable on the participating output device(s) are selectable via the mobile device's native interface. Further, the user interactions with the native mobile device user interface manipulate a content interaction indicator that facilitates selection of the output device displayable content items.

The present disclosure provides a method for controlling a visual representation of a content interaction indicator. The method includes uniquely identifying one of a plurality of mobile devices, a set of which participates in a content distribution control session that is hosted by a content distribution host server. Each mobile device participant in the content distribution control session is uniquely identifiable as a participant in the session by the host server and is assigned a participant class. The method also includes configuring the content distribution control session based on user input from the one of a plurality of mobile devices. The method further includes distributing audio and/or video to at least one of a plurality of HDMI-connected output devices, a set of which participate in the content distribution control session. The plurality of HDMI-connected output devices connects to HDMI outputs of the host server. The method also includes receiving control session data from a portion of the control session participant mobile devices, the control session data representative of user input captured via a user interface that is native to each of the plurality of mobile devices. A portion of the control session data entered through the user interface is displayable on the mobile device. The method also includes controlling a visual representation of a content interaction indicator that facilitates selection of at least one of a plurality of content items distributed via the HDMI outputs, the at least one of a plurality of content items being viewable on a display of the at least one of a plurality of HDMI-connected output devices. The controlling of the visual representation of a content interaction indicator is in response to user interactions with a content interaction indicator space of the mobile device native user interface based on the participant class of the mobile device.

In an example, a plurality of the uniquely identifiable mobile devices in the set, other than the one uniquely identified mobile device, share a common participant class. The common participant class is a guest participant class. The guest participants are limited by the distribution host server to select from only a subset of the plurality of content items distributed via the HDMI outputs. In an example, selection of at least one of a plurality of content items distributed via the HDMI outputs includes selection via the content interaction indicator and manipulation of the at least one content item via the user interface that is native to each of the plurality of mobile devices.

In an example, at least one of control session data and user interactions with a content interaction indicator space from the one of a plurality of mobile devices is communicated between the participating mobile devices and the distribution host server using a socket-based protocol. In an example, content control session data is communicated between the distribution host server and each member of the set of uniquely identifiable mobile devices using a socket-based protocol. A configuration of the socket-based protocol between the distribution host server and each of the set of uniquely identifiable mobile devices is based on the participant class of each uniquely identifiable mobile device. In an example, the visual representation of a content interaction indicator is presented on the at least one of a plurality of HDMI-connected output devices.

The method further includes publishing control session status with the host server to the participating set of mobile devices in response to the host server receiving the control session data. The method also includes publishing control session status over a network for updating any of the plurality of uniquely identifiable mobile devices in response to the host server receiving the control session data. The method further includes publishing control session status over a network for updating any of the plurality of uniquely identifiable mobile devices in response to any of the set of participating mobile devices impacting the status.

In an example, the control session data is received by the host server from mobile audio/video control applications executing on the plurality of participant mobile devices. The mobile audio/video control application generates the control session data based on information received from the mobile device native user interface, the received information representing the user interactions with the mobile device native user interface. The mobile audio/video control application determines which user interactions in the native user interface constitute control actions and which user interactions in the native user interface constitute content manipulation actions based on a context of at least one of the control session and the content. The audio/video control applications communicate with the distribution host server using a socket-based protocol. In an example, the user interface that is native to each of the plurality of mobile devices includes features that are specific to a type of mobile operating system of each of the plurality of mobile devices.

The present disclosure provides a method for selecting a discriminative heads up content item. The method includes distributing content via an IP network to at least one of a plurality of network-connected output devices. A subset of the plurality of network-connected output devices participate in a control session based on user input from at least one uniquely identifiable mobile device from a plurality of uniquely identifiable mobile devices some of which also participate in the control session via the device's native user interface and operating system. The control session data entered through the user interface is displayable on the mobile device and content items displayable on the participating output device(s) are selectable via the mobile device's native interface. The user interactions with the native mobile device user interface manipulate a content interaction indicator that is presented on the participating output device(s).

The present disclosure provides a method for controlling a visual representation of a content interaction indicator. The method includes uniquely identifying one of a plurality of mobile devices, a set of which participates in a content distribution control session that is hosted by a content distribution host server. Each mobile device participant in the content distribution control session is uniquely identifiable as a participant in the session by the host server and is assigned a participant class. The method also includes configuring the content distribution control session based on user input from the one of a plurality of mobile devices. The method further includes distributing content to at least one of a plurality of network-connected output devices, a set of which participate in the content distribution control session. A set of the plurality of network-connected output devices is uniquely identifiable as control session output device participants by the host server. The method also includes receiving control session data from a portion of the control session participant mobile devices. The control session data representative of user input captured via a user interface that is native to each of the plurality of mobile devices. A portion of the control session data entered through the user interface is displayable on the mobile device. The method further includes controlling a visual representation of a content interaction indicator that facilitates selection of at least one of a plurality of content items distributed in the content by the distribution host server. The at least one of a plurality of content items being viewable on a display of at least one of the set of participating output devices. The controlling of the visual representation of a content interaction indicator is in response to user interactions with a content interaction indicator space of the mobile device native user interface based on the participant class of the mobile device.

In an example, a plurality of the uniquely identifiable mobile devices in the set, other than the one uniquely identified mobile device, share a common participant class.

The common participant class is a guest participant class. The guest participants are limited by the distribution host server to select from only a subset of the plurality of content items distributed in the content. In an example, selection of at least one of a plurality of content items distributed in the content includes selection via the content interaction indicator and manipulation of the at least one content item via the user interface that is native to each of the plurality of mobile devices.

In an example, the at least one of control session data and user interactions with a content interaction indicator space from the one of a plurality of mobile devices is communicated between the participating mobile devices and the distribution host server using a socket-based protocol. In an example, content control session data is communicated between the distribution host server and each member of the set of uniquely identifiable mobile devices using a socket-based protocol. A configuration of the socket-based protocol between the distribution host server and each of the set of uniquely identifiable mobile devices is based on the participant class of each uniquely identifiable mobile device. In an example, the visual representation of a content interaction indicator is presented on at least one of the set of participating output devices.

The method further includes publishing control session status with the host server to the participating set of mobile devices in response to the host server receiving the control session data. The method also includes publishing control session status over a network for updating any of the plurality of uniquely identifiable mobile devices in response to the host server receiving the control session data. The method further includes publishing control session status over a network for updating any of the plurality of uniquely identifiable mobile devices in response to any of the set of participating mobile devices impacting the status.

In an example, the control session data is received by the host server from mobile audio/video control applications executing on the plurality of participant mobile devices. The mobile audio/video control application generates the control session data based on information received from the mobile device native user interface. The received information represents the user interactions with the mobile device native user interface. The mobile audio/video control application determines which user interactions in the native user interface constitute control actions and which user interactions in the native user interface constitute content manipulation actions based on a context of at least one of the control session and the content. The audio/video control applications communicate with the distribution host server using a socket-based protocol. In an example, the user interface that is native to each of the plurality of mobile devices includes features that are specific to a type of mobile operating system of each of the plurality of mobile devices.

The present disclosure provides a method for selecting discriminative heads down content item for providing selected audio/video/session content on an audio/video output device. The method includes distributing audio/video to at least one of a plurality of EIDMI/audio-connected output devices. A subset of the plurality of HDMI/audio-connected output devices participate in a control session based on user input from at least one uniquely identifiable mobile device from a plurality of uniquely identifiable mobile devices some of which also participate in the control session via the device's native user interface and operating system. The content indicated by at least one content item presented in and selectable via the native mobile device user interface is selectively provided to the at least one audio/video output device based on a control session participant role/class associated with the at least one uniquely identifiable mobile device.

The present disclosure provides a method for controlling a visual representation of a content interaction indicator that facilitates update by a distribution host server. The method includes uniquely identifying one of a plurality of mobile devices, a set of which participates in a content distribution control session that is hosted by a content distribution host server. Each mobile device participant in the content distribution control session is uniquely identifiable as a participant in the session by the host server and is assigned a participant class. The method also includes configuring the content distribution control session based on user input from the one of a plurality of mobile devices. The method further includes distributing audio and/or video to at least one of a plurality of HDMI-connected output devices, a set of which participate in the content distribution control session. The plurality of HDMI-connected output devices connects to HDMI outputs of the host server. The method also includes receiving control session data from a portion of the control session participant mobile devices. The control session data representative of user input captured via a user interface that is native to each of the plurality of mobile devices. A portion of the control session data entered through the user interface is displayable on the mobile device. The method further includes receiving a selection of a content item from a plurality of content items presented in the native user interface of the one uniquely identified mobile device of the set of participating mobile devices. The method also includes receiving a selection of a content item from a participating mobile device, other than the one uniquely identified mobile device, on which the plurality of content items is presented. Only a participant class-specific subset of the plurality of content items is selectable via the native user interface. The method further includes controlling a visual representation of a content interaction indicator that facilitates update by the distribution host server of the audio and/or video that is distributed via the HDMI outputs. The controlling of the visual representation of a content interaction indicator is in response to receiving the selection of a content item from a participating mobile device.

In an example, a plurality of the uniquely identifiable mobile devices in the set, other than the one uniquely identified mobile device, share a common participant class. The common participant class is a guest participant class. The guest participants are limited by the distribution host server to select from only a subset of the plurality of content items. In an example, at least one of control session data and user interactions with a content interaction indicator space from the one of a plurality of mobile devices is communicated between the participating mobile devices and the distribution host server using a socket-based protocol. In an example, control session data is communicated between the distribution host server and each member of the set of uniquely identifiable mobile devices using a socket-based protocol. A configuration of the socket-based protocol between the distribution host server and each of the set of uniquely identifiable mobile devices is based on the participant class of each uniquely identifiable mobile device. In an example, the visual representation of a content interaction indicator is presented on the at least one of a plurality of HDMI-connected output devices.

The method further includes publishing control session status with the host server to the participating set of mobile devices in response to the host server receiving the control session data. The method also includes publishing control session status over a network for updating any of the plurality of uniquely identifiable mobile devices in response to the host server receiving the control session data. The method further includes publishing control session status over a network for updating any of the plurality of uniquely identifiable mobile devices in response to any of the set of participating mobile devices impacting the status.

In an example, the control session data is received by the host server from mobile audio/video control applications executing on the plurality of participant mobile devices. The mobile audio/video control application generates the control session data based on information received from the mobile device native user interface. The received information represents the user interactions with the mobile device native user interface. The mobile audio/video control application determines which user interactions in the native user interface constitute control actions and which user interactions in the native user interface constitute content manipulation actions based on a context of at least one of the control session and the content. The audio/video control applications communicate with the distribution host server using a socket-based protocol. In an example, the user interface that is native to each of the plurality of mobile devices includes features that are specific to a type of mobile operating system of each of the plurality of mobile devices.

The present disclosure provides a method of heads-down discriminative selection for direct-connect audio. The method includes uniquely identifying one of a plurality of mobile devices, a set of which participates in a content distribution control session that is hosted by a content distribution host server. Each mobile device participant in the content distribution control session is uniquely identifiable as a participant in the session by the host server and is assigned a participant class. The method also includes configuring the content distribution control session based on user input from the one of a plurality of mobile devices. The method further includes distributing audio to at least one of a plurality of audio-connected output devices, a set of which participate in the content distribution control session. The plurality of audio-connected output devices connects to audio outputs of the host server. The method also includes receiving control session data from a portion of the control session participant mobile devices. The control session data representative of user input captured via a user interface that is native to each of the plurality of mobile devices. A portion of the control session data entered through the user interface is displayable on the mobile device. The method further includes receiving a selection of a content item from a plurality of content items presented in the native user interface of the one uniquely identified mobile device of the set of participating mobile devices. The method also includes receiving a selection of a content item from a participating mobile device, other than the one uniquely identified mobile device, on which the plurality of content items is presented. Only a participant class-specific subset of the plurality of content items is selectable via the native user interface. The method further includes controlling the audio that is distributed via the audio outputs. The controlling of the audio that is distributed is based on receiving the selection of a content item from a participating mobile device.

The present disclosure provides a method for selecting discriminative heads down content item for providing selected content to a network-connected output device. The method includes distributing content via an IP network to at least one of a plurality of network-connected output devices. A subset of the plurality of network-connected output devices participate in a control session based on user input from at least one uniquely identifiable mobile device from a plurality of uniquely identifiable mobile devices some of which also participate in the control session via the device's native user interface and operating system. The content indicated by at least one content item presented in and selectable via the native mobile device user interface is selectively provided to the at least one audio/video output device based on a control session participant role/class associated with the at least one uniquely identifiable mobile device.

The present disclosure provides a method for discriminative heads down content item selection for providing selected content to a network-connected output device. The method includes uniquely identifying one of a plurality of mobile devices, a set of which participates in a content distribution control session that is hosted by a content distribution host server. Each mobile device participant in the content distribution control session is uniquely identifiable as a participant in the session by the host server and is assigned a participant class. The method further includes configuring the content distribution control session based on user input from the one of a plurality of mobile devices. The method also includes distributing content to at least one of a plurality of network-connected output devices, a set of which participate in the content distribution control session. The set of network-connected output devices are uniquely identifiable as output device participants in the content distribution control session by the host server. The method further includes receiving control session data from a portion of the control session participant mobile devices. The control session data representative of user input captured via a user interface that is native to each of the plurality of mobile devices. A portion of the control session data entered through the user interface is displayable on the mobile device. The method also includes receiving a selection of a content item from a plurality of content items presented in the native user interface of the one uniquely identified mobile device of the set of participating mobile devices. The method further includes receiving a selection of a content item from a participating mobile device, other than the one uniquely identified mobile device, on which the plurality of content items is presented. Only a participant class-specific subset of the plurality of content items is selectable via the native user interface. The method further includes controlling a visual representation of a content interaction indicator that facilitates update by the distribution host server of the content that is distributed to the set of participating output devices. The controlling of the visual representation of a content interaction indicator is in response to receiving the selection of a content item from a participating mobile device.

In an example, a plurality of the uniquely identifiable mobile devices in the set, other than the one uniquely identified mobile device, share a common participant class. The common participant class is a guest participant class. The guest participants are limited by the distribution host server to select from only a subset of the plurality of content items. In an example, at least one of control session data and user interactions with a content interaction indicator space from the one of a plurality of mobile devices is communicated between the participating mobile devices and the distribution host server using a socket-based protocol. In an example, content control session data is communicated between the distribution host server and each member of the set of uniquely identifiable mobile devices using a socket-based protocol. A configuration of the socket-based protocol between the distribution host server and each of the set of uniquely identifiable mobile devices is based on the participant class of each uniquely identifiable mobile device. In an example, the visual representation of a content interaction indicator is presented on the at least one of the set of network-connected participating output devices.

The method further includes publishing control session status with the host server to the participating set of mobile devices in response to the host server receiving the control session data. The method also includes publishing control session status over a network for updating any of the plurality of uniquely identifiable mobile devices in response to the host server receiving the control session data. The method further includes publishing control session status over a network for updating any of the plurality of uniquely identifiable mobile devices in response to any of the set of participating mobile devices impacting the status.

In an example, the control session data is received by the host server from mobile audio/video control applications executing on the plurality of participant mobile devices. The mobile audio/video control application generates the control session data based on information received from the mobile device native user interface. The received information represents the user interactions with the mobile device native user interface. The mobile audio/video control application determines which user interactions in the native user interface constitute control actions and which user interactions in the native user interface constitute content manipulation actions based on a context of at least one of the control session and the content. The audio/video control applications communicate with the distribution host server using a socket-based protocol. In an example, the user interface that is native to each of the plurality of mobile devices includes features that are specific to a type of mobile operating system of each of the plurality of mobile devices.

The present disclosure provides a method of heads-down discriminative selection for network-connected audio. The method includes uniquely identifying one of a plurality of mobile devices, a set of which participates in a content distribution control session that is hosted by a content distribution host server. Each mobile device participant in the content distribution control session is uniquely identifiable as a participant in the session by the host server and is assigned a participant class. The method further includes configuring the content distribution control session based on user input from the one of a plurality of mobile devices. The method also includes distributing audio to at least one of a plurality of network-connected output devices, a set of which participate in the content distribution control session. The set of network-connected output devices connects are uniquely identifiable by the host server. The method further includes receiving control session data from a portion of the control session participant mobile devices. The control session data representative of user input captured via a user interface that is native to each of the plurality of mobile devices. A portion of the control session data entered through the user interface is displayable on the mobile device. The method further includes receiving a selection of a content item from a plurality of content items presented in the native user interface of the one uniquely identified mobile device of the set of participating mobile devices. The method also includes receiving a selection of a content item from a participating mobile device, other than the one uniquely identified mobile device, on which the plurality of content items is presented. Only a participant class-specific subset of the plurality of content items is selectable via the native user interface. The method further includes controlling the audio that is distributed to the network-connected output devices. The controlling of the audio that is distributed is based on receiving the selection of a content item from a participating mobile device.

The present disclosure provides a method for discriminatively controlling of composite audio/video (multi-player games). The method includes delivering, with a host session controller, a composite audio/video HDMI signal. The HDMI signal includes at least two content items that are separately controlled by corresponding uniquely identifiable control devices personal mobile devices. The host establishes and maintains a direct relationship between a content item and a uniquely identifiable control device. The content item is controllable through a native user interface of the corresponding control device.

The present disclosure provides a method for controlling a visual representation of a content interaction indicator. The method includes uniquely identifying two of a plurality of mobile devices with established active socket-based protocol communication channels with a control discriminative host server, a set of the plurality of mobile devices participating in a discriminative content control session that is hosted by the host serve. Each mobile device participant in the control session is assigned a unique session participant identifier and a participant class. The method further includes distributing audio and/or video that includes at least two separately controllable content items to at least one of a plurality of HDMI-connected output devices, a set of which participate in the control session. The plurality of HDMI-connected output devices connects to HDMI outputs of the host server. The method also includes establishing and maintaining a discriminative control relationship between each of the at least two separately controllable content items that are distributed through the plurality of HDMI outputs and a corresponding participating mobile device by configuring and updating status information associated with the control session. The method further includes adapting at least one of the video and the audio of each separately controllable content item based on session control data that is received from the corresponding participating mobile device based at least in part on the participating mobile device assigned participant class. In an example, a plurality of the uniquely identifiable mobile devices in the set, other than the one uniquely identified mobile device, share a common participant class. The common participant class is a guest participant class. The guest participants are limited by the host server to hold a direct relationship with content items that share the common participant class.

In an example, communication between a control session application executing on the host server and a mobile device uses the socket-based protocol. In an example, control session data is communicated between the host server and each member of the set of uniquely identifiable mobile devices using a socket-based protocol. A configuration of the socket-based protocol between the host server and each of the set of uniquely identifiable mobile devices is based on the participant class of each uniquely identifiable mobile device.

The method further includes publishing control session status with the host server to the participating set of mobile devices in response to the host server receiving the control session data. The method also includes publishing control session status over a network for updating any of the plurality of uniquely identifiable mobile devices in response to the host server receiving the control session data. The method further includes publishing control session status over a network for updating any of the plurality of uniquely identifiable mobile devices in response to any of the set of participating mobile devices impacting the status. In an example, the control session data is received by the host server from mobile discriminative content control applications executing on the plurality of participant mobile devices. The mobile discriminative content control application generates the control session data based on information received from the mobile device native user interface, the received information representing the user interactions with the mobile device native user interface. The mobile discriminative content control application determines which user interactions in the native user interface constitute control actions and which user interactions in the native user interface constitute content manipulation actions based on a context of at least one of the control session and the content. The discriminative content control applications communicate with the host server using a socket-based protocol. In an example, the user interface that is native to each of the plurality of mobile devices includes features that are specific to a type of mobile operating system of each of the plurality of mobile devices. The method further includes delivering, from the host server, heads-down content to the corresponding uniquely identifiable mobile devices. The heads-down content includes a user-specific portion and a session-specific portion that is delivered to a mobile discriminative control application executing on the mobile device for updating the native user interface of the corresponding mobile device.

The present disclosure provides a method for discriminatively controlling of multi-player games content. The method includes delivering, with a host session controller, multi-participant controllable content that includes at least two content items separately controlled by corresponding uniquely identifiable control devices personal mobile devices. The host establishes a party mode discriminative control session that includes the first uniquely identifiable control device, the plurality of uniquely identifiable control devices, and at least one output device for receiving the one multi-participant controllable content. The host further maintains a direct relationship between a content item and a uniquely identifiable control device. The content item is controllable through a native user interface of the corresponding control device.

The present disclosure provides a method for adapting content item based on session control data. The method includes uniquely identifying two of a plurality of mobile devices with established active socket-based protocol communication channels with a control discriminative host server, a set of the plurality of mobile devices participating in a discriminative content control session that is hosted by the host server. Each mobile device participant in the control session is assigned a unique session participant identifier and a participant class. The method further includes distributing digital content that includes at least two separately controllable content items to at least one of a plurality of network-connected output devices, a set of which participate in the control session. The plurality of network-connected output devices is accessible over a local network by the host server. The method also includes establishing and maintaining a discriminative control relationship between each of the at least two separately controllable content items that are distributed to the network-connected output devices and a corresponding participating mobile device by configuring and updating status information associated with the control session. The method further includes adapting an aspect of the content of each separately controllable content item based on session control data that is received from the corresponding participating mobile device based at least in part on the participating mobile device assigned participant class. In an example, a plurality of the uniquely identifiable mobile devices in the set, other than the one uniquely identified mobile device, share a common participant class. The common participant class is a guest participant class. The guest participants are limited by the host server to hold a direct relationship with content items that share the common participant class.

In an example, communication between a control session application executing on the host server and a mobile device uses the socket-based protocol. In an example, control session data is communicated between the host server and each member of the set of uniquely identifiable mobile devices using a socket-based protocol. A configuration of the socket-based protocol between the host server and each of the set of uniquely identifiable mobile devices is based on the participant class of each uniquely identifiable mobile device.

The method further includes publishing control session status with the host server to the participating set of mobile devices in response to the host server receiving the control session data. The method also includes publishing control session status over a network for updating any of the plurality of uniquely identifiable mobile devices in response to the host server receiving the control session data. The method further includes publishing control session status over a network for updating any of the plurality of uniquely identifiable mobile devices in response to any of the set of participating mobile devices impacting the status. In an example, the control session data is received by the host server from mobile discriminative content control applications executing on the plurality of participant mobile devices. The discriminative content control application generates the control session data based on information received from the mobile device native user interface. The received information represents the user interactions with the mobile device native user interface. The discriminative content control application determines which user interactions in the native user interface constitute control actions and which user interactions in the native user interface constitute content manipulation actions based on a context of at least one of the control session and the content. The discriminative content control applications communicate with the host server using a socket-based protocol. In an example, the user interface that is native to each of the plurality of mobile devices includes features that are specific to a type of mobile operating system of each of the plurality of mobile devices.

The method further includes delivering, from the host server, heads-down content to the corresponding uniquely identifiable mobile devices. The heads-down content includes a user-specific portion and a session-specific portion that is delivered to a mobile discriminative control application executing on the mobile device for updating the native user interface of the corresponding mobile device.

The present disclosure provides a method for controlling the content item in a party mode discriminative control session. The method includes delivering with a host session controller at least one audio and one HDMI video signal that includes at least two separately controllable display items. A first content item is controllable by a party host first uniquely identifiable control device and the second content item is controllable by party guests a plurality of uniquely identifiable control devices. The host establishes a party mode discriminative control session that includes the first uniquely identifiable control device, the plurality of uniquely identifiable control devices, and at least one output device for receiving at least the one HDMI video signal. The host further maintains a direct relationship between a content item and the uniquely identifiable control device(s) that can control the content item. Each content item is controllable through a native user interface of the corresponding control devices.

The present disclosure provides a method for adapting each separately controllable content item based on session control data. The method includes uniquely identifying a plurality of mobile devices, a set of which participates in a content distribution control session that is hosted by a content distribution host server. Each mobile device participant in the content distribution control session is uniquely identifiable as a participant in the session by the host server and is assigned a participant class. The method further includes distributing audio and/or video that includes at least two separately controllable content items to at least one of a plurality of HDMI-connected output devices, a set of which participate in the content distribution control session. The plurality of HDMI-connected output devices connects to HDMI outputs of the host server. The method also includes establishing and maintaining a one-to-one relationship between a first of the two separately controllable content items and a corresponding first mobile device control session participant that is assigned a first participant class. The method further includes establishing and maintaining a one-to-many relationship between a second of the two separately controllable content items and a corresponding set of the participating mobile devices that are assigned participant classes other than the first participant class. The method further includes adapting each separately controllable content item based on session control data that is received from a corresponding participating mobile device. The set of participating mobile devices that correspond to the second of the two separately controllable content items are prohibited from impacting the first of the two separately controllable content items.

In an example, the first of the two separately controllable content items is a list of songs and the second of the two separately controllable content items is a user rating of at least one of the songs in the list of songs. In an example, adapting the second of two separately controllable content items is limited to the first mobile device control session participant and any of the corresponding set of the participating mobile devices. In an example, the first mobile device control session participant is a party host class and the corresponding set of the participating mobile devices is assigned a party guest class.

The present disclosure provides an audio/video distribution host for managing multiple audio/video discriminative/non-discriminative control sessions. In an example, the audio/video distribution host configures a plurality of discriminating and/or non-discriminating audio/video control sessions among a plurality of personal mobile devices that are identified to serve as control devices in the audio/video control sessions and a plurality of audio/video output devices that are to be controlled in the audio/video control sessions. A native user interface of a control device that is configured in an audio/video control session with an audio/video output device can be used to control content displayed on the audio/video device. A discriminating control session limits control device content control capability based on device identifier and a non-discriminating control session treats all control devices in the session the same.

The present disclosure provides a system that includes a host server for configuring a plurality of audio/video control sessions among a plurality of personal mobile devices that are identified to server as control devices in the audio/video control sessions. The system also includes a plurality of audio/video output devices that are to be controlled in the audio/video control sessions so that a native user interface of a control device that is configured in an audio/video session can be used to control content displayed on the audio/video device. The plurality of audio/video control sessions includes at least one discriminative control session in which each personal mobile device that is identified to serve as a control device is assigned a unique control session identifier and a participant class that is used by the host server to limit control of displayed content by each control device, and at least one non-discriminative control session in which all control devices are treated as a single control device.

In an example, an audio/video control session includes at least two control devices that each controls different content distributed to a common audio/video output device. The at least two control devices are uniquely identified and control actions performed by any of the at least two control devices are shared by the host with all control devices of the audio/video control session. Alternatively, an audio/video control session includes at least two control devices that control the content displayed on the audio/video device. Each of the at least two control devices facilitate control of the content via user manipulation of a heads-up pointing facility of each control device's native user interface.

The present disclosure provides an audio/video distribution host for configuring a plurality of audio/video control sessions for controlling a plurality of audio/video signals from a plurality of personal mobile devices that are identifiable to serve as controllers for the audio/video control sessions. A first portion of the audio/video control sessions implement device discriminative relationships between participating uniquely identifiable control devices and at least one of the audio/video signals and a second portion of the audio/video control sessions implement device non-discriminative relationships among a plurality of participating control devices and at least one other of the audio/video signals.

The present disclosure provides a system that includes a host server for configuring a plurality of audio/video control sessions among a plurality of personal mobile devices that are identified to server as control devices in the audio/video control sessions. The system also includes a plurality of audio/video output devices that are to be controlled in the audio/video control sessions so that a native user interface of a control device that is configured in an audio/video session can be used to control content displayed on the audio/video device. The system further includes a personal mobile device of the plurality of personal mobile devices that is configured with an audio/video control application that facilitates participation of the personal mobile device in a discriminative control session in which each personal mobile device that is identified to serve as a control device is assigned a unique control session identifier and a participant class that is used by the host server to limit control of displayed content by each control device, and in a non-discriminative control session in which all control devices are treated as a single control device.

In an example, an audio/video control session includes at least two control devices that each controls different content distributed to a common audio/video output device. The at least two control devices are uniquely identified and control actions performed by any of the at least two control devices are shared by the host with all control devices of the audio/video control session. Alternatively, an audio/video control session includes at least two control devices that control the content displayed on the audio/video device. Each of the at least two control devices facilitate control of the content via user manipulation of a heads-up pointing facility of each control device's native user interface.

BRIEF DESCRIPTION OF THE FIGURES

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 5A-5C are sample interface illustrations of the control device discriminative session parental controls feature in accordance with either of the audio/video applications example embodiment of the present disclosure.

DETAILED DESCRIPTION

This application describes, among other things, various embodiments of content distribution and control sessions that support handling individual control devices uniquely. This is called, among other things, discriminative control device handling. The main advantage of discriminative control device handling is that a host server may now assign capabilities and/or authorization to select control devices. In an example of control device discriminative control session operation, one control device that participates in a control session may be deemed a party host (e.g. host participant) and therefore may be given authorization that is more impactful than other control devices that participate in the control session but are deemed party guests (e.g. guest participant). Likewise, in situations where individual control of just a portion of a heads-up display screen is appropriate (e.g. multi-player games), each participating control device may be directly associated with a limited subset of the content being presented on the entire output display screen. This may allow a first player to manipulate his content item without impacting another player's content item.

Discriminative control device session operation may be advantageously applied to heads-up, heads-down, and combined implementations. In this regard, the descriptions of heads up, heads-down, and non-discriminative control session configuration and operation found in parent matter U.S. Ser. No. 14/147,397 that is incorporated herein by reference in its entirety and to which the present application claims continuation-in-part priority, may be used in combination with the discriminative control session configuration and operation embodiments described herein. As an example, a host server may host discriminative, non-discriminative, and hybrid control sessions simultaneous, contemporaneously, and/or serially.

Figure 1:
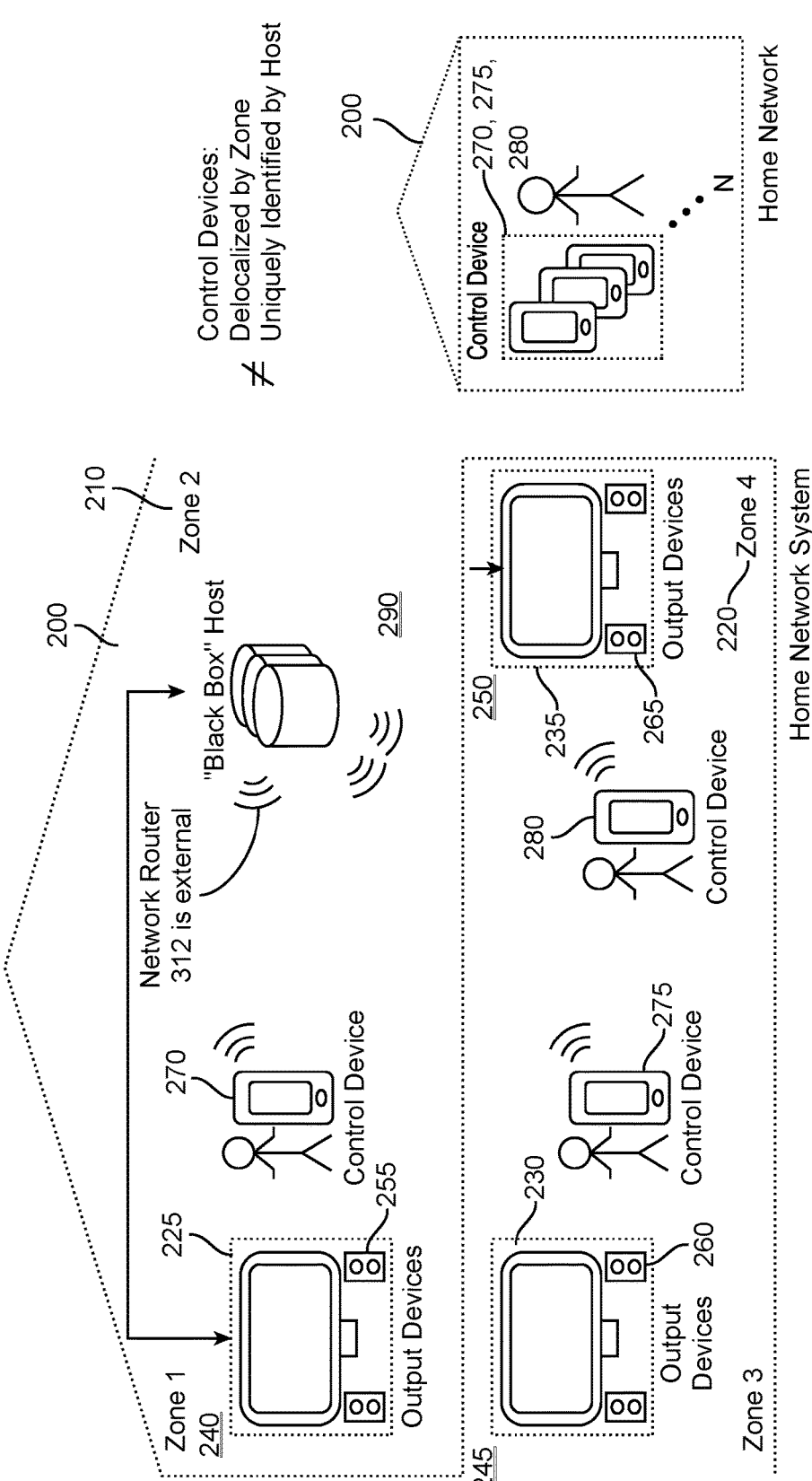
FIG. 1 illustrates an example environment of a home network system in accordance with an example embodiment of the present disclosure.

FIG. 1 illustrates an example environment of a home network system 200, according to an illustrative embodiment of the present disclosure. The home network system 200 includes various output devices 225, 230, 235 containing display devices 240, 245, 250 and/or audio devices 255, 260, 265, various control devices 270, 275, 280, and a host server 290. Further, in this invention each of the output devices 225, 230, 235 are connected to corresponding outputs (e.g. audio 309 and video 310 outputs of FIG. 3) of the host server 290.

Figure 2:
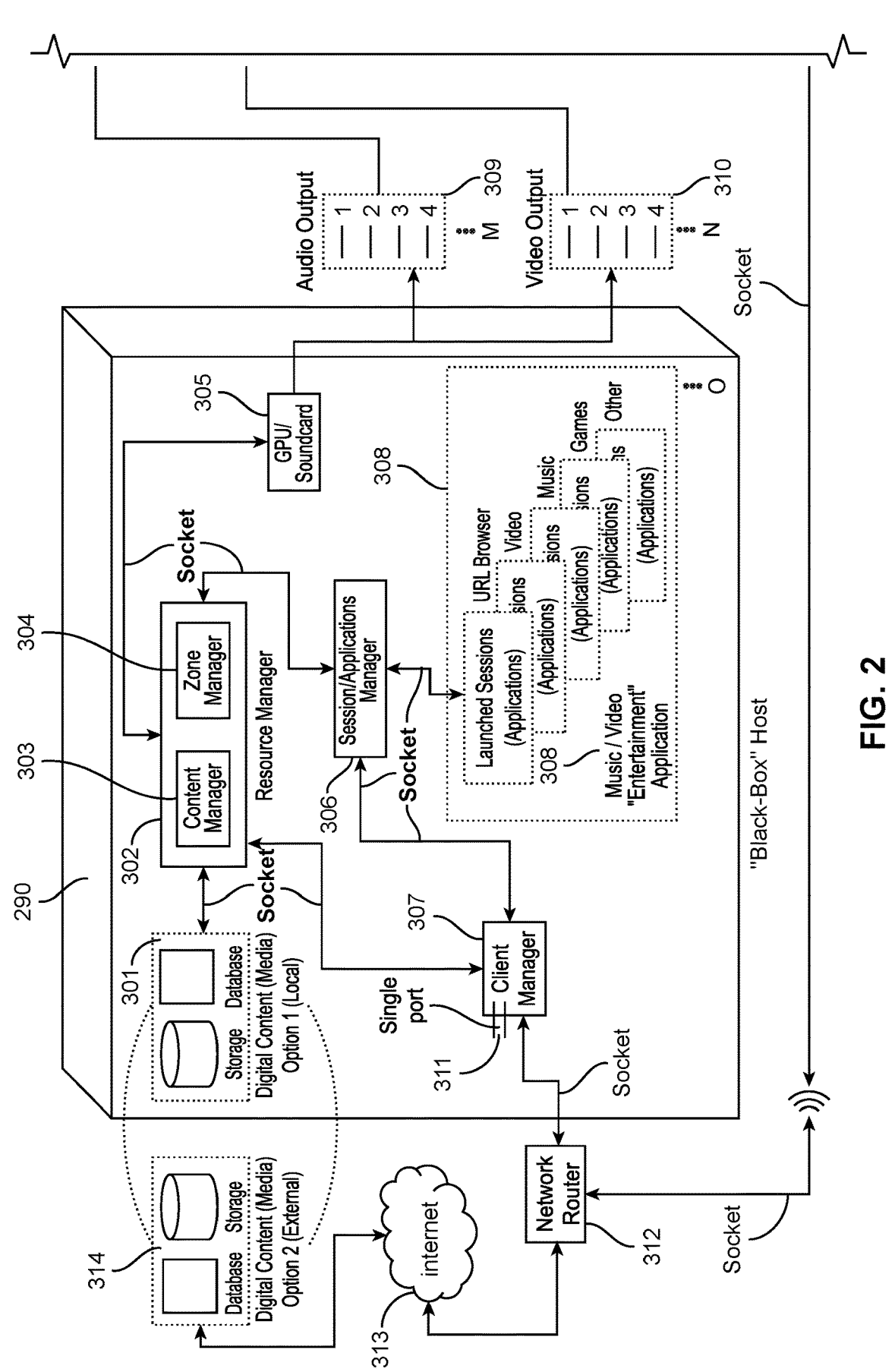
FIG. 2 is a schematic block diagram of a host server and system-level architecture utilized by a home network system in accordance with an example embodiment of the present disclosure.
Figure 2:
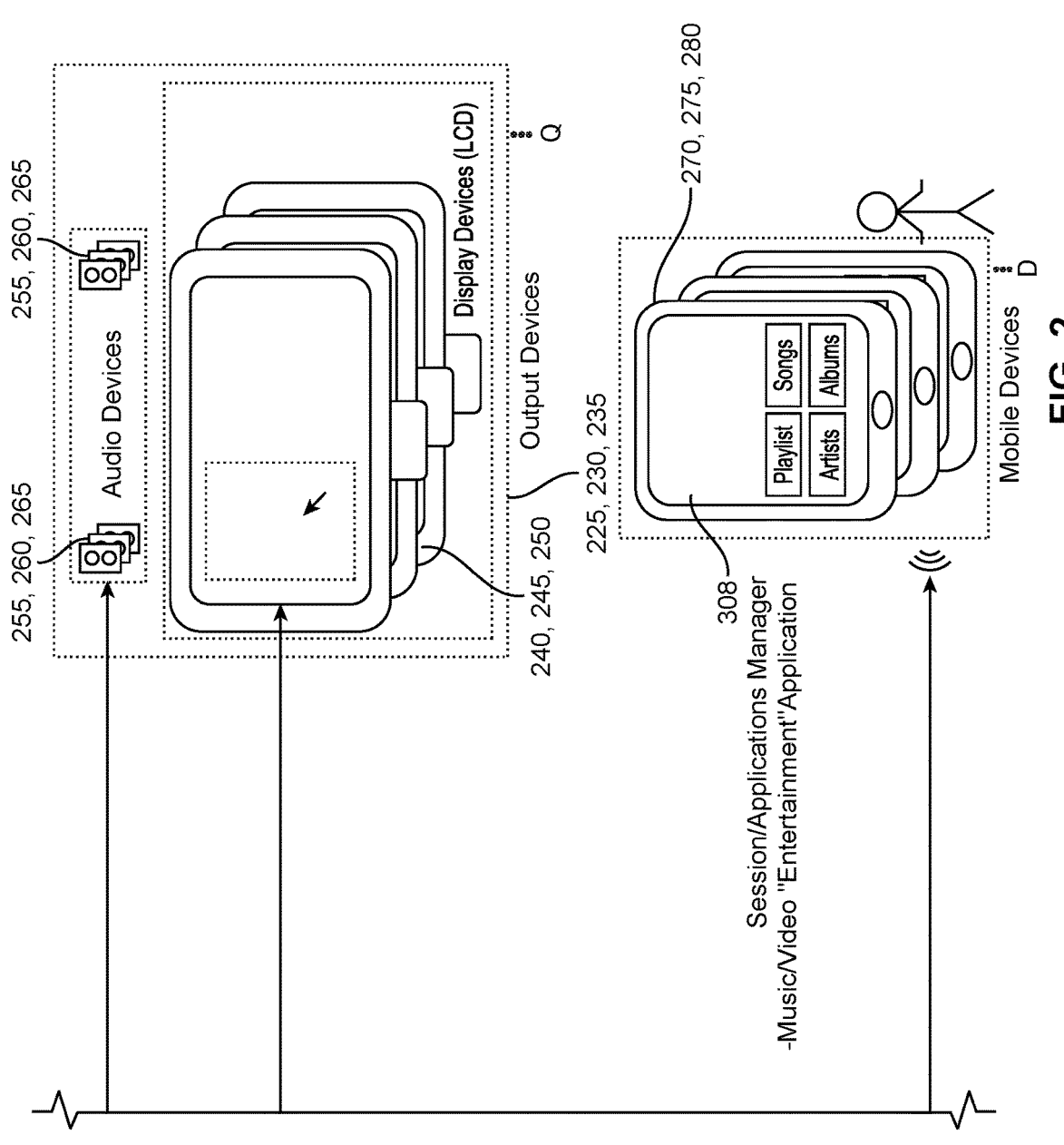

FIG. 2 illustrates an example environment of a schematic block diagram of a host server 290 and system-level architecture by a home network system 200, as previously depicted in FIG. 2, according to an illustrative embodiment of the present disclosure. The home network system 200 of FIG. 1 includes various output devices 225, 230, 235 containing various display devices 240, 245, 250 and/or audio devices 255, 260, 265 further containing various control devices 270, 275, 280, and a host server 290. In an example embodiment, each of the output devices 225, 230, 235 are connected to corresponding outputs (e.g. audio 309 and video 310 outputs of FIG. 2) of the host server 290.

Each of the control devices 270, 275, 280 is communicatively connected to the host server 290. Any suitable wired and/or wireless connectivity technologies mentioned herein can be employed to facilitate connection between any of the various control devices 270, 275, 280, various output devices 225, 230, 235 and the host server 290. The control devices 270, 275, 280 and host server 290 can communicate with each other by exchanging data packets according to a pre-defined set of network protocols, such as the Transmission Control Protocol/Internet Protocol (TCP/IP), the Real-time Transport Protocol (RTP), and the User Datagram Protocol (UDP), etc. A network protocol as used herein is a formal set of rules that define how data is exchanged between nodes (e.g. the control devices 270, 275, 280 and host server 290) in a communications network.

The control devices 270, 275, 280 can be conventional communication units, such as laptop computers, desktop computers, wireless transmit/receive units (WTRUs) (e.g. smart-phones and personal digital assistants (PDAs), and the like, that convert information (e.g., data) into signals that are transferred to an access point (e.g., network router 312) of the host server 290 via wireless links. More specifically, the control devices 270, 275, 280 are configured to connect to the home network system 200 of FIG. 1 and communicate with devices on the home network system 200 and can be, for example, a local area network (LAN).

The access point, or "single port" sockets 311 contains logic that enables the control devices 270, 275, 280 to transmit the information (e.g. data) to the host server 290. For example, socket 311 access points can include circuitry configured to receive signals (e.g. radio frequency (RF) signals), from the control devices 270, 275, 280, that carry the information via wireless links Once the signals are received, the socket 311 access points convert the signals into data packets according the predefined set of network protocols. The socket 311 access points then pass the data packets to the host server 290. The host server 290 then processes the data packets to control and provide digital content to users via any of the requested combinations of the output devices 225, 230, 235. In addition, the socket 311 access points enable the host server 290 to connect to a wired/wireless local area network (e.g. the home network system 200 of FIG. 1).

The host server 290 includes at least one interface (e.g. output devices 225, 230, 235 and/or control devices 270, 275, 280) by which the output devices 225, 230, 235 are connected to the host server 290. In an example, the host server 290 can include a plurality of audio output interfaces, a plurality of video device 310 interfaces, and a plurality of audio device 309 interfaces and video display device 310 interfaces.

The output devices 225, 230, 235 can be connected to the interfaces of the host server via a High-Definition Multimedia Interface (HDMI) cable. HDMI is a compact audio/video interface for transferring uncompressed video data and compressed/uncompressed digital audio data from an HDMI-complaint device to a compatible digital audio device or digital television. In another example, the output devices can be connected to the host server via a wireless HDMI connectivity technology such as, for example, Sony Bravia Wireless Link® utilizing, for example, a Wireless Home Digital Interface (WHDI) protocol standard for wireless HDTV connectivity that enables delivery of uncompressed high-definition video over a wireless radio channel connecting any video source (e.g., computers, mobile device, Blu-ray players) to any compatible display device.

As stated above, the output devices 225, 230, 235 may include display devices 240, 245, 250. These display devices 240, 245, 250 may be, for example, older generation televisions (e.g. cathode ray tube (CRT) televisions), Internet enable televisions, LEDs, LCD, mobile phones, smartphones, computers, laptops, notebooks, tablets, etc. More specifically, these display devices 240, 245, 250 are any device types capable of displaying digital content to be viewed by a user.

Also, as stated above the output devices 225, 230, 235 may include audio devices 255, 260, 265. These audio devices 255, 260, 265 may be, for example, speakers and headphones. More specifically, the audio devices 255, 260, 265 are devices capable of playing any type of audio content such that a user is able to hear the audio content. The audio devices 255, 260, 265 can reside within various locations (zones) of a network system independent of the respective display device 240, 245, 250 locations, all of which is highly dependent on the application types.

In addition, the host server 290 includes a storage device that is configured to store digital content and is further configured to access digital content outside of itself on a network attached storage (NAS). Digital content generally refers to information available for download or distribution on electronic media. For example, the digital content can include, but is not limited to, video, audio, digital media, documents, photos, or any other dynamically generated information. The digital content can be in several known formats such as, for example, mp3, MPEG, DIVX, MOV, JPEG, and WAV. A user may access the host server 290 via the local area network (LAN) and upload digital content to the host server 290. In another example, the user may access the host server 290 and download digital content from an external source (e.g., the Internet) to the host server 290.

In order to access the digital content, the user utilizes the control devices 270, 275, 280 to communicate with the host server 290. The control devices 270, 275, 280 obtain a communication address of the host server 290 (e.g. an IP address). For example, a user of the control devices 270, 275, 280 can register at least one of the control devices 270, 275, 280 to communicate/access the host server 290. The user may register the control devices 270, 275, 280 by signing into a central host server (not shown) using authentication information (e.g. username/password) of the user and associate and discriminate against any of the at least one of the control devices 270, 275, 280 with the host server 290. Once the at least one of the control devices 270, 275, 280 is registered, the at least one of the control devices 270, 275, 280 is able to communicate/access the host server 290 using the IP address of the host server 290 provided to the control devices 270, 275, 280 in response to registering with the central host server. The control devices 270, 275, 280 are able to communicate with the host server 290 via the socket 311 access points. Advantageously, the ability of the control devices 270, 275, 280 to communicate with the host server 290 is independent of the physical location of the control devices 270, 275, 280 with respect to the host server 290. In particular, the control devices 270, 275, 280 are able to communicate with the host server 290 as long as the control devices 270, 275, 280 are able to send communication signals to the socket 311 access points associated with the host server 290.

As will be described in further detail in the audio/video application type embodiment description, once the user is connected to the host server 290 via one of the control devices 270, 275, 280 the host server 290 provides the user with a list of the digital content 301, 314 either stored on (in 301) or accessed by (in 314) the host server 290. Next, the user selects a specific item of the digital content 301, 314, the host server 290 provides the user with an option as to which of the output devices 225, 230, 235 from which the user would like the selected digital content 301, 314 presented. For example, the host server 290 presents the user with a list of available output devices 225, 230, 235 using the unique identifiers associated with the interfaces by which the output devices 225, 230, 235 are connected to the host server 290. The user can then select from any one of the output devices 225, 230, 235, given the selected application. The option of output devices 225, 230, 235 presented to the user may be based on a current status of the output devices and/or the type of digital content requested by the user.

Another embodiment of the disclosure comprises a host server for managing and distributing digital media content in association with a network system that may include a plurality of computing devices with varying user interface features and capabilities as described throughout this invention. The host server may include one or more processors, a memory, and other circuitry generally included with a network-enabled host server that is connected to the Internet. In addition, the host server may include a client manager configured to receive, using the one or more processors, a request from a control device to deliver at least one item of digital content stored in the memory, or provided via Internet access through the network system, from the host server. The control device can be one control device among a plurality of control devices that have access to the host server anywhere the within a network system. Since there are typically more than one display device within a home network, the viewable content items, (e.g. web content windows) may be controlled and hosted through one central location (e.g. the host server) yet viewed simultaneously and controlled independently of each other throughout various output device locations (zones) that may be serviced by the home network. Separate processing via distinct host servers in a commonly shared network may be used as central nodes logically arranged between control devices in the network and output devices in the various zones while enabling access to Internet content.

Figure 3:
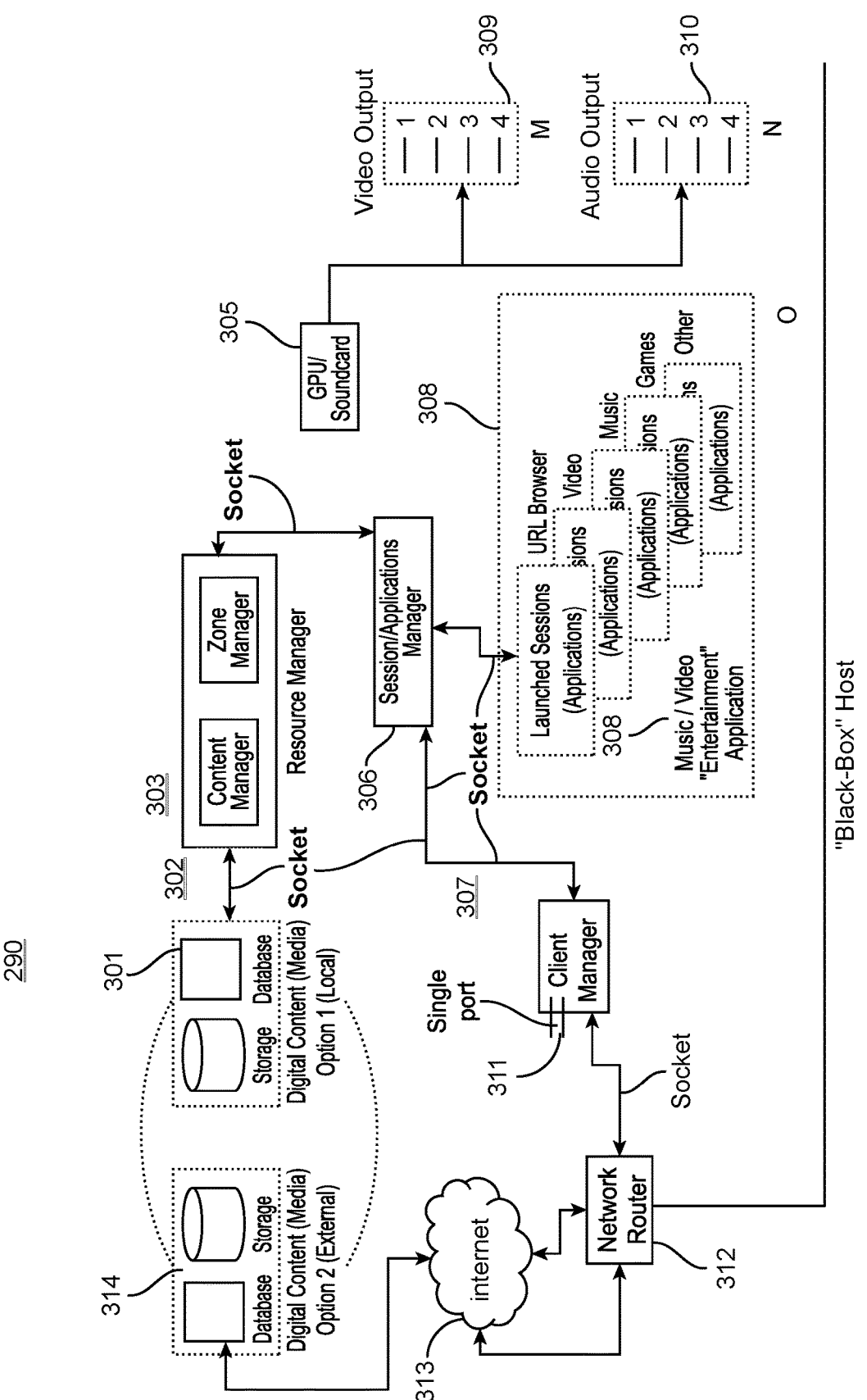
FIG. 3 is a schematic block diagram of a host server utilized by a home network system in accordance with an example embodiment of the present disclosure.

FIG. 3 is a schematic block diagram of a host server 290 utilized by a home network system (e.g. the FIG. 1 home network system 200 and a zoomed-in version of the FIG. 2 host server 290). The host server 290 can include, but is not limited to, a network router 312, client manager 307, session/applications manager 306, launched application types 308, resource manager 302, content manager 303, zone manager 304, digital content (media) options 1 and 2 storage/database 301 (internal), 314 (external), Internet 313, GPU/soundcard 305, various session application types 308, and audio output interface 310 video output interfaces 309. Any suitable connectivity technologies mentioned herein may be employed to facilitate connection between the various devices 301-314.

The network router 312 is configured to function as a wireless access point via utilization of single port sockets 311. The router 312 provides the host server 290 with a connection to the Internet 313. More specifically, the router 312 can function in a wired local area network (LAN), wireless-only LAN (WLAN), or in a mixed wired/wireless network. As stated above, the network router 312 enables the control devices 270, 275, 280 to communicate with the host server 290.

The client manager 307 and associated single port socket 311 is configured to enable the host server 290 to deliver digital content to devices connected to a local area network (LAN) (e.g., the FIG. 2 home network system 200). In addition, the client manager 307 processes communications received from the LAN via the network router 312. Using the client manager 307, the host server 290 is able to communicate with and manage devices connected to the LAN. For example, the client manager 307 communicates with the control devices 270, 275, 280, resource manager 302, and the various active sessions application types 308 in order to manage and provide the digital content stored in either of the digital content (media) options 1 storage/database (local) 301 and options 2 storage/database (external) 314. Further note that the client manager 307 may be further configured to receive, using the one or more processors, a command from any one of a plurality of control devices 270, 275, 280 (depicted in FIG. 2) to serve via a selected output at least one item of digital content 301, 314, the session state information associated with the digital content 301, 314, or the session state information for the plurality of outputs 225, 230, 235 (as depicted in FIG. 2) of the host server 290, the selected outputs being selected by a user of the control devices 270, 275, 280 (as depicted in FIG. 2) based on at least the session state information associated with the plurality of outputs all of which are non-discriminately managed by and connected to the host server 290 within a home network system 200. The client manager 307 may be further configured to authorize access, using the one or more processors, between any one of the control devices 270, 275, 280 and the host server 290 in the network system 200 when receiving any request (e.g. initialization request) from any of the control devices. Also, the client manager 307 can be configured to associate, using the one or more processors, each of the plurality of control devices 270, 275, 280 with corresponding unique identifiers. These unique identifiers may be useful for certain functions based on a given the application types 308, or based on launched (active) session within a session/applications manager 306, which will allow for the host server 290 to discriminatively manage the control devices. Note that any of the control devices 270, 275, 280 are devices that allows two-way communication between the host server 290 and other control devices within the network system (e.g. transmit/receive unit (TRU) configured to communicate). Given the application types 308, or the launched sessions, the client manager 307 can be further configured to transmit/receive requests from the control devices 270, 275, 280 with unique identifiers in order to associate between one another within the network system 200. This will allow the host server 290 to message unique session state information to the unique and plural control devices 270, 275, 280 within the network system 200.

Also, the host server 290 may include a resource manager 302 configured to broadcast, using the one or more processors, to the plurality of control devices 270, 275, 280 with session state information associated with the digital content 301, 314 and/or status information in response to receiving the request. In addition, the resource manager 302 may be further configured to serve, using the one or more processors, the at least one item of digital content 301, 314 and/or the session state information associated with the digital content in response to receiving the request from any one of the control devices 270, 275, 280 via a zone manager 304 capability of the resource manager 302.

The resource manager 302 communicates with the client manager 307 to determine all output devices (e.g. output devices 225, 230, 250 of FIG. 2) connected to the LAN via the network router 312. In addition, the zone manager 304 can identify all output devices (e.g., output devices 225, 230, 235 of FIG. 1) connected to the host server 290 via the video outputs interface 309 and/or the audio outputs interface 310. The zone manager 304 also associates the video output interface 309 and the audio output interface 310 with a unique identifier. It should be noted that the host server 290 can also include additional audio output 310 interfaces, video output 309 interfaces, and any other relevant combination of audio and video output interfaces given any of the associated application types 308.

The resource manager's zone manager 302 can be configured to associate, using the one or more processors, each of the plurality of outputs with a corresponding unique identifier. The zone manager 304, using the one or more processors, can be further configured to change a presentation state of the item of the digital content 301, 314 or various application types 308 being served via the selected outputs 225, 230, 235 in response to receiving a command from any one of the control devices 270, 275, 280 to change the session state (e.g. digital content presentation state, etc.). Also, the zone manager 304, using the one or more processors, can be configured to change presentation of the session state of one output of the plurality of outputs 225, 230, 235 via which digital content 301, 314 is being served in response to receiving a command from any one of the control devices 270, 275, 280 to change the presentation of the session of associated outputs. The resource manager 302 associated content manager 303 can be configured to provide, using the one or more processors, all of the control devices 270, 275, 280 with a list of the digital content stored on the host server 290 internal storage/database or provided via Internet access connected to the network system 200 given the active session application types 308.

Once all the output interfaces 309, 310 have been identified and associated with a unique identifier, the zone manager 304 monitors the status of all the output interfaces 309, 310. The zone manager 304 performs this task by monitoring traffic flow from each of the output interfaces 309, 310. In addition, the zone manager 304 determines that session state information of the digital content stored by the host server 290 via the digital content storage/database 301, 314. For instance, the zone manager 304 determines whether an item of digital content (media) options 1 and 2 storage/database 301 (internal).

In an example embodiment, the client manager 307 receives a request for an item of digital content from any one of the control devices (e.g., the control device 270, 275, 280 of FIG. 1) via the network router 312. In addition, the client manager 307 receives a corresponding command that that identifies from which of the output interfaces 309, 310 to serve the digital content. The client manager 307 passes the request and corresponding command are passed to the resource manager 302 content manager 303. The content manager 303 retrieves the selected digital content from the digital content (media) options 1 and 2 storage/database 301 (internal) and processes and formats the digital content for standardization into the GPU/Soundcard 305 similar to, but not limited to, as that of either an Internet web-browser.

The session/application manager 306, using the one or more processors, can be further configured to monitor session state information of each of the plurality of outputs 225, 230, 235 and the digital content, maintain the session state information associated with each of the plurality of outputs and the digital content in the host server 290 memory or provided via the Internet, and provide the plurality of control devices 270, 275, 280 with the status information and the unique identifier associated of the control and output devices. Also, the session/application manager 306 can be further configured to simultaneously provide, using the one or more processors, the session state information to the plurality of control devices 270, 275, 280, given the various application types 308 and multiple active session instances thereof.

Another key embodiment of both discriminative and non-discriminative control is through socket input/output utilization which may use a custom protocol (e.g. socket-based messaging library) to communicate input/output information in streamlined and low-overhead messaging between the control device to host server for controlling digital content, session, and/or client/server information over a network. This is ideal as it enables efficient, real-time (live "open" socket) data exchange minimizing latency and size of the data. This implementation includes a control device and/or host server compatible library that parses, packages, and sends various strings (e.g. client/server information, commands, etc.). Such strings contain relevant data including sender identification, receiver identification, references to executable content, response data, etc. These strings are packageable and parsable in a standardized format (e.g. JSON, XML) such that a program with a message parsing and packaging library on a control device or a host server can interpret such a string (e.g. JSON parser) and handle it appropriately (e.g. execute a method, update a database with response data, etc.). Furthermore, such a library can be equipped to transmit and receive these messages using transport protocols, such as, but not limited to, TCP (transmission control protocol) socket. Other protocols that may alternatively be used in this implementation include UDP (user datagram protocol) for simpler messaging transmissions, DCCP (datagram congestions control protocol), SCTP (Stream Control Transmission Protocol) (SCTP), etc.

In contrast to the above example utilization, messages may also be delivered through the more commonly known use of HTTP. Currently, HTTP utilization is the standard protocol for websites (e.g. "HTTP://"). HTTP is a standard and stateless format to package, parse, and send information. Note that within computing, a stateless protocol is a communications protocol that treats each request as an independent transaction that is unrelated to any other previous request, allowing for independent pairs of requests and responses. Furthermore, a stateless protocol does not require the host server to retain any session state information through the multiple requests of a client-to-host server pairing. In contrast, a "stateful" protocol requires keeping the internal state on the host server. HTTP may be used for most commands that are sent from the control devices to the host server, which makes the functionality of the host server similar to that of more commonly known web-server from an I/O point of view of the control device (e.g. smart-phone, tablet, etc.).

Socket connections may be primarily used without HTTP as it allows the host server to "openly" maintain connections throughout the duration of the active session. For example, in a typical browser application, the host server does not know if the control device (client) URL-page is actively "open" or if that session window has actually been terminated by the user. As utilized herein, active sessions (e.g. SBConnect, etc.) are maintained and uniquely identified by the host server. For instance, a client manager with a socket-based messaging library will be able to assign a control device a unique identification associated with a live socket connection to the control device, which allows a low-latency message to be initiated by either a control device (request) or host server (push). A message may additionally contain information uniquely identifying the sending control device or host server, allowing a host server to identify the sender and use sender information in its handling of the message. Furthermore, a client manager will be able discriminate between connected control devices, and specifically route messages to desired clients. Thus, any session, application, or module of a host server with access to a client manager can send a message to any arbitrary list of control devices that have an active connection with the client manager. This includes broadcasts to all connected control devices, messages for only one control device, messages addressed to a list of devices who have performed a certain behavior, etc.

A utilization of messaging any arbitrary list of control devices is to communicate control information among control devices and host server. Given a message containing session state, status updates, or other information, a control device may update the interface it presents to a user. Furthermore, given multiple control devices, each may receive independent, non-identical messages from a single host server at different points in time. Thus, a single application session instance on a host server may manage multiple control devices, potentially providing users with a deliberately unique, but connected aesthetic, behavior, or information. Further, within an application session or theme, the host server may choose to respond to a received message discriminatively depending on which control device sent the message. The advantages of such a discriminative messaging client is embodied in (1) parental controls where requests from some control devices for specific content are handled discriminatively by a host server (host server discriminates receiving) and (2) a session hiding feature where only specified control devices may engage in a specific session (host server discriminates sending).

Through the utilization of socket-based communication, FIGS. 4A-4G demonstrate the novel feature of "session hiding" and the ability of a host server to discriminate how it handles requests by different control devices.

Figure 4A:
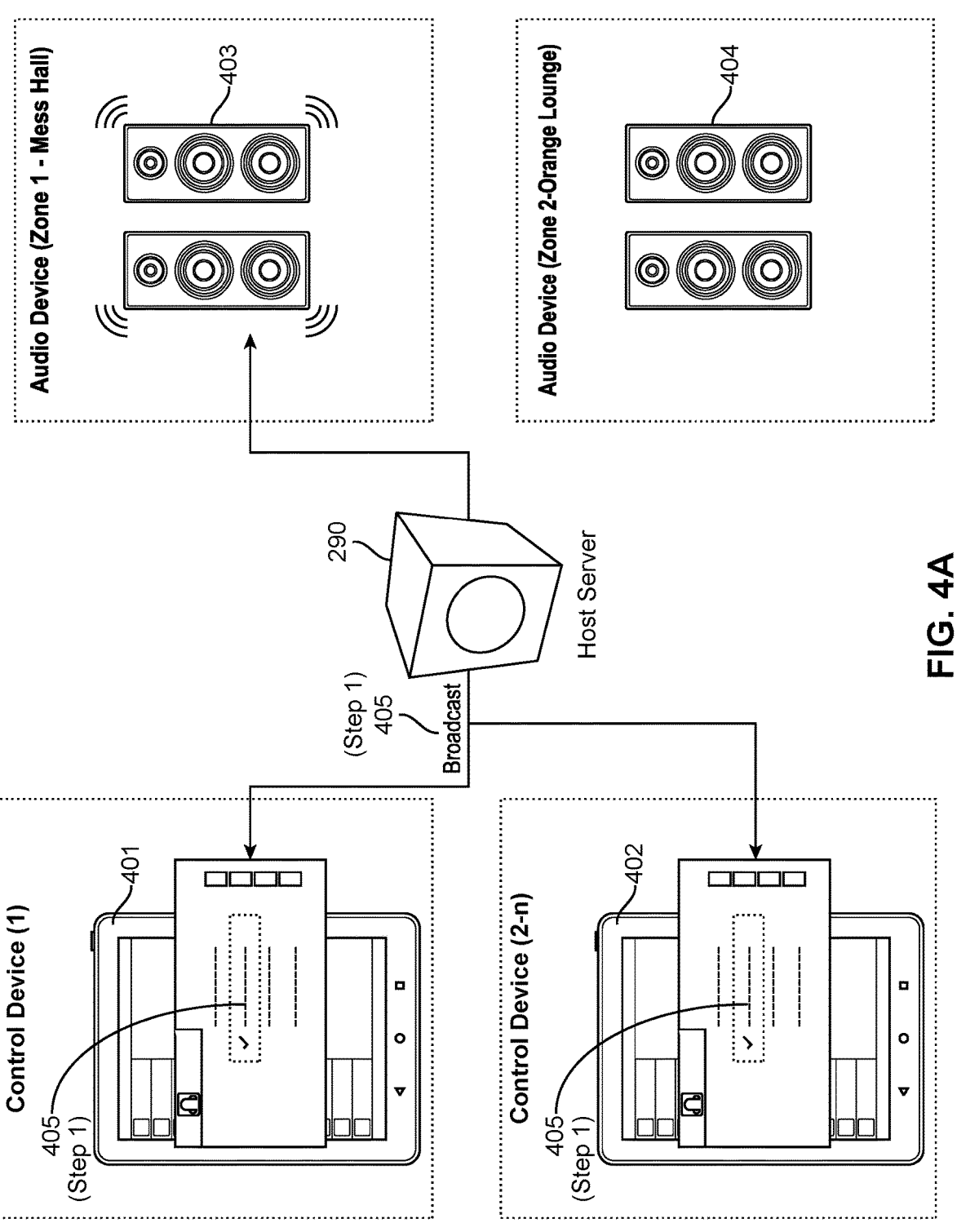
FIGS. 4A-4G are sample interface illustrations of the control device discriminative session locking (or "hiding") feature in accordance with either of the audio/video applications example embodiment of the present disclosure.
Figure 4B:
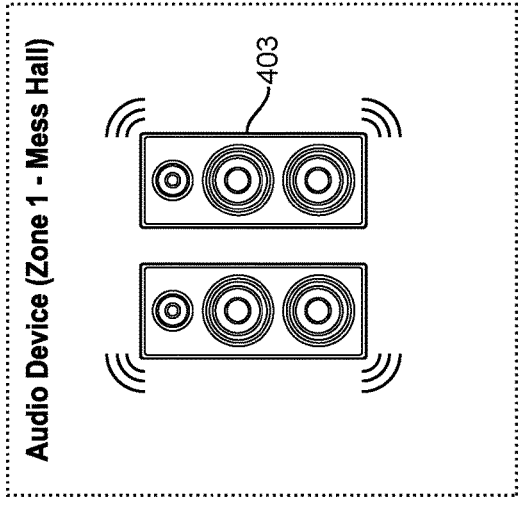
Figure 4B:
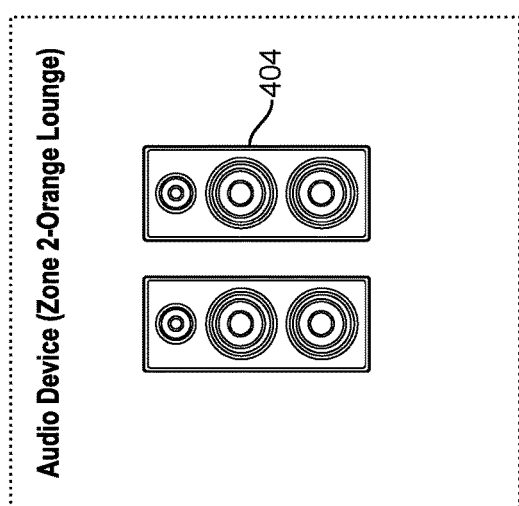
Figure 4B:
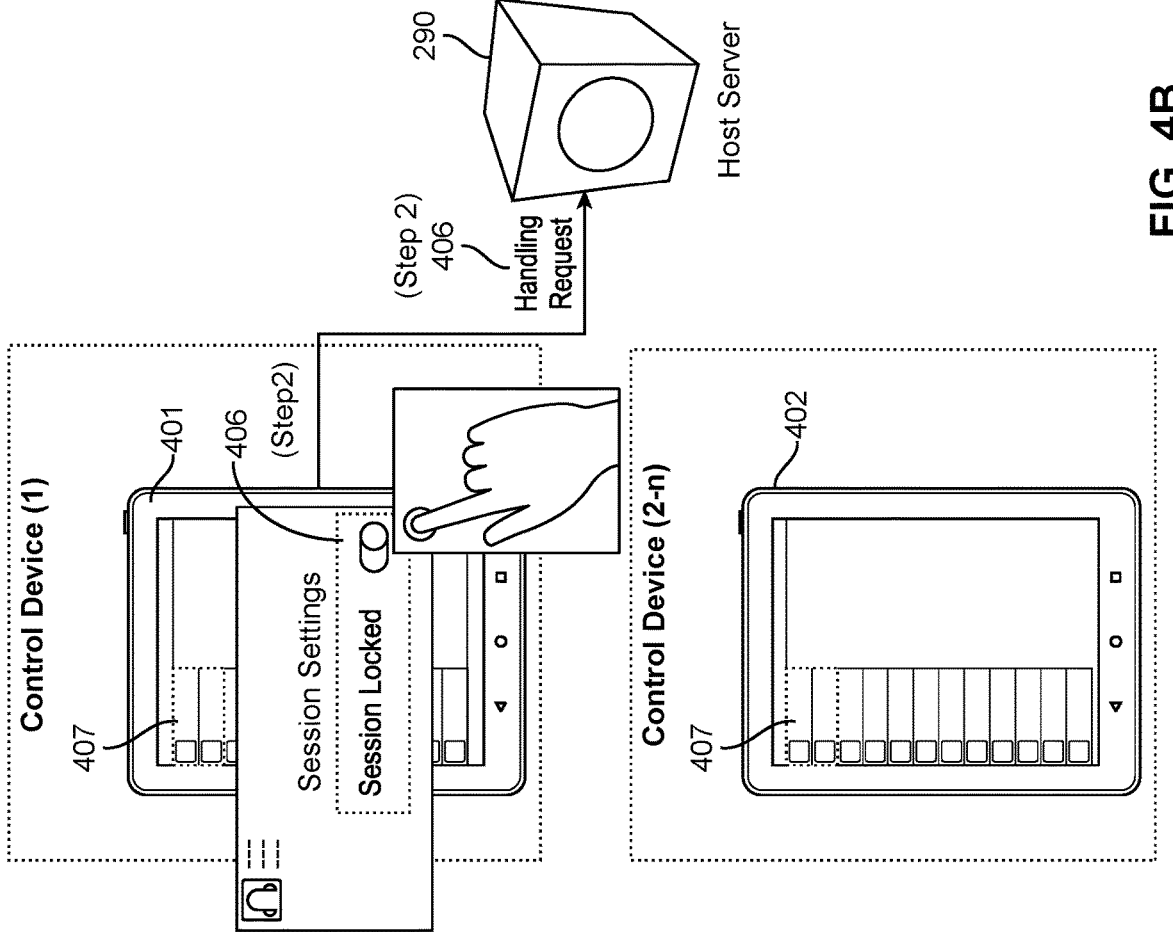
Figure 4C:
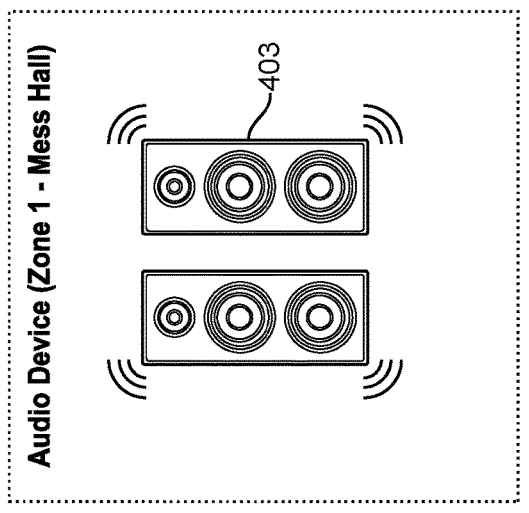
Figure 4C:
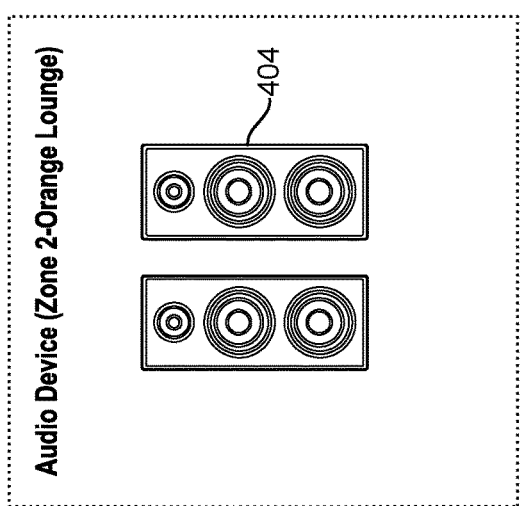
Figure 4C:
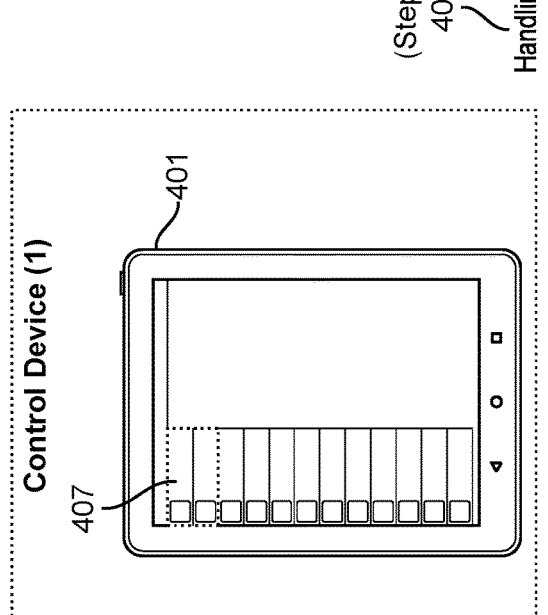
Figure 4C:
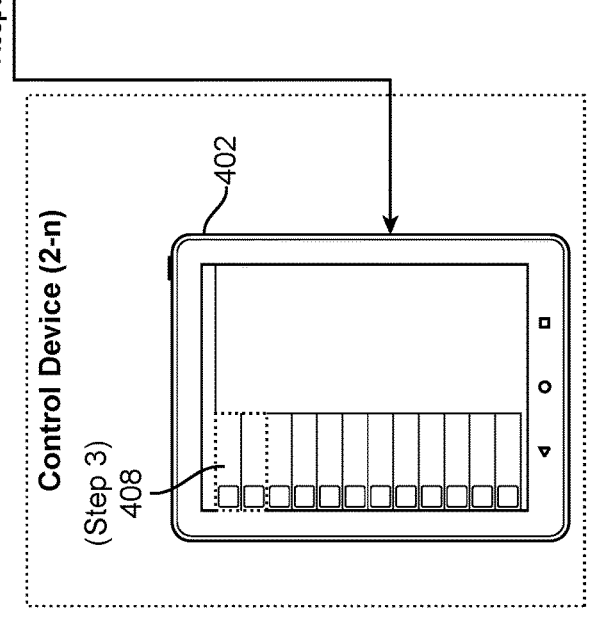

Note that the example, as depicted in FIGS. 4A-4C, is for an audio (music playlist) session application type. As shown in FIG. 4A, the host 290 non-discriminately broadcasts the session state information to control devices that have network access to the host. In this case control device (1) 401 and any other control devices (2-n) 402 receive the audio application session state information which shows that audio device 403 (zone 1—mess hall) 403 is playing music, as depicted in the step 1 405 with the "checked" boxes on both control devices 401 402 screens. As shown in FIG. 4B, the user of control device 401, wishing to hide the session from any of the other control devices 402, activates the "session locked" selection on their interface display as depicted in step 2 406. The control device 401 then translates the finger swipe motion into a command which is then transmitted as a handling request to host 290 via the network connection. Next, as shown in FIG. 4C the host 290, in a handling response to FIG. 4B step 2 406, hides the session state information (discriminatively) to any other control devices communicating to the host. As shown in step 3 408 control devices (2-n) 402 no longer see the session state information on their interface view, while control device 401 still does as seen in 407.

Figure 4D:
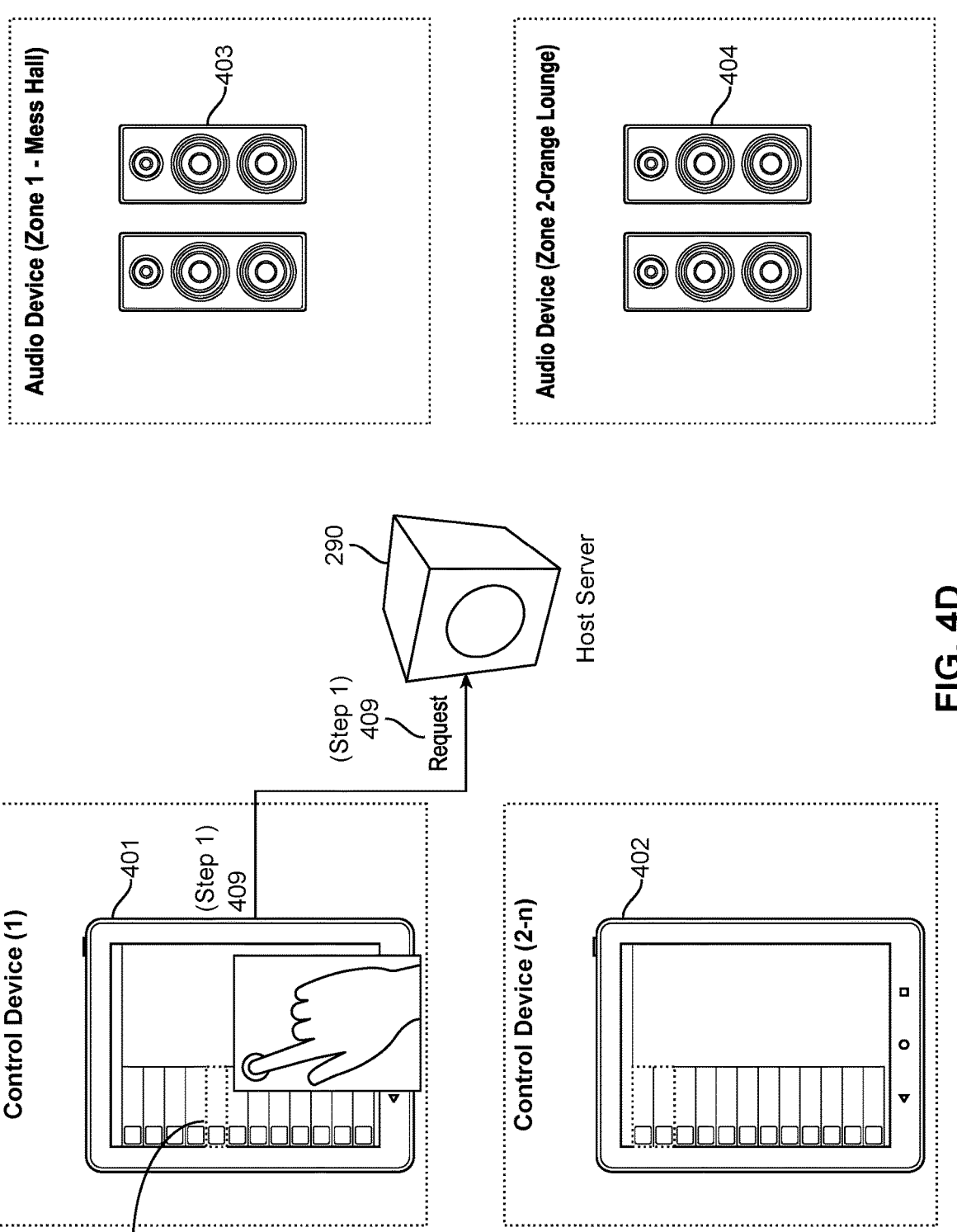
Figure 4E:
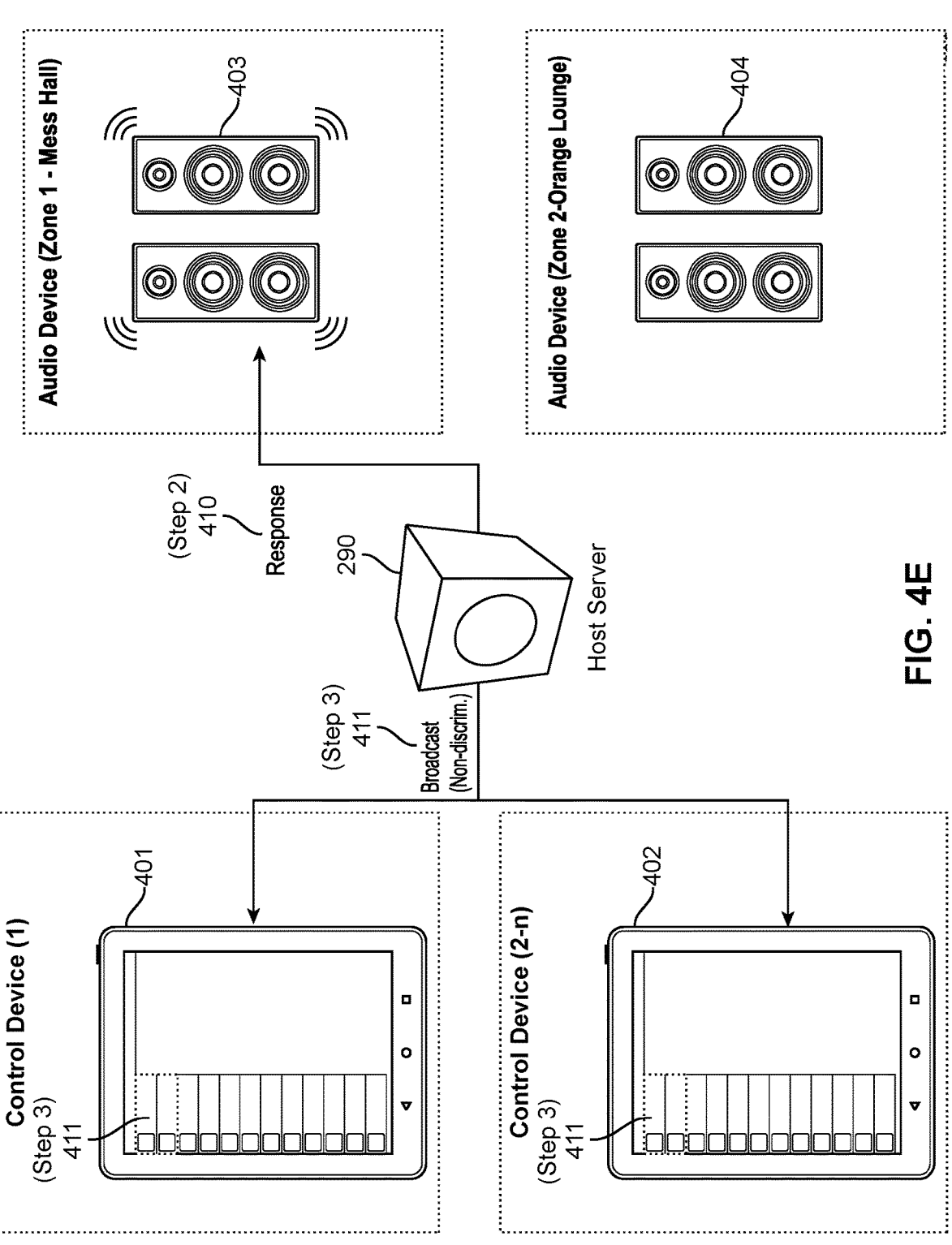
Figure 4F:
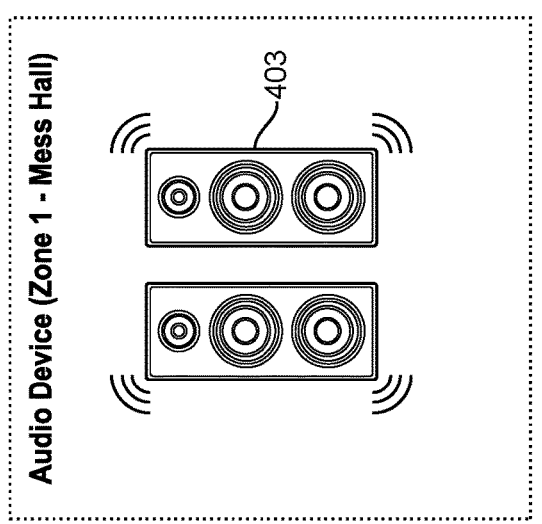
Figure 4F:
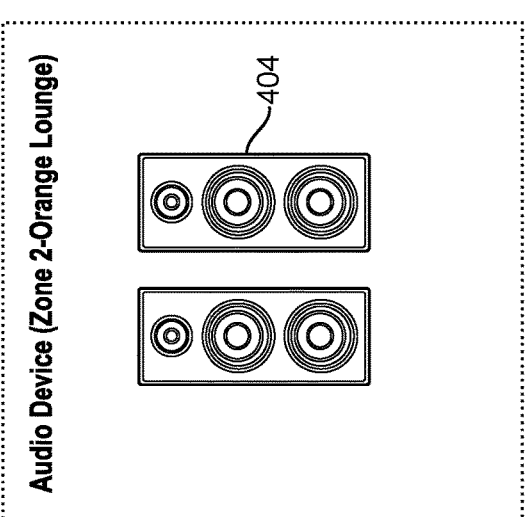
Figure 4F:
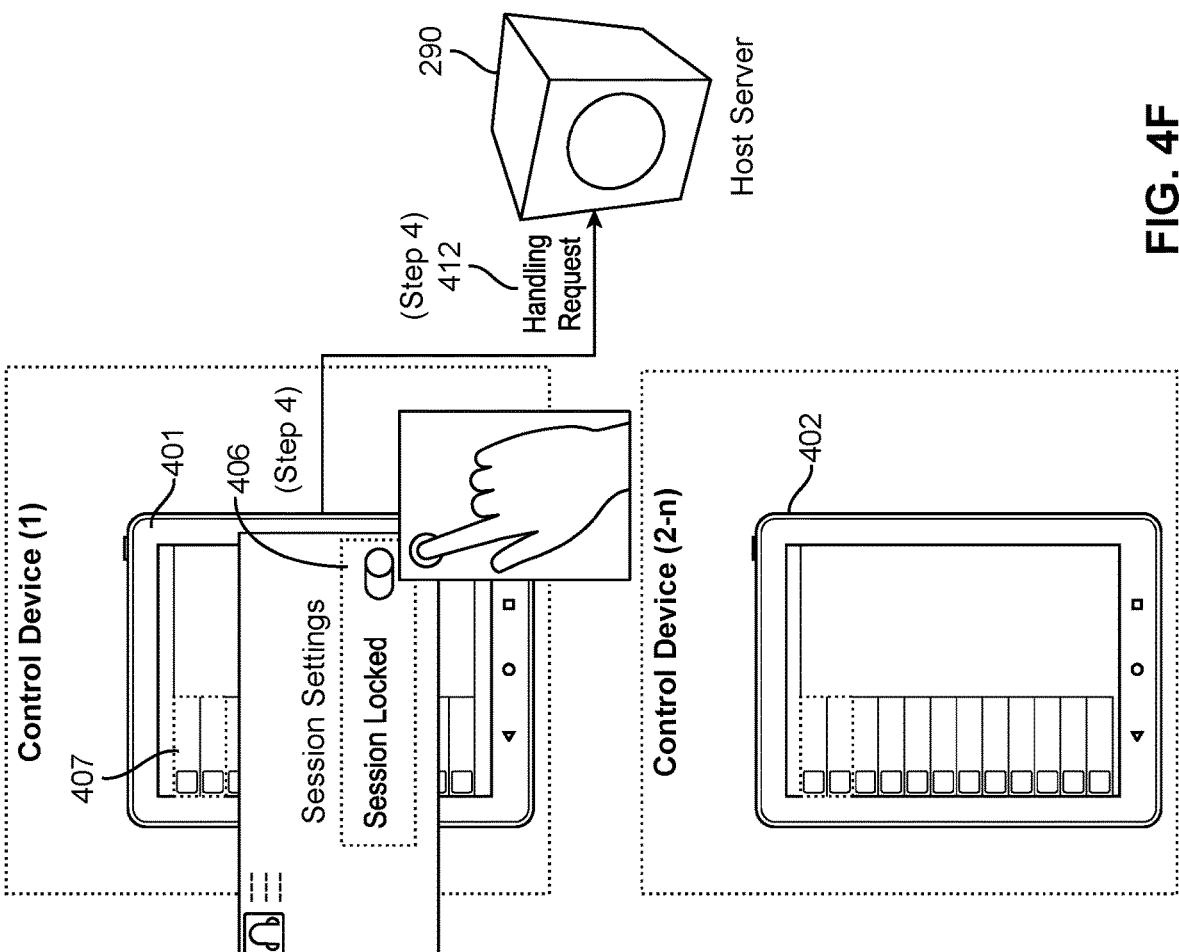
Figure 4G:
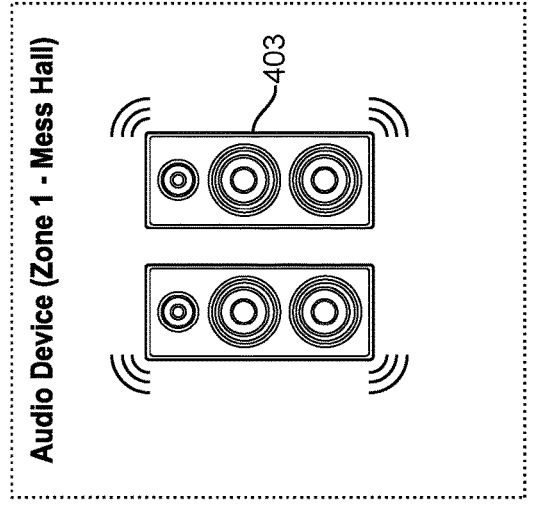
Figure 4G:
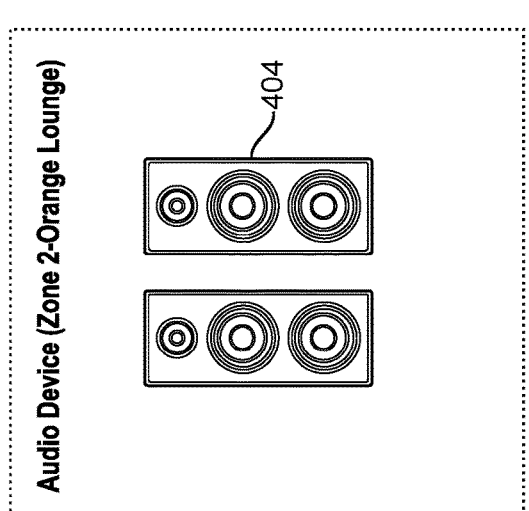
Figure 4G:
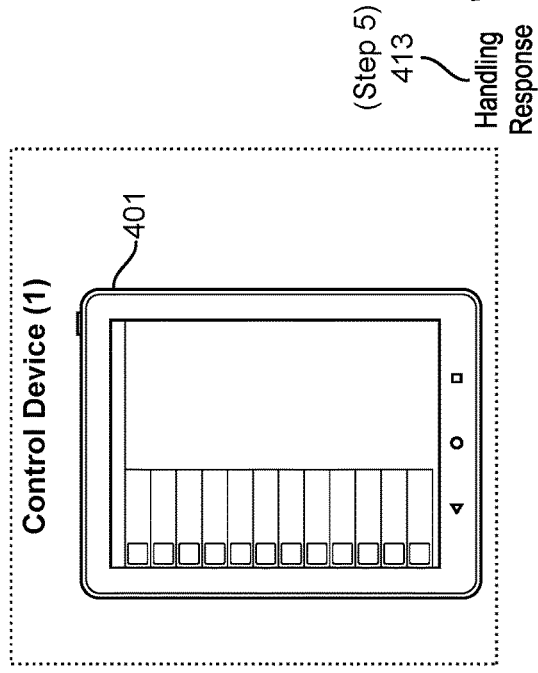
Figure 4G:
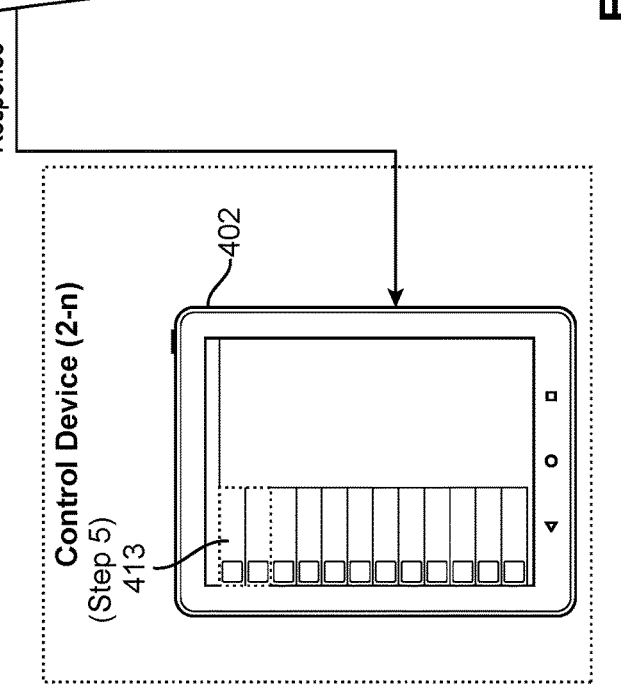

Now, furthering to the "session locking" theme, but showing another session application theme type is as shown in FIGS. 4D-4G, which in this case is for a Internet radio application session. As shown in FIG. 4D, control device 401 sends a message requesting the host server to initiate a music session, as depicted in step 1 409. Next, host server 290 parses and handles the message and, shown in step 2 410 in FIG. 4E, host server 290 then responds by initiating the audio playback session on the attached output device 408 (audio device in zone 1—mess hall). Also, as shown in FIG. 4E step 3 411, the host server 290 continues to respond by non-discriminately sending active session state information all control devices with an active socket connection to the host server which, in this case is control devices 1 401 and 2-n 402. All control devices 401, 402 update their user interfaces to visually indicate the existence of the active music session. Next, in FIG. 4F step 4 412, the user selects the "Hide Session" toggle as depicted on the interface, which instructs the control device 1 401 to message the host server 290 a "hide" request of the current active session previously shown in step 3 411. The host server 290 receives the handling request message string encoded in a parsable format, such as JSON or XML, in (including control device 1 401 sender unique identification) with its socket-enabled message parsing library. Note that such a message sent from any of the control devices 401, 402 would be handled identically by the host server 290, regardless of any particular control devices' current state (e.g. control device 1 401 could be viewing selectable content list information while any of the other control devices (2-n) 402 could be initiating the session "hiding step instead). Note that the function of the hide feature is to hide the session from all users except the one performing the hide, locking out unauthorized users from control and knowledge of the session. Finally, in FIG. 4G, the host server 290 "hides" the previously activated session from all control devices 2-n 402 except the control device 1 401 which made the initiating "hide" request. More specifically, the host server 290 sends a session state change update excluding the hidden session to a list of all connected devices 2-n 402, excluding the uniquely identified sender of the "hide" message (control device 1 401), as shown in step 5 413. When the control devices update their user interfaces, they uniquely (as per the host server 290 discriminative response of step 5 413) depict the varying session status by the message parsing library in the host server 290. The newly updated session state essentially informs control devices (2-n) 402 that the previously active session is now inactive (or hidden), so failure to broadcast such a control device discriminative message would result in control device 1 incorrectly believing the session is still hidden from any other control device (2-n) 402, which is not the case.

The host 290 may not automatically accept all session hide requests. The host 290 may analyze each such request to determine if the request can be accepted. The host may consider factors such as session status, participating control device status, class, and the like in determining a proper response to such a request. Participant class of not only the requesting control device, but the class of other participating control devices may also be considered. If a control device requesting to hide a session is assigned a participant class that is lower priority than the class of other participating control devices, the hide request may not be accepted. This scenario is helpful in avoiding a child participant from hiding a control session from his/her parent. Likewise, a party guest participant class control device may not be permitted to hide a control session from a party host participant class control device. Alternatively, a session hide/ lock threshold value may be set as a parameter of the control session and/or of the host server. If requests to hide a session fail to comply with the threshold value, the request may not be accepted. However, if all participating control devices share a common participant class (e.g. as might be the case in a non-discriminative control session), then it is possible that a request for hiding a control session from the other participants may be based on a first-come first-served basis. Other factors that may come into a decision to lock/hide a session may include the number of other sessions currently hidden/locked by the particular control device, the history of hiding sessions by the control device, aspects of an output device associated with the control session (e.g. hiding of a session that includes a public display may be further limited), and the like.

Figure 5C:
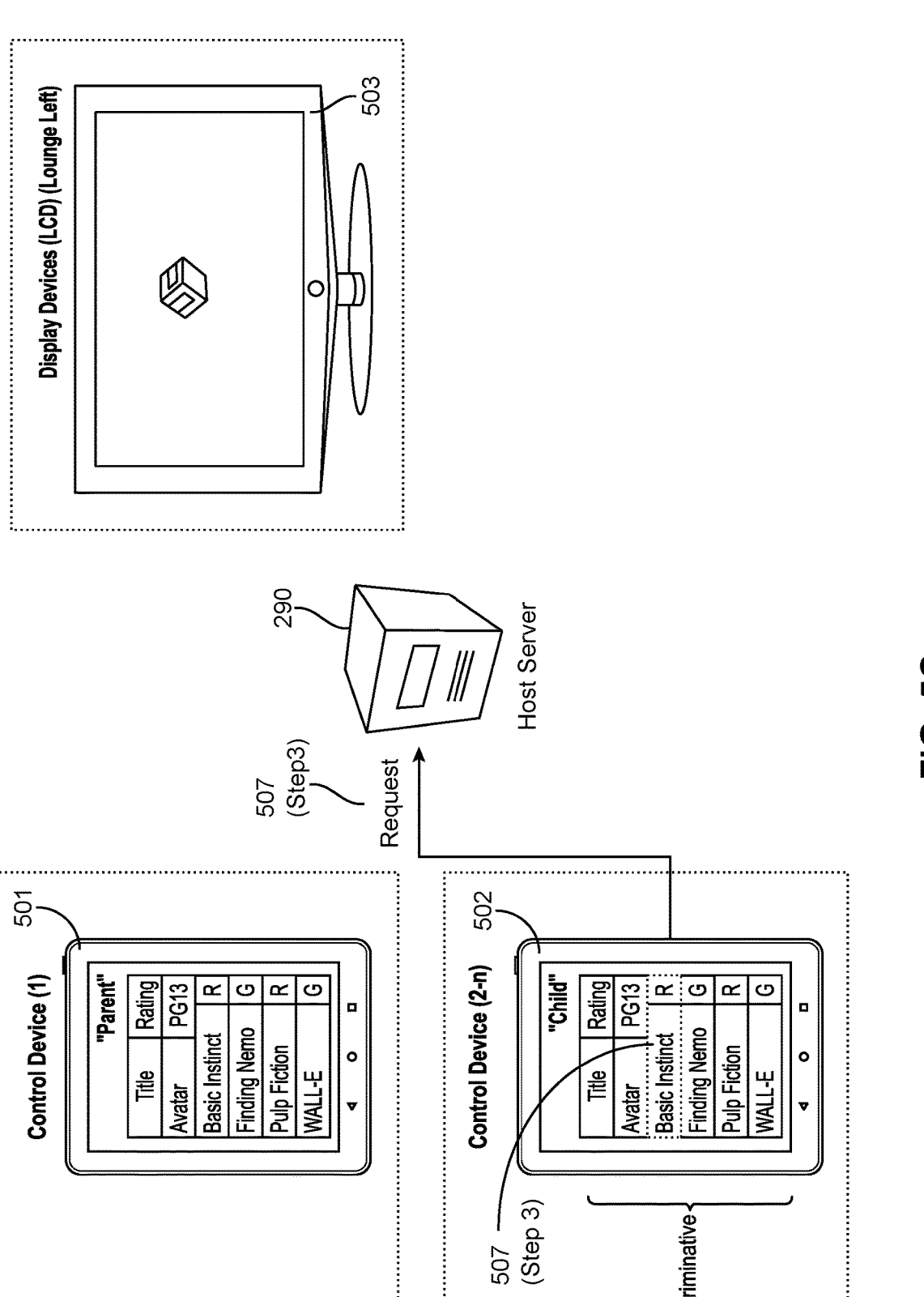
Figure 6A:
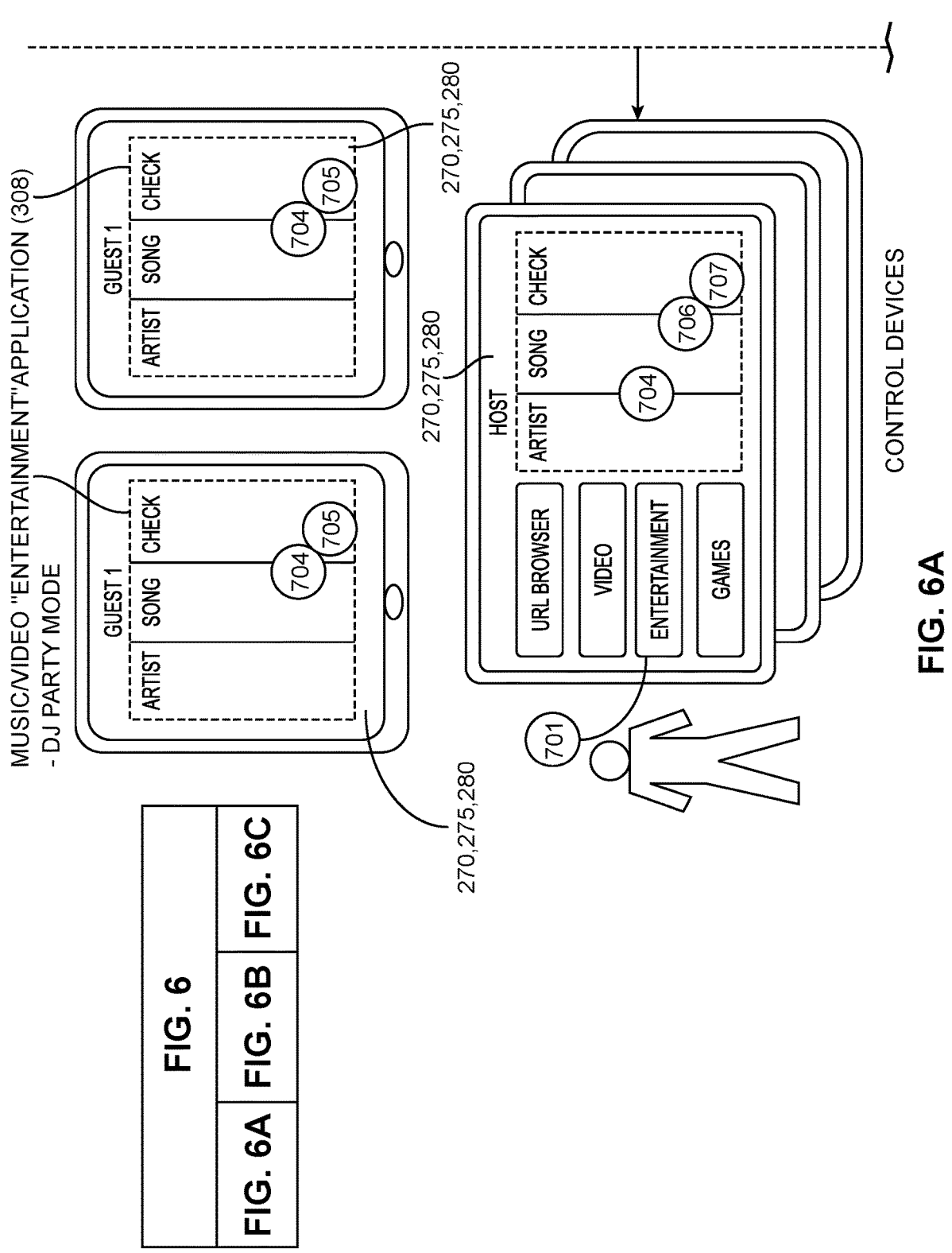
FIGS. 6A-6C are a schematic block a diagram of host server and system-level architecture utilized by a home network system in accordance with the music/video "entertainment" (DJ/party mode) application example embodiment of the present disclosure.
Figure 6B:
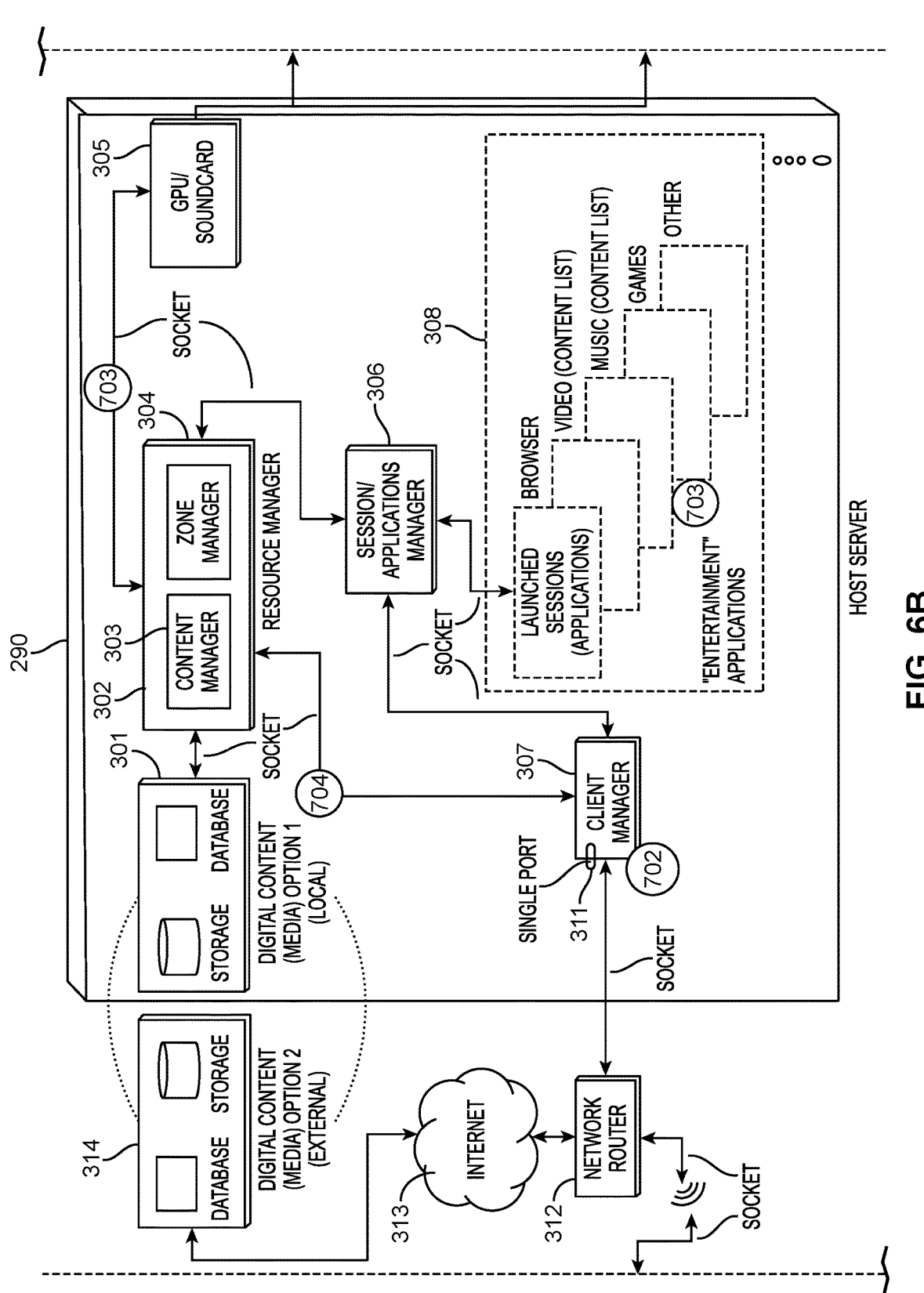
Figure 6C:
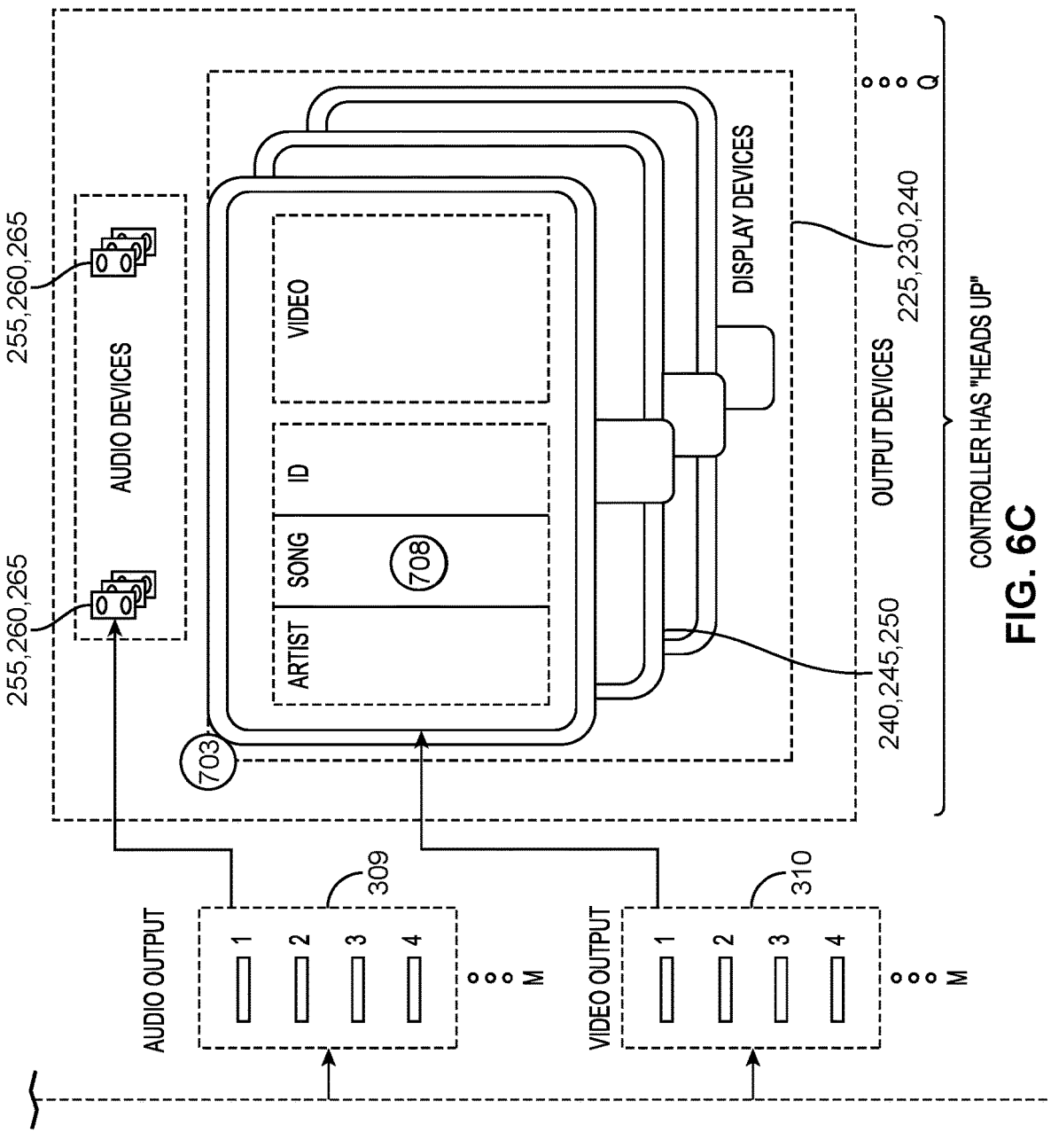
Figure 7:
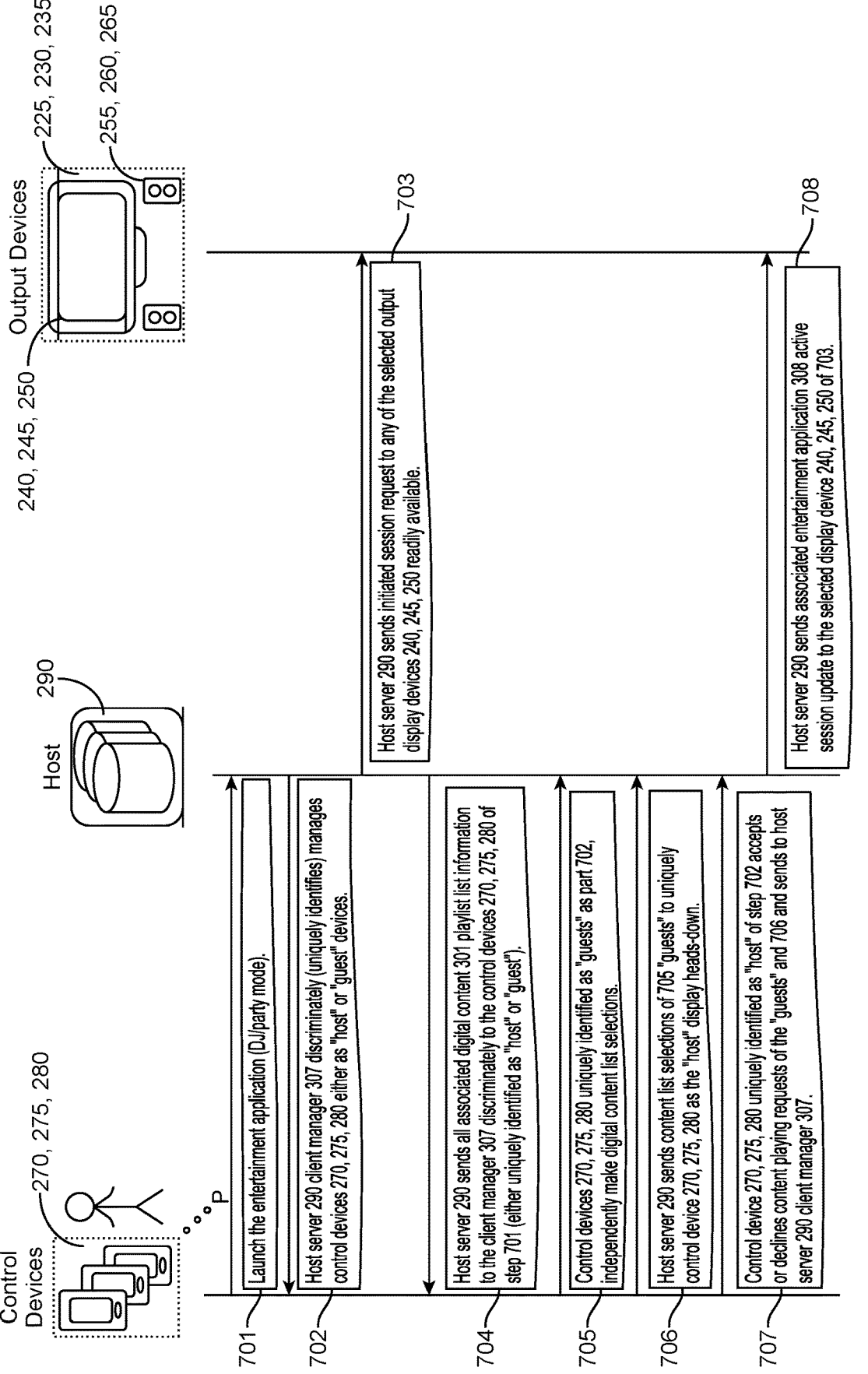
FIG. 7 is a flow diagram of method for managing the separation of digital content from a host server to various control and output devices discriminatively in accordance with the music/video "entertainment" (DJ/party mode) application example embodiment of the present disclosure.

Another novel feature demonstrating the utilization of socket-based communication and the ability of the host server to discriminate how it handles requests by different control devices, is shown in the FIGS. 5A-5C for "parental controls." As shown in step 1 505, control device 1 501, which is uniquely identified as a member of the class "parent" sends a message to the host server 290 requesting the host server play a rated-R movie, using a socket-enabled messaging library which includes sender unique identification in the message text, thus making it identifiable as "parent." Then, the host server 290 receives and parses the message request. In handling the message, the host server 290 uniquely identifies the control device 1 501 and, upon determining that the user is permitted to play rated-R movies, responds by initiating the movie playing session on the network attached display device 503 (lounge left), as shown in step 2 (as shown in FIG. 5B). In contrast, the control application of control device 2-n 502, which is uniquely identified and determined to be in the set "child," may attempt to sent the same request message of step 1 of FIG. 5A as control device 1 501, to the host server 290, with its socket-enabled messaging library inserting its unique identification, as depicted in step 3 507 of FIG. 5C. In a discriminative handling response to the step 3 message request, the host server 290 uniquely identifies the control device 2-n 502 and, upon determining that the user, identified as being in the class of "child" is not permitted to play rated-R movies, does not play the movie selection.

Also, host server managed sessions may include the host server discriminatively managing and communicating with the control devices. A client manager function of the server may communicate specifications related to the activated application sessions such as, but not limited to, permissions/ access, unique identifier, and user. The host may communicate with one control device among a plurality of control devices and with the aforementioned attributes of client manager; the host server may manage the plurality of control devices uniquely to one another. In addition to communicating specification of an application session, the host server communication may also include authorizing a control device to communicate with the host server in response to receiving an initialization request from any of the currently activated control devices. The methods also include accepting a user's selection of any output devices that are shown as available in a heads-down control device screen. The user's selection may be based on at least the status information associated with the plurality of outputs connected to the network system. Further the methods include the host serving activated session content on selected output devices (e.g. audio, video). Also, the methods include management of communication between control device and host server (over a network protocol including socket communication). The communication can be a request-response from the control device to host server, from host server to a control device, a non-discriminative broadcast ("push") communication from the host server to multiple control devices, or a discriminative handling response to multiple control devices. Within the any of the control devices, messages containing session state or other information from a host server may trigger changes in the control devices' user interface aesthetic, layout, and/or behavior. Within a host server, messages from any of the control devices may trigger execution of any number of functions, including manipulations of any number of the output devices (e.g. audio, video).

Additionally, cognizant of the entertainment application method flow (DJ/party mode), there is an inferred (or inherent) dependency from any the control devices with access to the active entertainment session for the viewable selection content information heads-up on the selected output device need to be within the same proximity (zone) to associated output device (display) involved as all participating users will need to view the selectable content heads-up on the output device for a meaningful user experience. Further, the method includes changing the presentation state heads-up in response to receiving a command from a control device and associated device native control gesture movements heads-down. Also, the methods include from the control device that within same proximity (zone) to the session output device and the selectable content items being displayed heads-up, as part of the device native controls and finger movement or gestures, the pointer in view is positioned heads-up over the selectable content of interest and upon control device (user) tap gesture to simulate a selection the host server translates the movement into a command to launch the URL link with the associated selectable content and refreshes the session presentation state to the output device accordingly.

FIGS. 6A-C and 7 represent a flow diagram and method flow for this particular session entertainment application type 308 for a "DJ/Party mode" where host server 290 manages both the separation of content (heads-up on display, heads-down on control devices) and the discriminative utilizations unique to each of the control device 270, 275, 280 to one another in the active session.

At step 701, from any one of the control devices 270, 275, 280 that has access to host server 290, selects any of the application types 308 from a list of readily available application types in a heads-down mode on the control device and launches the session entertainment application type for DJ/party mode.

At step 702, in response to receiving the session application initiation request from any one of the control devices 270, 275, 280 the host server's 290 client manager 307 allows and manages access to the host server via a socket-based inter-process communication (IPC) process. Further, host server 290 uniquely identifies the initiating control device as a "DJ" user to the entertainment application (DJ/party mode) session while any other of the control devices 270, 275, 280 are uniquely identified and record as being members of the class "guest" in the instance of the application session and are discriminatively allowed variant roles defined within the entertainment session type.

At step 703, the host server 290 responds to the session entertainment application 308 initiation request of 702 and is launched in the session/application manager 306 and associated resource manager 302 zone manager 304 sends the initiated session to selected display device 240, 245, 250 readily available.

Next at step 704, the resource manager 302 queries and sends all associated digital content 301 available content information to the session manager 306 which in turn sends the information to the any of the one control devices 270,

275, 280 via client manager 307, sending one message to the control device that initiated the entertainment application 308 request (uniquely identified as "DJ" class) and a different message to all of the control devices 270, 275, 280 of step 703 uniquely identified as "guest" class.

At step 705, from any one of the control devices 270, 275, 280 that has permission/access to communicate to the host server 290, and have been uniquely identified as "guests" as part 702, independently make their own selections from digital content list information 301 of 703 provided by the host server 290 on each of their heads-down displays.

Next, At step 706 the host server 290 resource manager 302 takes each of the uniquely identified "guest" control devices 270, 275, 280 content list selections and sends them to the control device 270, 275, 280 uniquely identified as the "DJ" in 702, all managed by the client manager 307, sends the content item list selections to the "DJ" viewable interface (display heads-down).

At step 707, from the control device of 270, 275, 280 that was identified as "DJ" of step 702, either accepts or declines the content playing requests of either of the "guest" control devices 270, 275, 280 uniquely identified in 704 heads down on the updated interface of 706.

Finally, at step 708 in response to receiving the session application state change request from any one of the control devices 270, 275, 280 uniquely identified as "DJ" in 702, the host server 290 session/application manager 306 entertainment application 308 active session sends update to the selected display device 240, 245, 250 of 703.

Figures 8A, 8B:
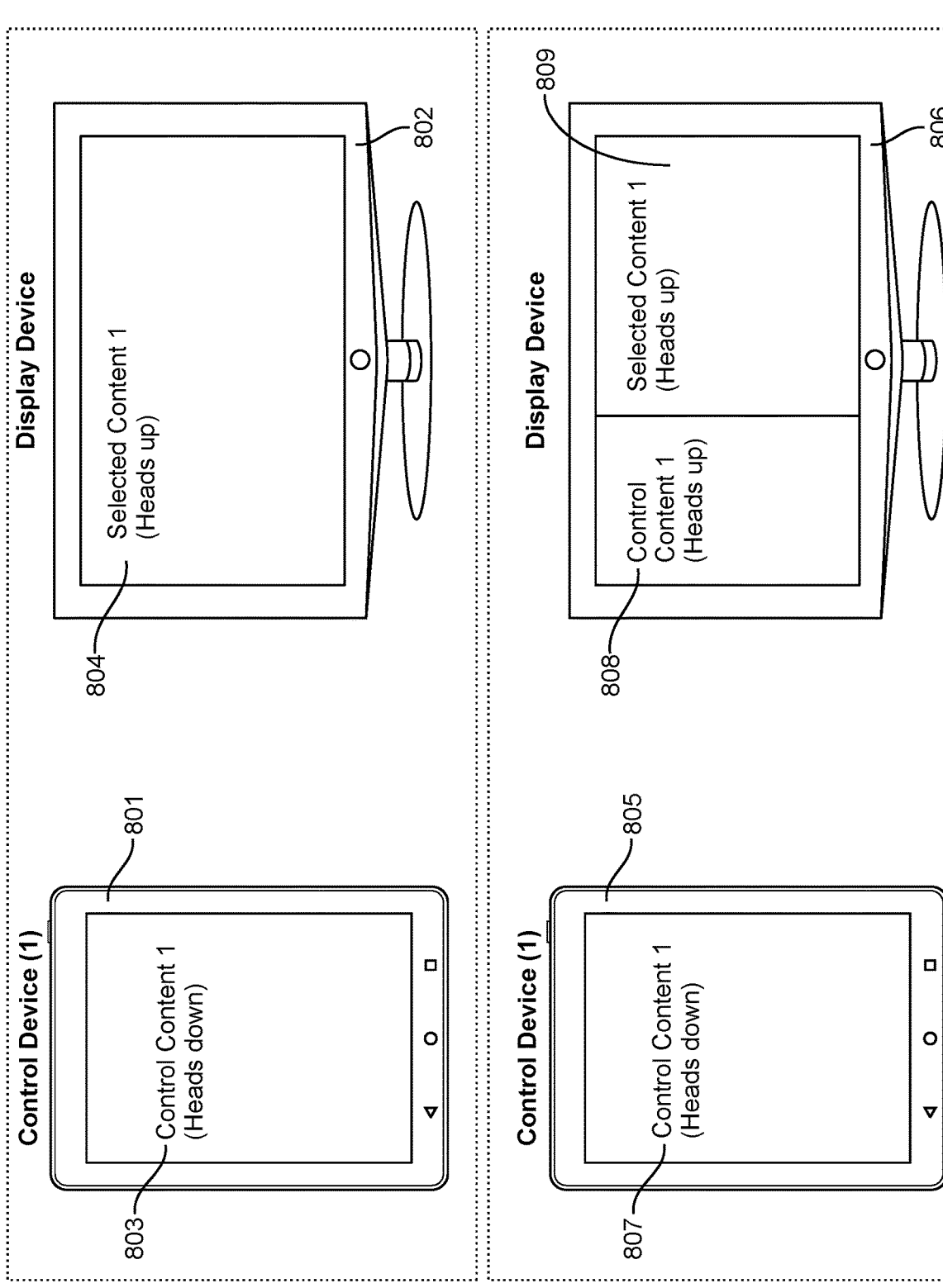
FIGS. 8A-8C are sample interface illustrations of the control device(s) in accordance with various application heads-up and or heads-down example embodiments of the present disclosure.
Figure 8C:
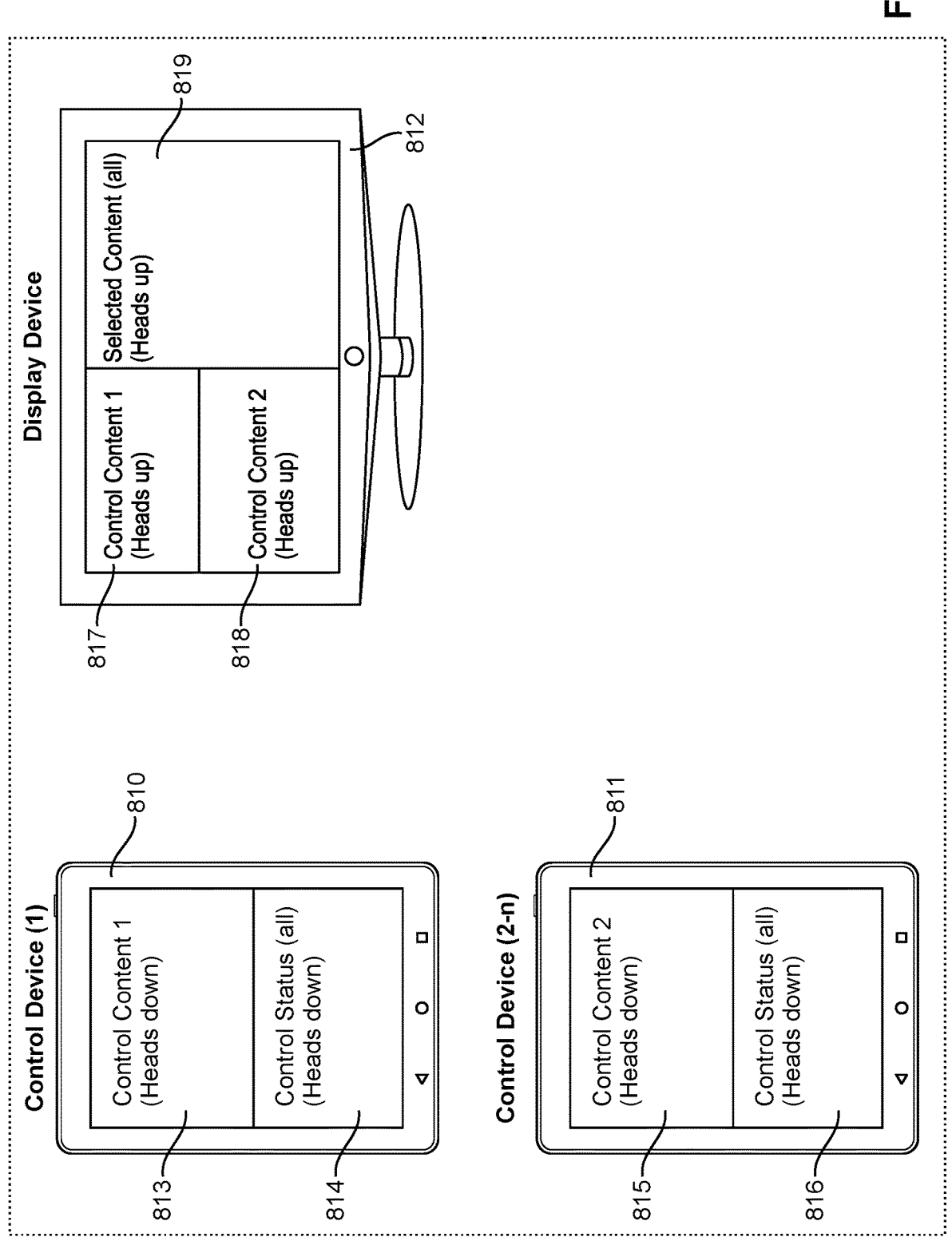

FIGS. 8A-8C exhibits sample scenario types for separation of content and control, cognizant of heads-up (on a display device) and heads-down (on one or more control devices). The main purpose of FIGS. 8A-8C is to show the limitless number of possible scenario implementations for both discriminately and non-discriminately managing content and control between control devices and their display devices within application session themes without requiring focusing on the session context (e.g. specific themes and associated features). More specifically, FIG. 8A depicts an example views of a "single" control device 801 paired with display device 801 where the user of the control device is viewing session control content heads-down 803 (e.g. selectable content from a content list) and, as per selection result, the content is streamed heads-up 804 on display device 802. Another "single" control device example is, as shown in FIG. 8B, where control device 805 is now using the device native features to control the content item selection heads-up 807 on display device 806, where the screen now shows both the user selectable content heads-up 808 and, as per selection outcome, the streamed selected content in the portion of the display labeled as 809. Now, as depicted in FIG. 8C, cognizant of a "plurality" of control devices, are now introduced into a session scenario theme either allowing for content item selection heads-up 817, 818 or for content item selection heads-down 813, 815. Further in the example of FIG. 8C, each control device 810, 811 may be directly associated with a subset of the content being presented out display device 812. In particular, Control device 810 may be limited to directly manipulate content item 817 and control device 811 may be limited to directly manipulate content item 818. These limitations may be based on configuration data for each control device that is used to manage the control session. In another example, control device 810 may be a host participant (e.g. be assigned participant class host) for a control session through which content is presented on display 812. In this example the host participant may have access to one or more content items presented heads up on display device 812 (e.g. content items 817 and content item 819. In addition, control devices 811 (that may include any number of control devices) may each be assigned a guest participant class. Participant class "guest" may be limited to only being able to directly impact content item 818. In this example, each of the "guest" participants may directly impact content item 818 in a non-discriminative mode that treats each of guest participant the same. Further, as depicted in 814 and 816 any of control devices 810, 811 can also be non-discriminately broadcast session state information, such as session control status.

Now, cognizant of the potentially limitless session uses as depicted in FIGS. 8A-8C, FIGS. 9A-9G exhibits a specific session application theme (represented by a flow diagram and method flow of FIGS. 6A-C and 7) by showing the "entertainment" application session interface walk-through point-of-view from the multiple and unique control devices' interfaces, associated with "DJ" and "guest" roles. This socket enabled messaging library for packaging, parsing, sending, and receiving messages between host server and uniquely identifiable control devices.

Figure 9A:
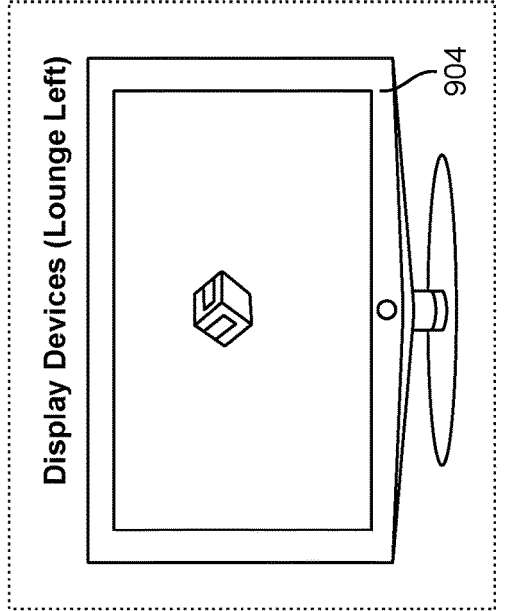
FIGS. 9A-9G are sample discriminative control device(s) interface and output device (user's point-of-view) illustrations in accordance with the music/video "entertainment" (DJ/party mode) application example embodiment of the present disclosure.
Figure 9A:
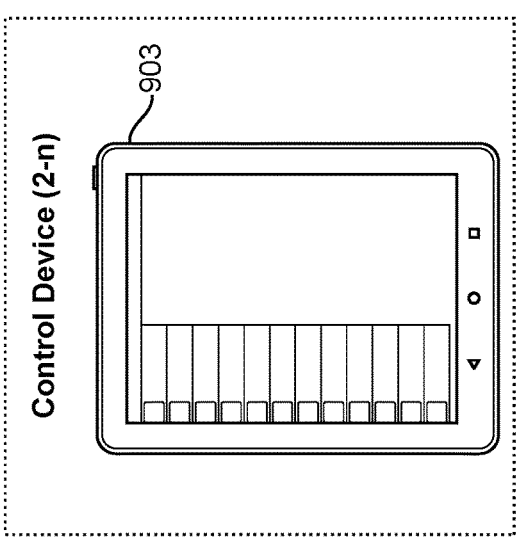
Figure 9A:
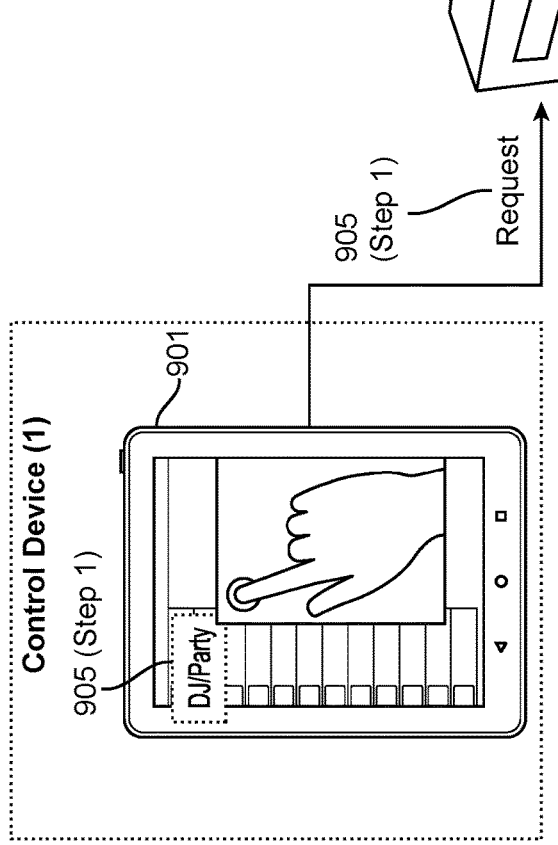
Figure 9A:
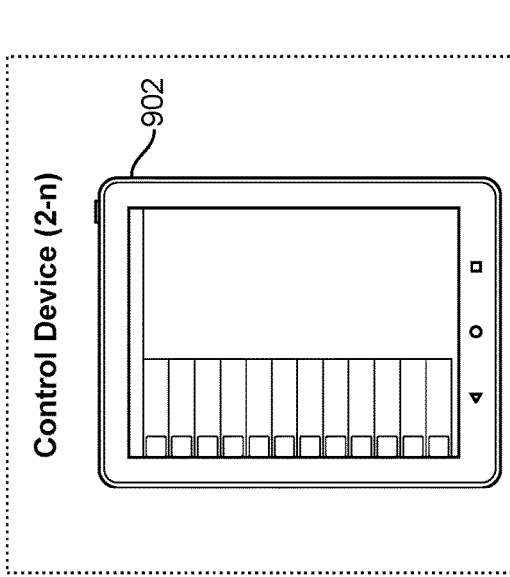

In this example, as shown in FIG. 9A in 905 step 1, control device 1 901 sends a message requesting the host server to initiate an entertainment application (DJ/music mode) session.

Figure 9B:
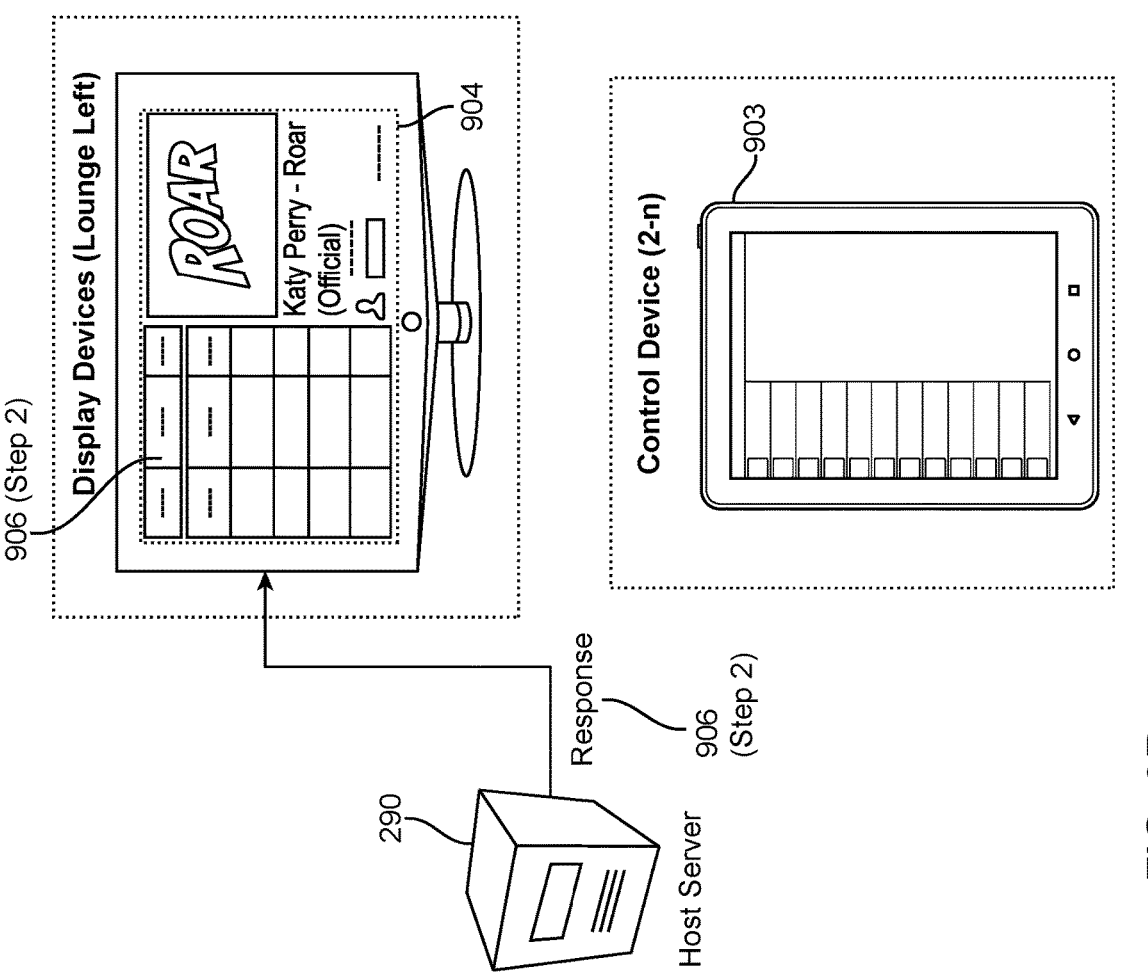
Figure 9B:
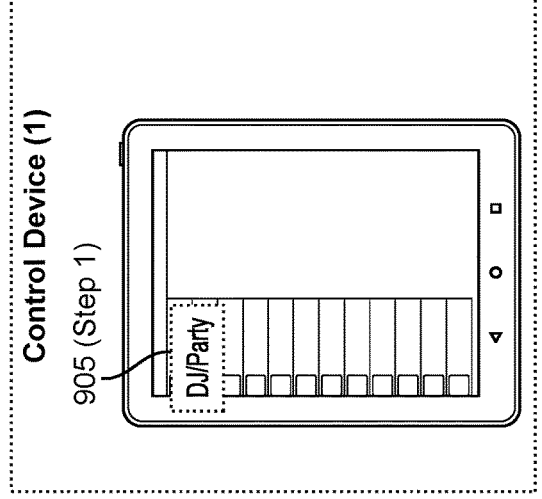
Figure 9B:
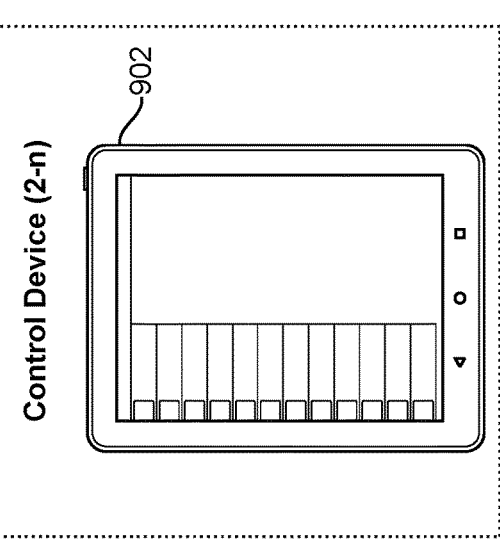

Next, the host server 290 parses and handles the message and, as shown in step 2 906 in FIG. 9B, host server 290 then responds by initiating the entertainment session on the attached output device 904 (display device—lounge left). In the process of initiating the application session, the host server 290 records the initiating control device 901 to be in the class "DJ", and all subsequently joining control devices as being in the class "guest."

Figure 9C:
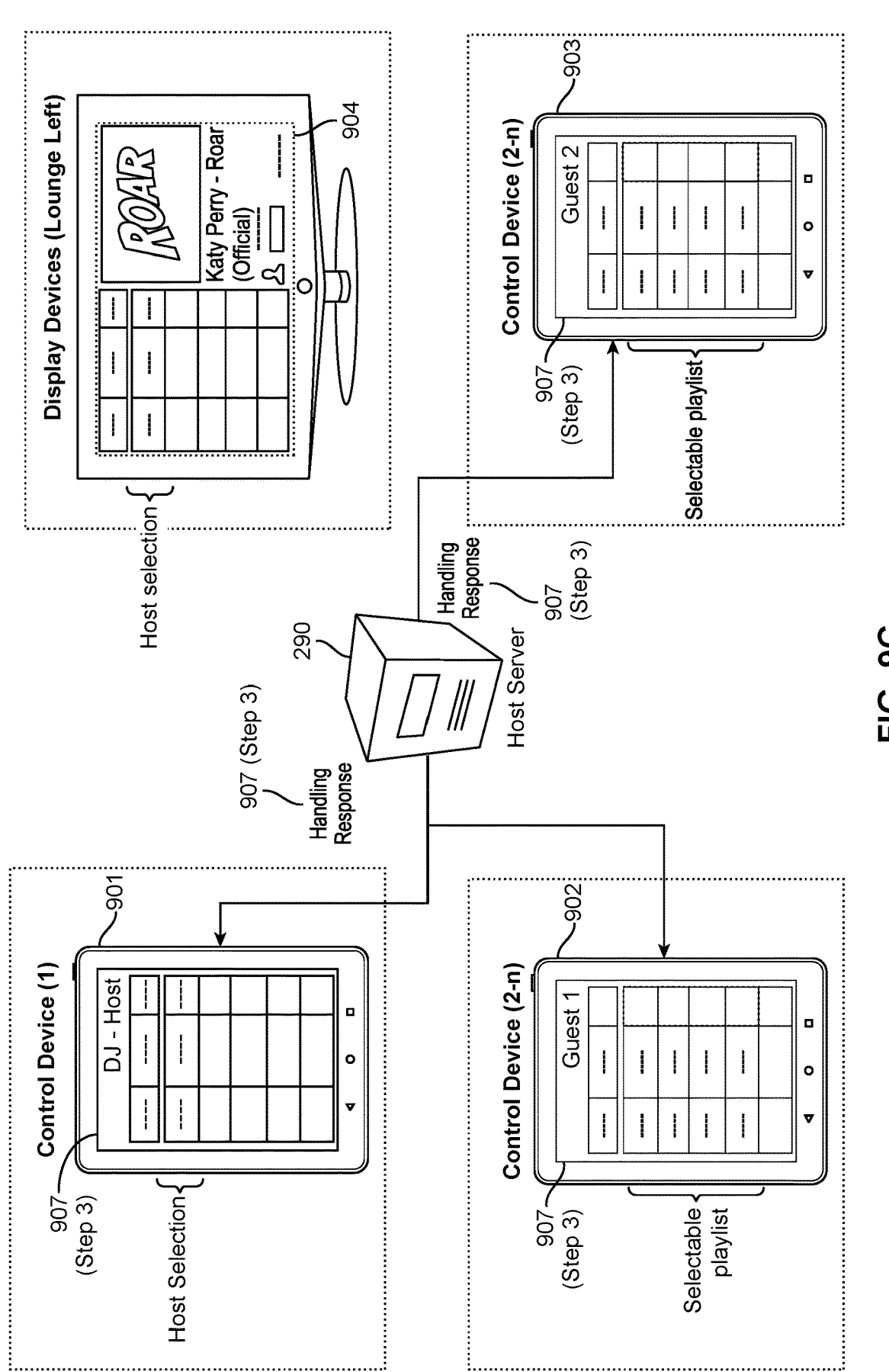

Also, as shown in FIG. 9C step 3 907, the host server 290 continues the response handling by discriminately sending active session state information to all control devices with an active socket connection to the host server 290 which, in this case are control devices 901, 902, and 903. All the control devices 901-903 update their user interfaces to visually indicate the existence of the active entertainment session. Note that in this case, since control device 901 initiated the request, it is uniquely identified as "DJ" within this entertainment session and all other control devices (2-n) 902, 903 are uniquely identified as participants ("guests") to this active session, both of which have unique control input attributes within the session interface as compared to "DJ" control device 901. Note that, while all control devices have the same software, the aesthetic, behavior, and underlying models of their user interfaces are different upon receiving different messages from the host server: Those identified as being in the "DJ" class have an interface displaying a content table with an "ID" column to indicate preferences of various guests and responds to taps by requesting the host server 290 to add a song to the playlist; those identified as being in the "guest" class are given an interface which includes all content options, displays a column to indicate whether or not that particular control device has already voted for a song, and messages the host server a vote for a song upon selection of that song.

Figure 9D:
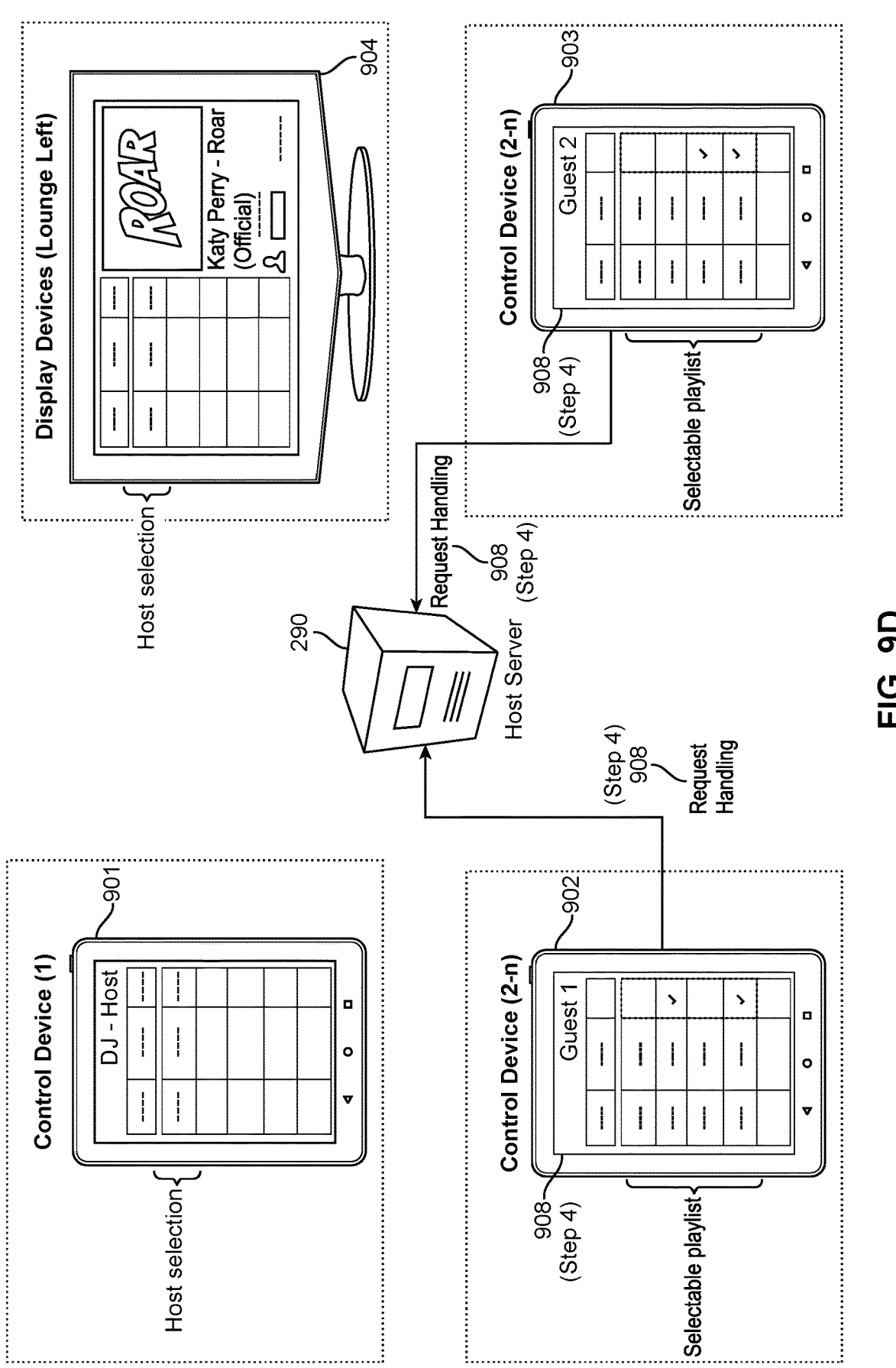

Next, in FIG. 9D step 4 908, either of control devices (2-n) make unique requests from the provided selectable content options by "checking" off the specific songs of which they would like to be played next within the entertainment application session as depicted on their interfaces, which uniquely instruct control devices 902, 903 to message the host server 290 of their unique selection requests.

Figure 9E:
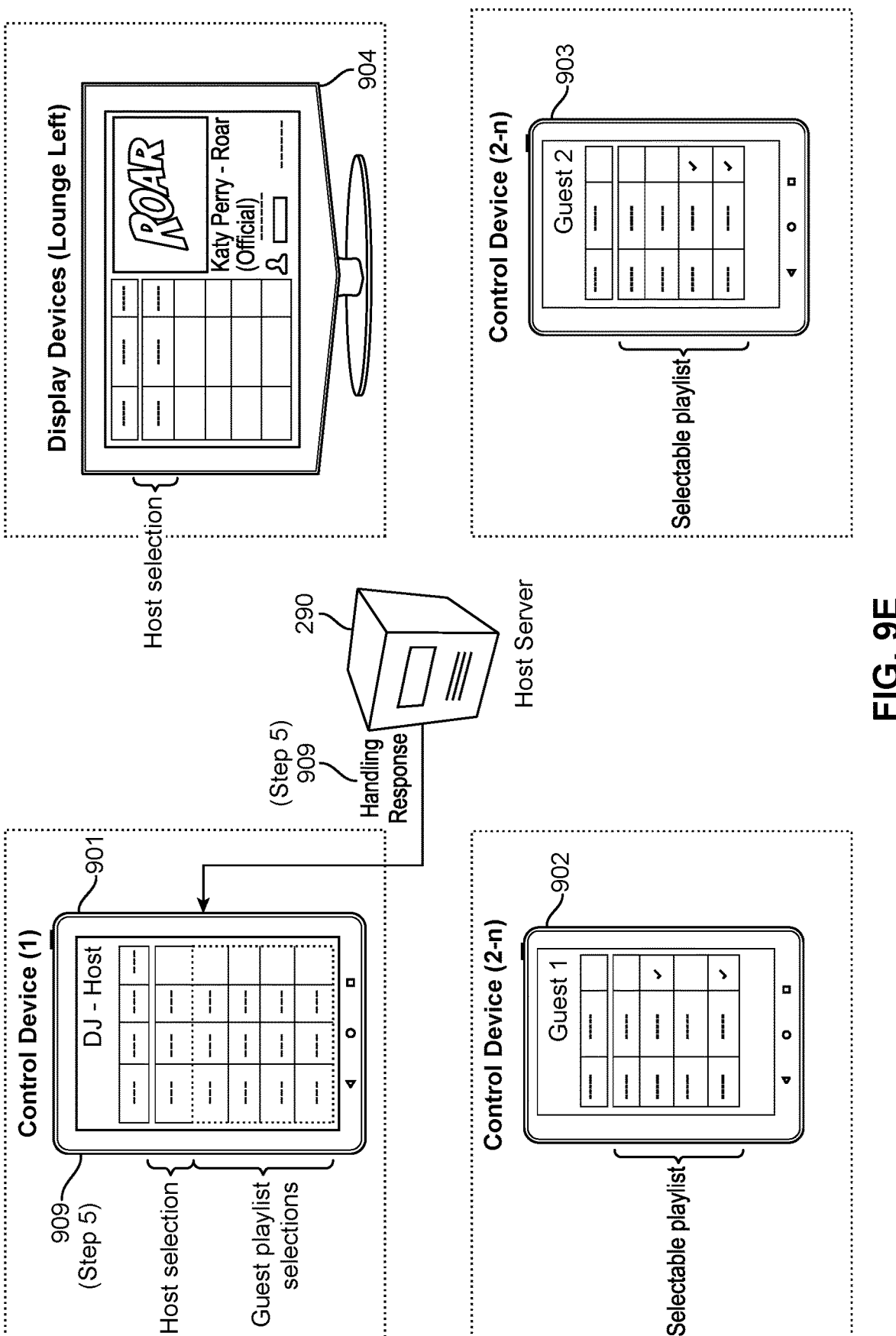

As shown in FIG. 9E step 5 909, the host server 290 parses and handles the message request of step 4 908. The application session handles the message by identifying the sender as a guest, updating its underlying models to indicate the votes described in the message, and sending a new message to only the control devices of the class "DJ." Upon receiving the message in step 5, a control device of the class "DJ" 901 updates its user interface to indicate the new information.

Figure 9F:
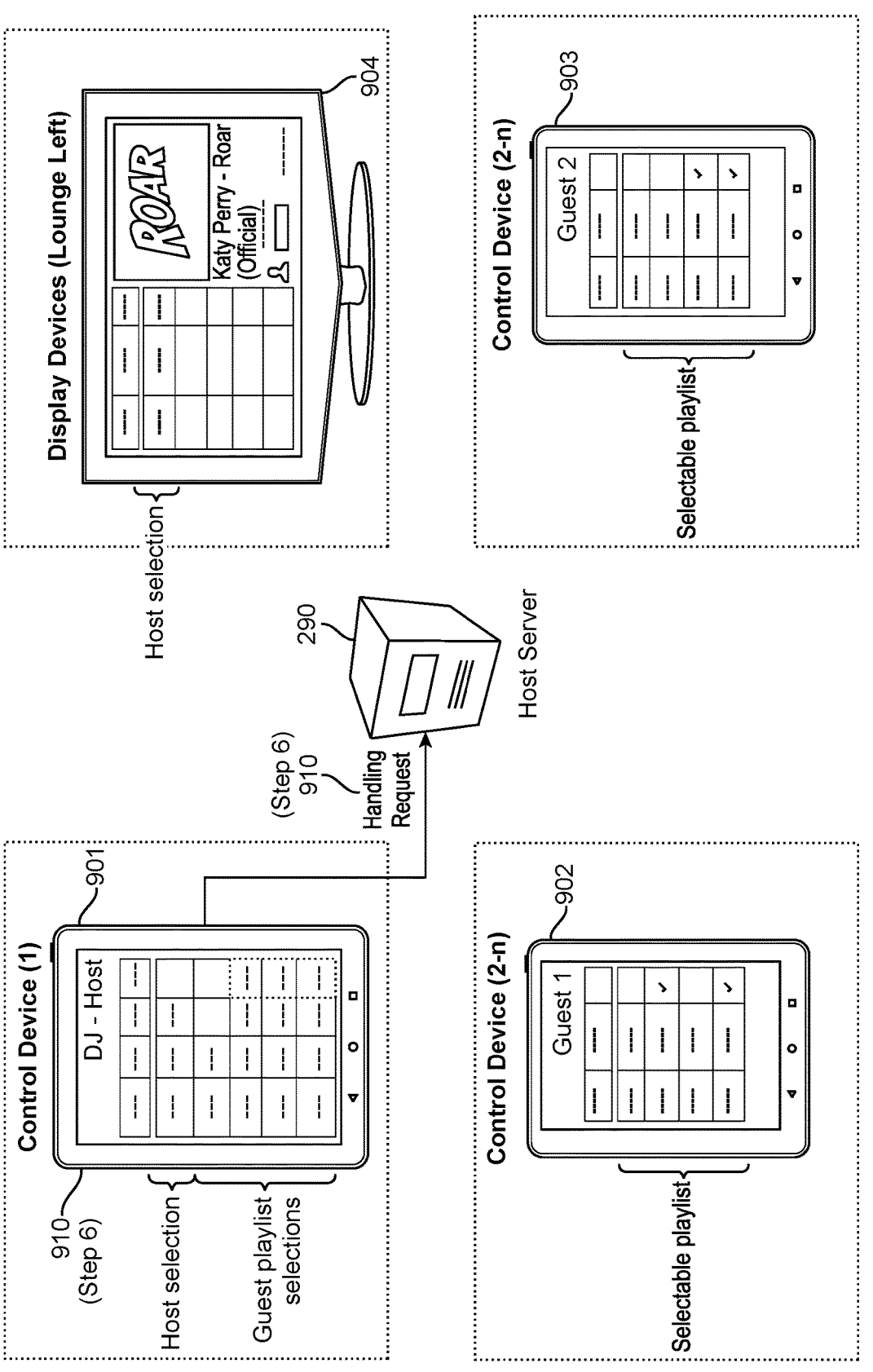

Next, in FIG. 9F step 6 910, as the "DJ" (primary controller of the entertainment application session), the user selects from the control devices 902, 903 requests of step 4 908 by either accepting (checking "yes"), or declining (checking ("no") the songs to be added to the heads-up active playlist on display device 904 (lounge left) to be played next, which instructs the control device 901 to message host server 290 the updated message handling request.

Figure 9G:
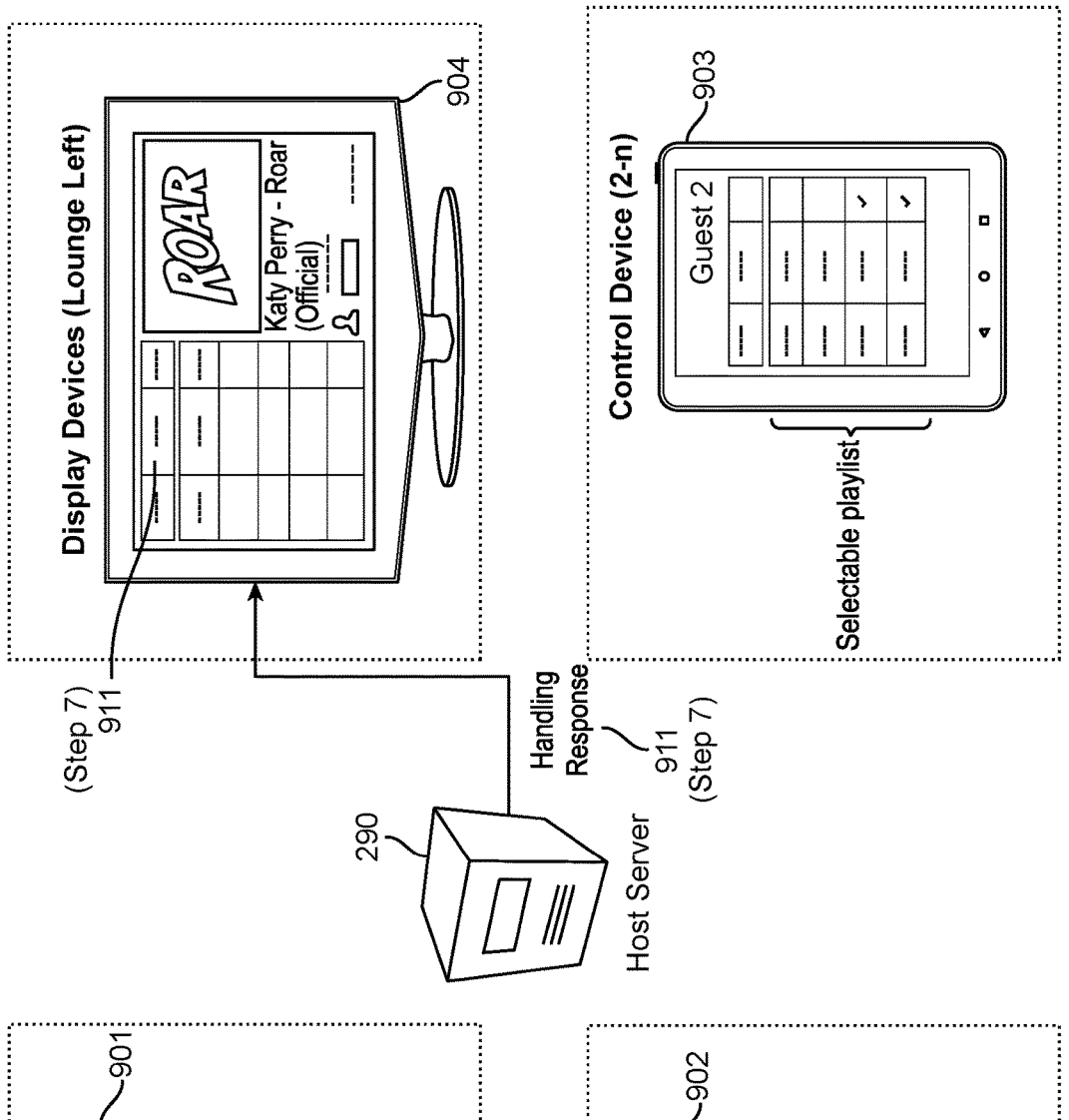
Figure 9G:
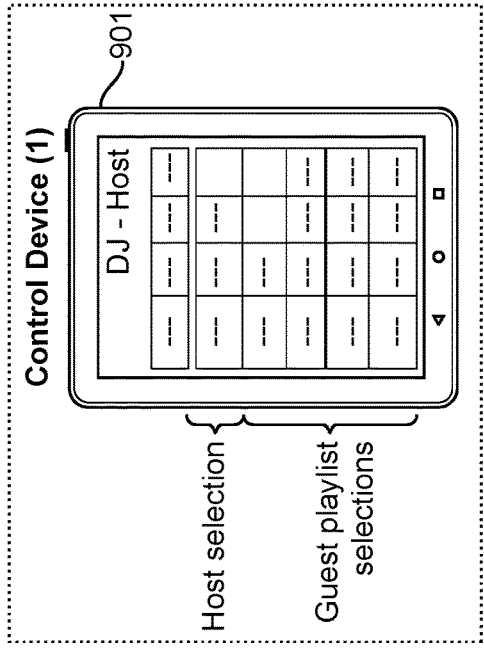
Figure 9G:
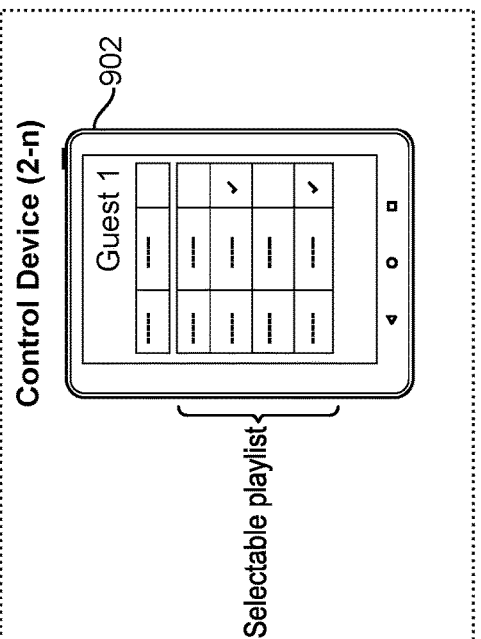

In FIG. 9G, the host server 290 receives the step 6 910 handling request message string encoded in a parsable format (including control device 901 sender unique identification as "DJ" controller) with its socket-enabled message parsing library and responds by updated the entertainment session status heads-up on display device 904 (lounge left) as depicted in step 7 911.

FIGS. 10A-10H further exhibit details of the represented discriminative control device method of host server management with interface walkthrough by showing a gaming application session (Texas Hold'em) point-of-view from multiple and unique control devices' interfaces, associated with unique identifier, or player roles. This socket enabled messaging library for packaging, parsing, sending, and receiving messages between host server and uniquely identifiable control devices.

Figure 10A:
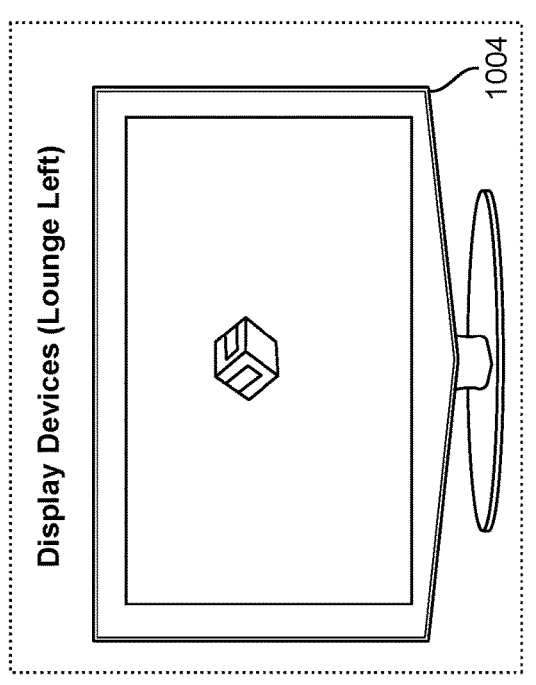
FIGS. 10A-10H are sample discriminative control device(s) interface and output device (user's point-of-view) illustrations in accordance with the games (Texas Hold'em) application session example embodiment of the present disclosure.
Figure 10A:
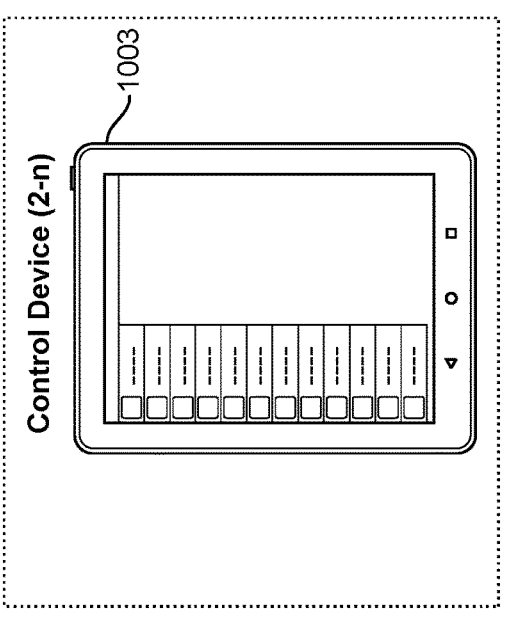
Figure 10A:
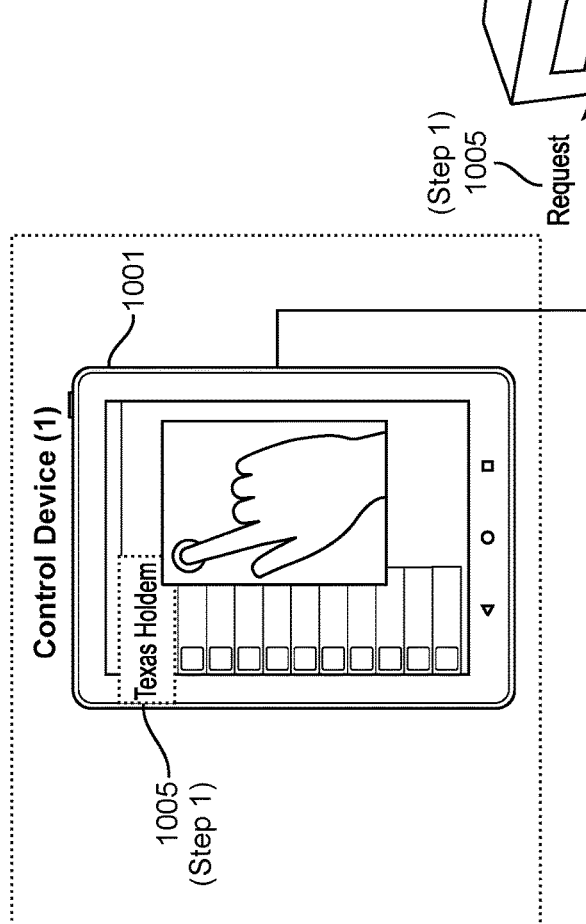
Figure 10A:
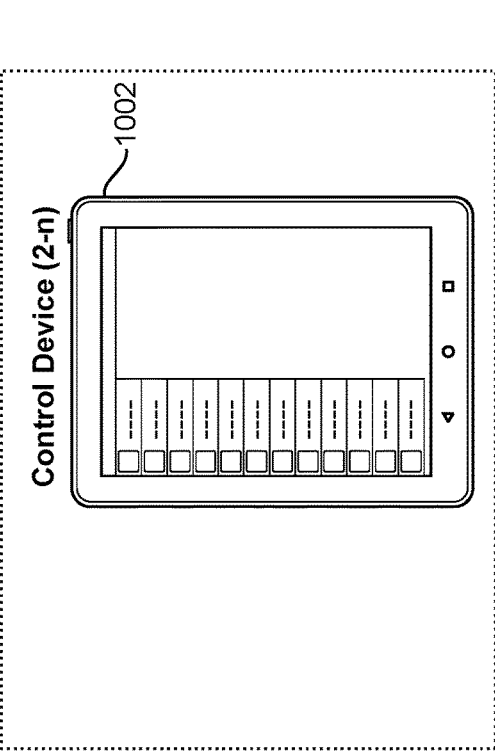
Figure 10B:
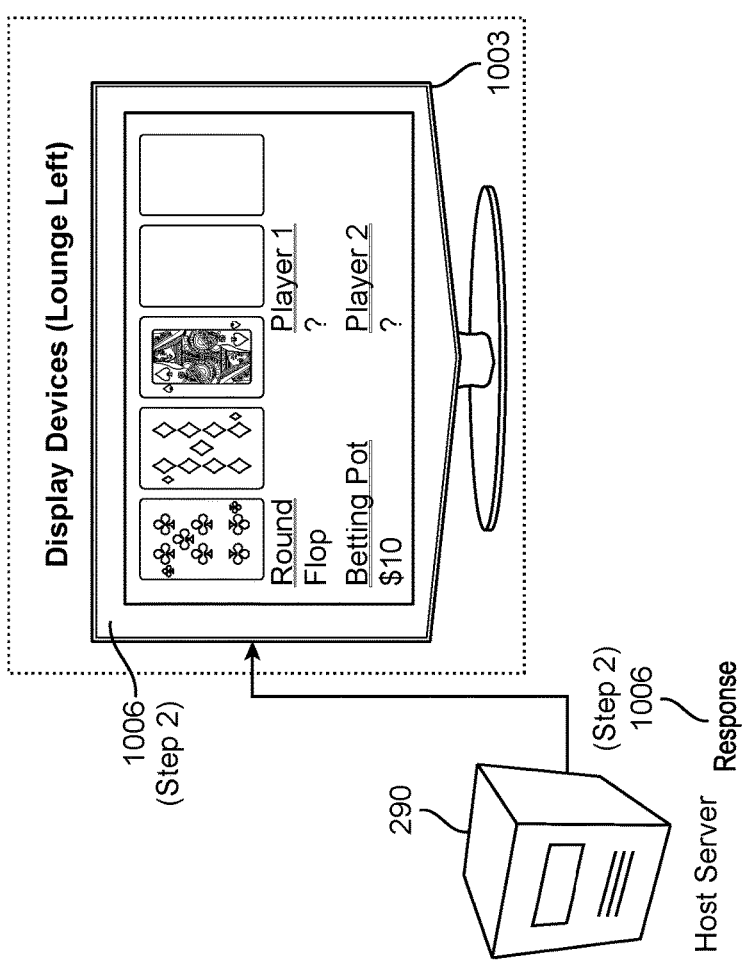
Figure 10B:
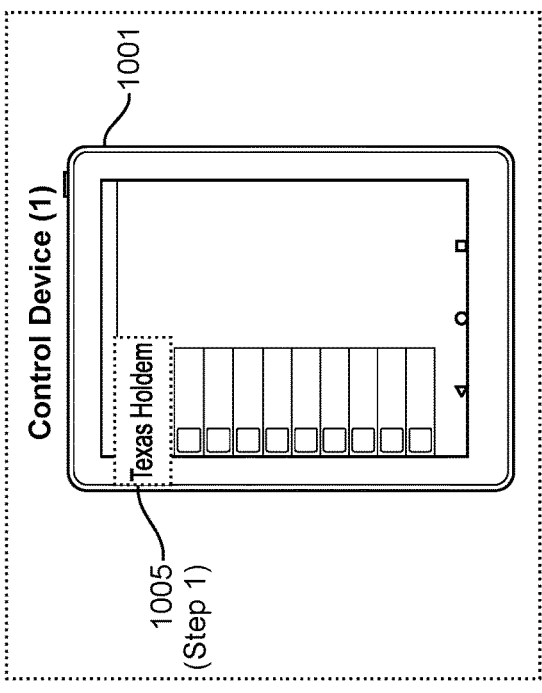
Figure 10B:
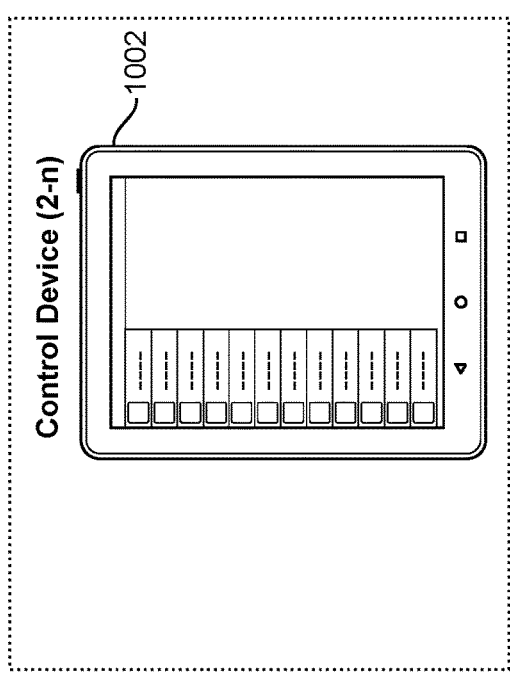

In this example, as shown in FIG. 10A in 1005 step 1, control device 1 1001 sends a message requesting the host server 290 to initiate a gaming application (Texas Hold'em) session. Next, the host server 290 parses and handles the message and, as shown in step 2 1006 in FIG. 10B, host server 290 then responds by initiating the Texas Hold'em gaming session on the attached output device 1003 (display device—lounge left).

Figure 10C:
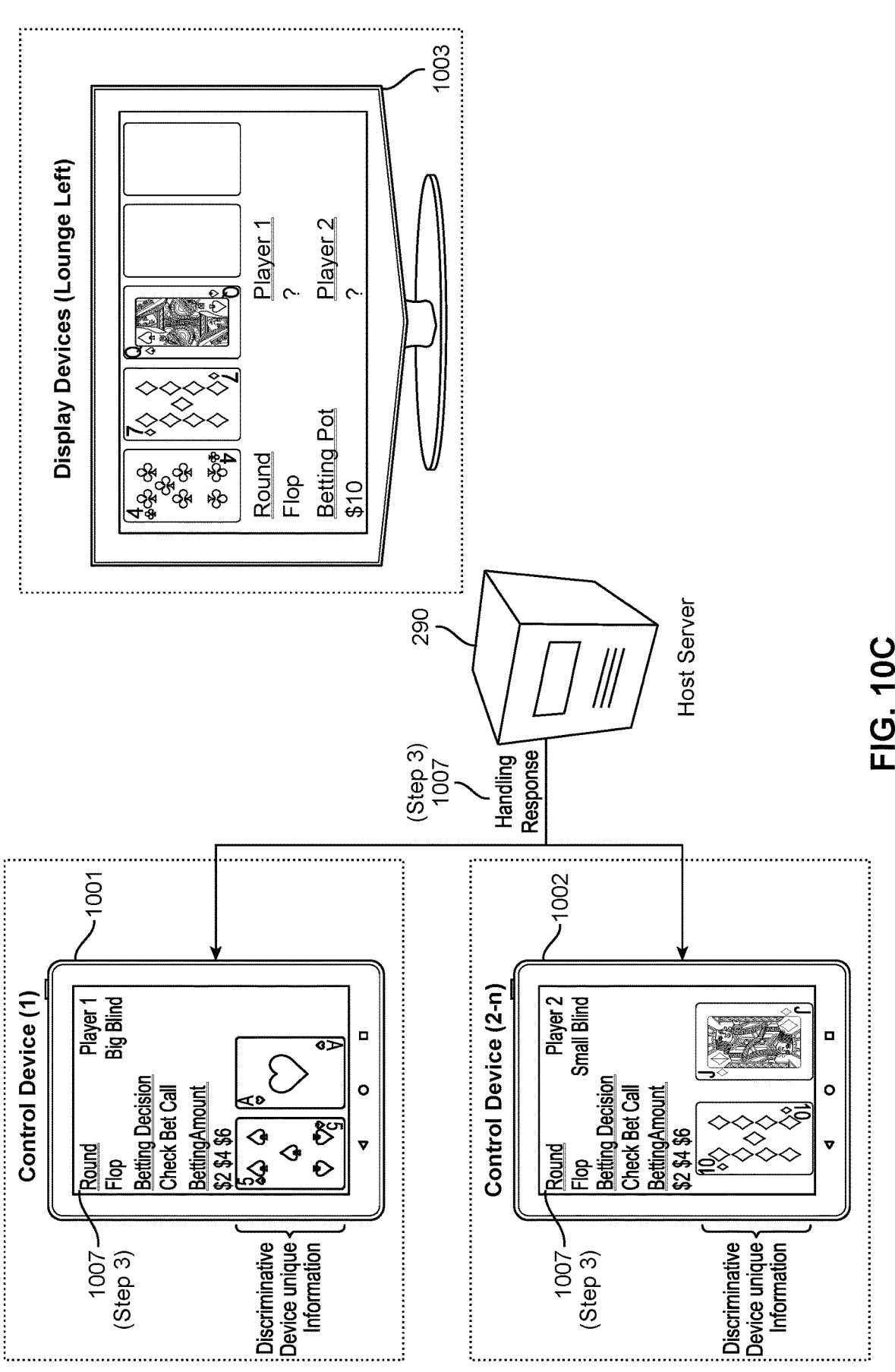

Also, as shown in FIG. 10C step 3 1007, the host server 290 continues the response handling by discriminately sending active game session state information to all control devices with an active socket connection to the host server 290 which, in this case are control devices 1001 and 1002. All the, control devices 1001 and 1002 update their user interfaces to visually indicate the existence of the active Texas Hold'em gaming session based on their unique identifiers. Note that in this case, since control device 1001 initiated the request, it is uniquely identified as "player 1—big blind" within this gaming session and the other control device 1002 is uniquely identified as "player 2—small blind" in this active session, both of which have unique control input attributes within the session interface as per the typical rules associated with Texas Hold'em and player roles.

Figure 10D:
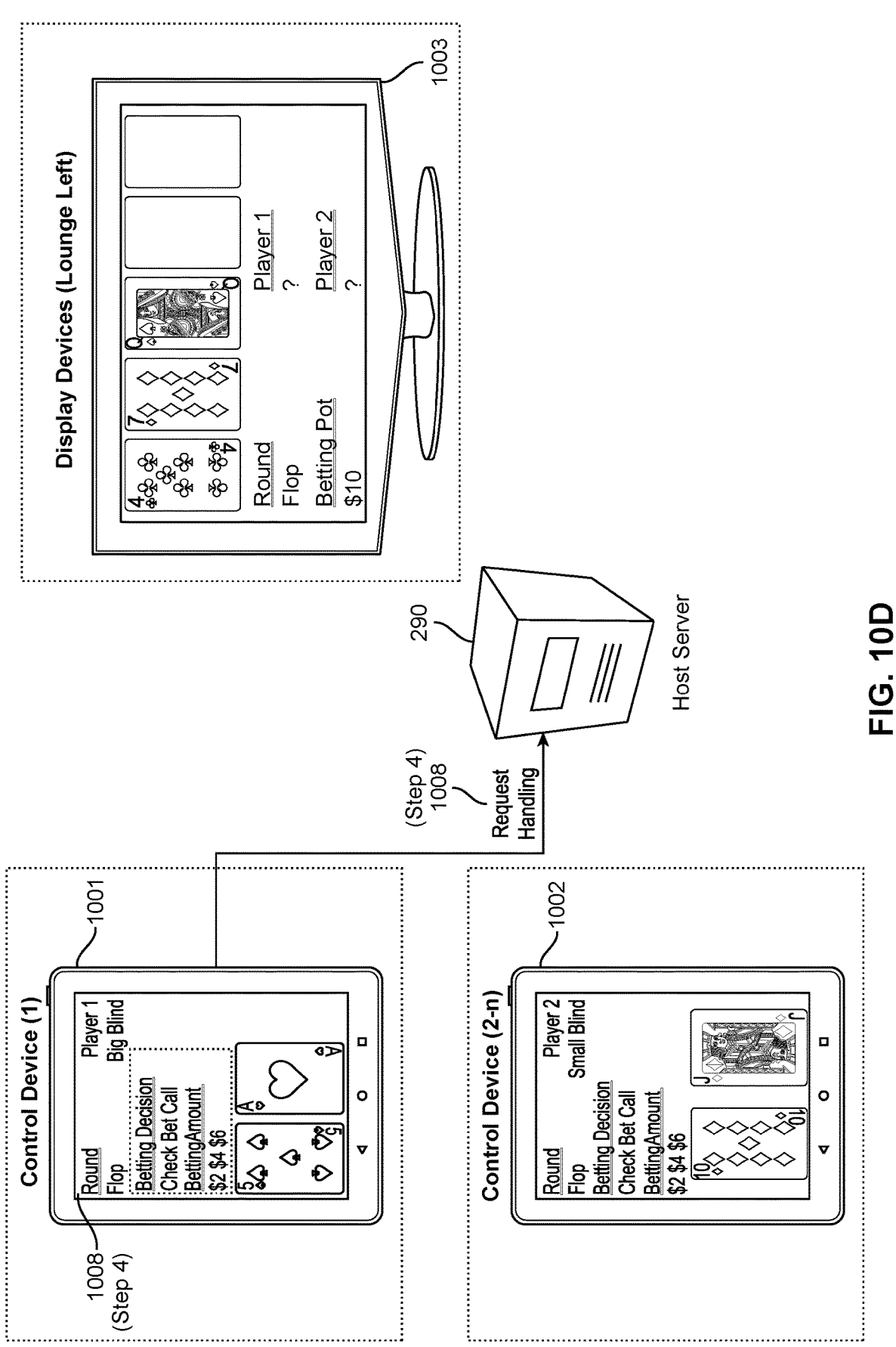

Next, in FIG. 10D step 4 1008, control device 1 1001, now uniquely identified as "player 1—big blind," looks at the interface refreshed with the associated session state information updates of step 3 1007 and makes a decision, in this case to bet $4.00 by tapping both the "bet" and "$4" buttons. Next, as per selection, control device 1 1001 uniquely translates the instructions and messages the host server 290 the active gaming session updates as per handling request step 4 1008.

Figure 10E:
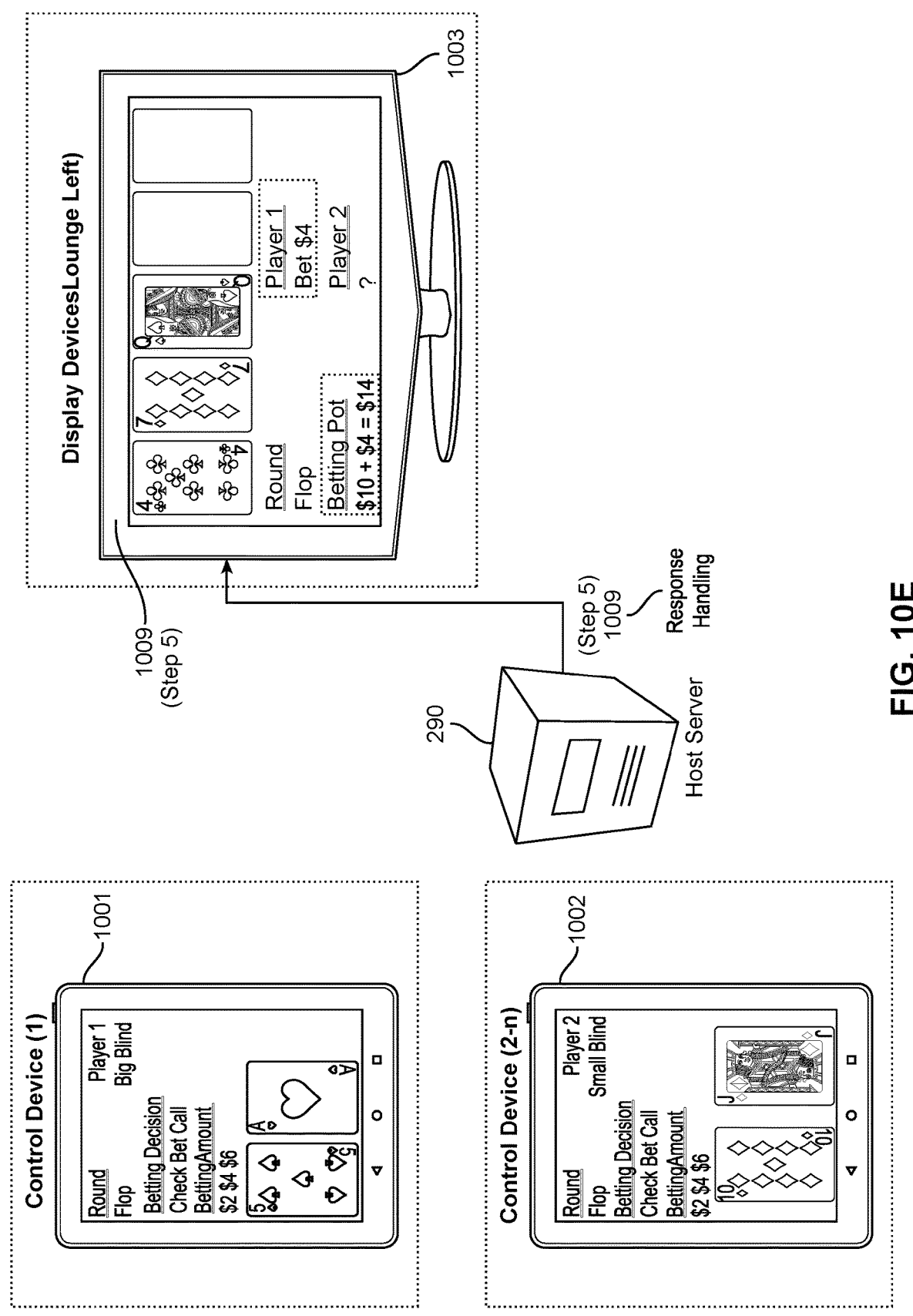

As shown in FIG. 10E step 5 1009 the host server 290 takes the step 4 1008 handling request message string encoded in a parsable format (including control device 1 1001 sender unique identification as "player 1—big blind") with its socket-enabled message parsing library and responds by updating the gaming session status heads-up on the display device 1003 (lounge left). More specifically, the "player 1—big blind" bet of $4.00, betting pot update (from $10.00 to $4.00) and round status of "flop" are all shown on the screen for all players to see.

Figure 10F:
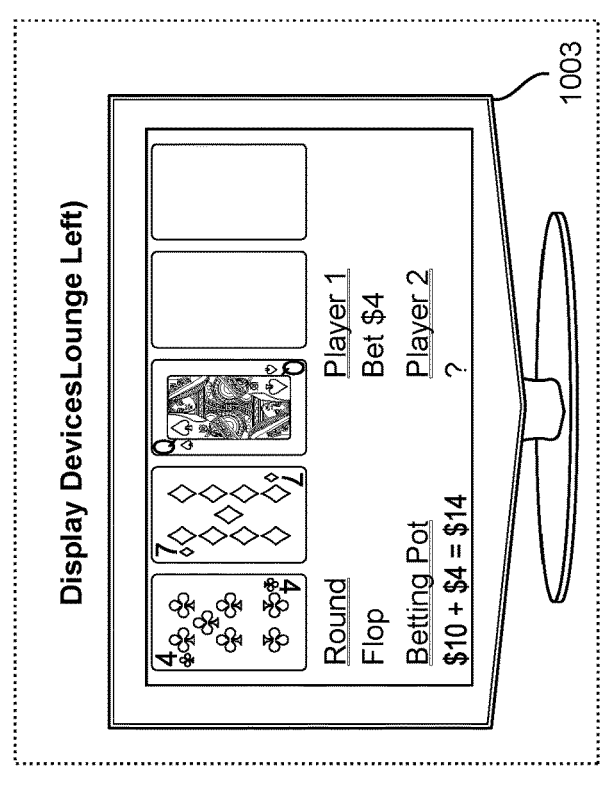
Figure 10F:
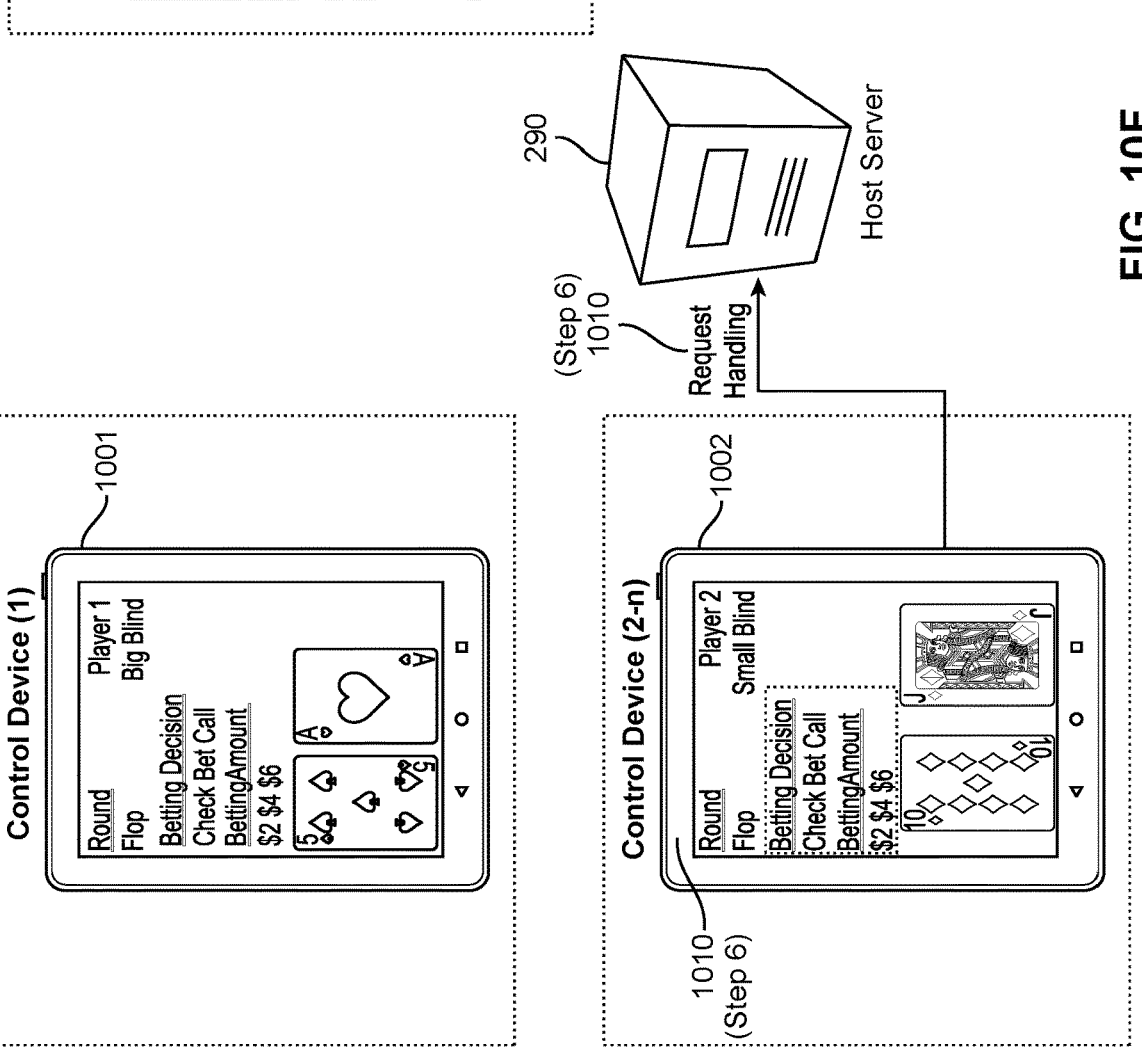

Next, in FIG. 10F step 1010, "player 2—small blind" (in this case uniquely identified as control device 2-n 1002), looks heads-down at the refreshed interface with associated session state information updates and heads up at display device 1003 "player 1—big blind" response as depicted in previous step 5 1009 and makes their own decision. In this case "player 2—small blind" decisions is to "call" and match the "player 1—big blind" of $4 by tapping the associated interface buttons. Next, as per selection, control device 2-n 1002 uniquely translates the instructions and messages the host server 290 the active gaming session updates as per handling request step 6 1010.

Figure 10G:
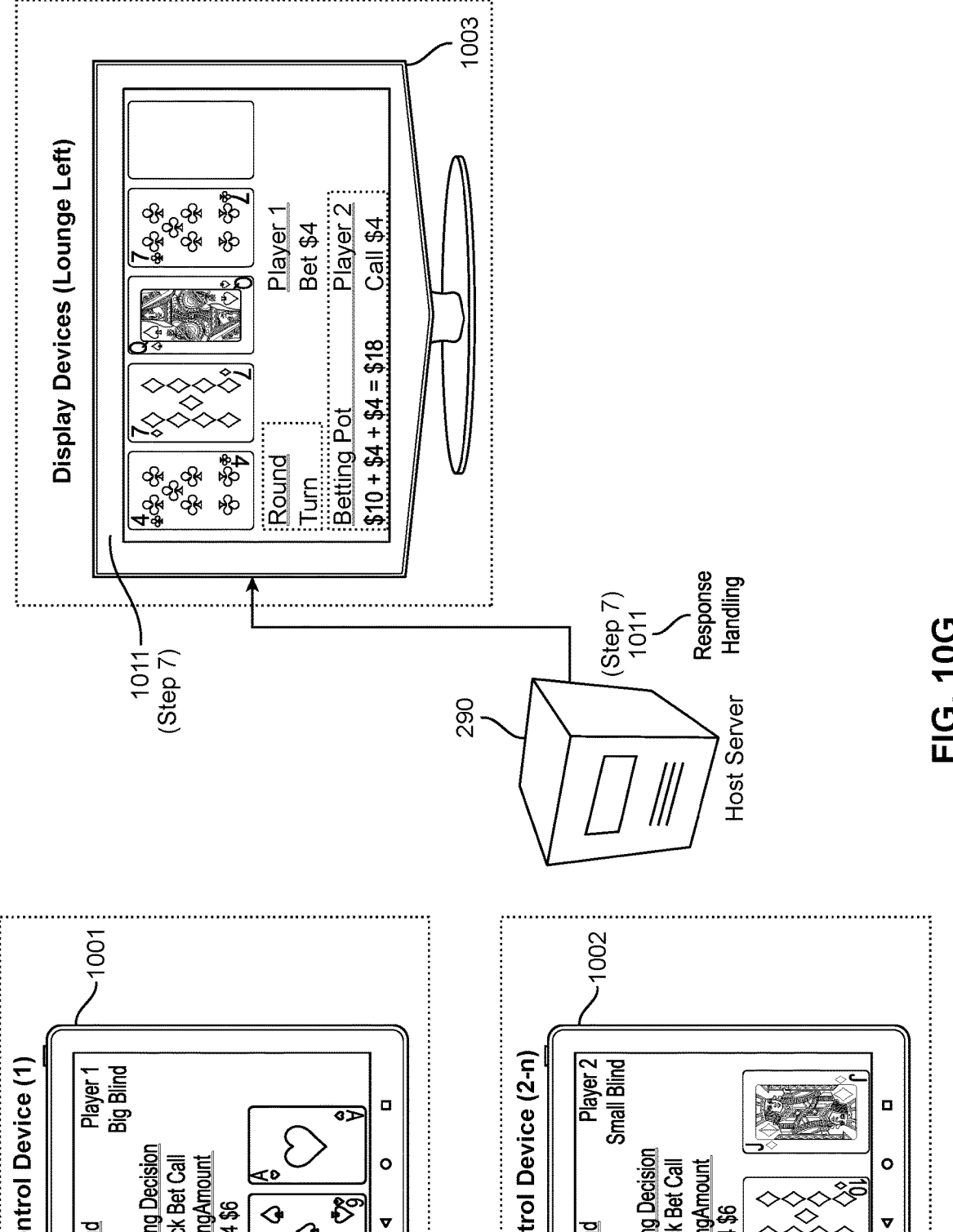

As shown in FIG. 10G step 7 1011 the host server 290 takes the step 6 1010 handling request message string encoded in a parsable format (including control device 2-n 1002 sender unique identification as "player 2—small blind") with its socket-enabled message parsing library and responds by updating the gaming session status heads-up on the display device 1003 (lounge left). More specifically, the "player 2—small blind" response of $4.00, betting pot update (from $14.00 to $18.00), fourth dealer card (seven of clubs), and updated round status of "turn," all of which are displayed for all players to see heads-up.

Figure 10H:
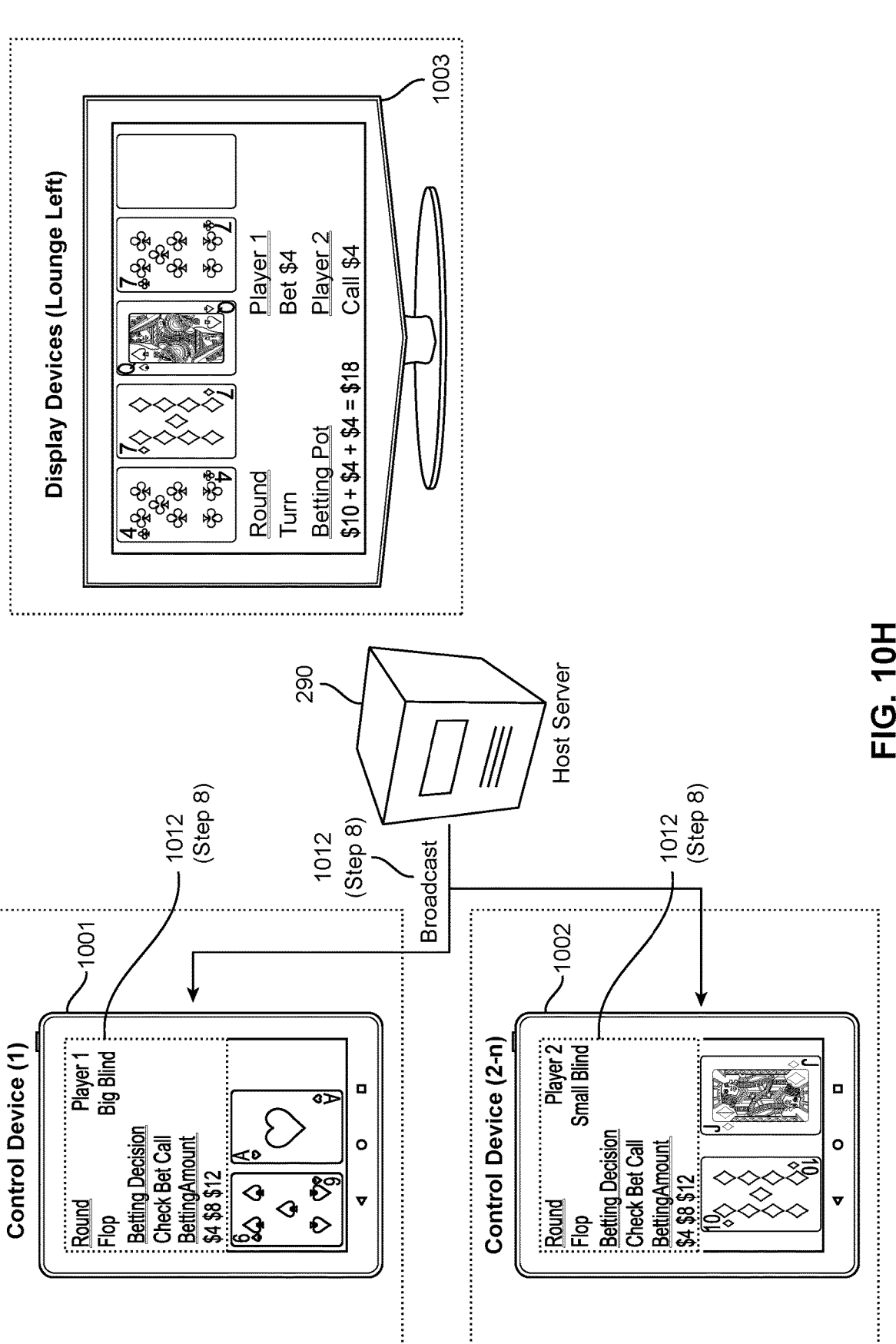

Next, in FIG. 10H step 8 1012, the host server 290 non-discriminately response handles (broadcasts) the associated active game session state information updated to all control devices with an active socket connection to the host server 290 which, in this case are control devices 1001 and 1002. All the control devices 1001 and 1002 update their user interfaces to visually indicate the updates, more specifically the round "turn" and associated betting increment (to $4.00, $8.00, $12.00) updates.

Figure 11A:
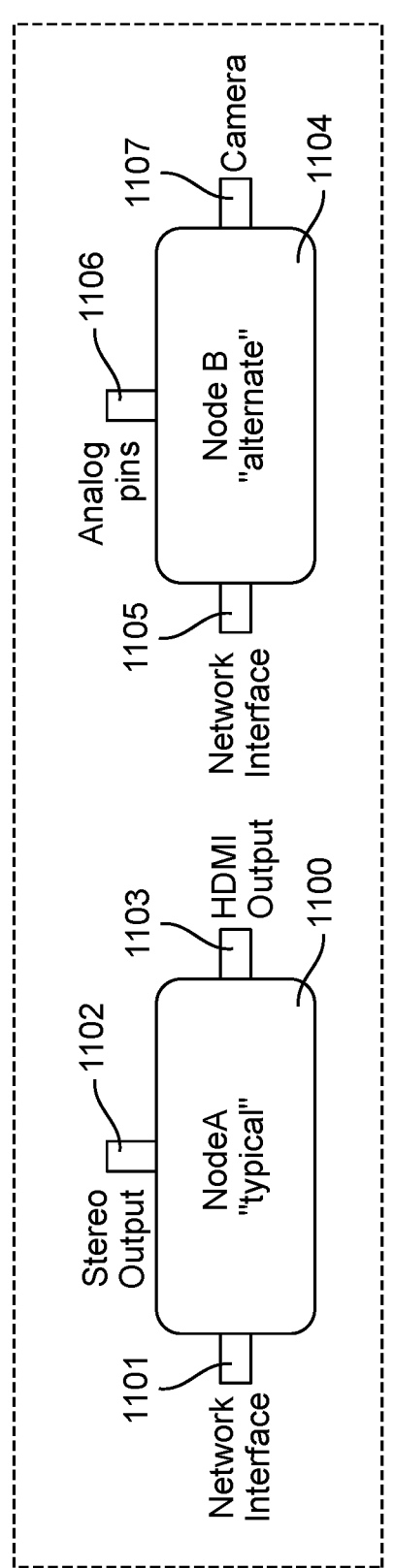
FIGS. 11A-11D illustrates examples of the key embodiments within the invention as associated with an example node for loading resources.

In an embodiment, a node is capable of loading resources. FIG. 11A depicts two nodes which are 1) a typical node A 1100 comprising a network interface 1101, an audio or stereo output 1102, and an HDMI or video output 1103 and 2) an alternate node B 1104 comprising a network interface 1105, analog IO pins 1106, and a camera 1107. In this example, the nodes 1100, 1104 use a Linux operating system. Various resource loading processes may be triggered as a part of the node boot sequence, periodically, by an event such as a D-Bus event, upon application initialization, upon message reception, or any other time. Resource loading processes load and organize a node's resource loading, loading IO peripherals, available applications, and connections to other nodes on the network. Any resource loading process or sub-process may be executed independently, at the same or different times, by any number of triggers. The resource loading process may consist of various other device-specific or IO peripheral-specific processes such as initializing analog pins, determining system architecture, or loading device drivers, but the minimum requirement is discovery of the peripheral resources, installed application resources, and network resources.

Figure 11B:
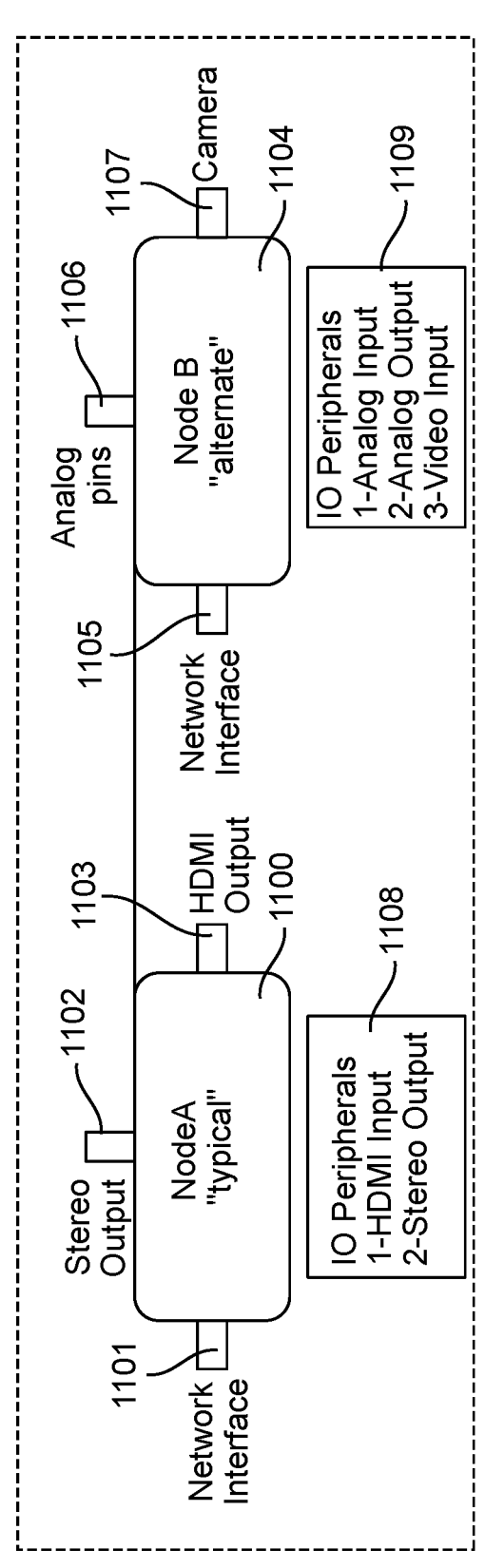

FIG. 11B depicts a possible resource loading processes for discovering, loading, and/or organizing IO peripherals, etc. Any node, or combinations thereof (e.g. in this figure nodes are represented as "typical" 1100 and "alternate" 1400 nodes) having software list of IO peripherals 1108, 1109 available. Note that before the resource loading initialization process begins, the core software within any node is initially empty in the "before" list. Then, in the sequence of commands is executed. In command 1, both nodes query their audio managing software (e.g. ALSA) for available audio output devices, and load discovered audio-out devices are configured and saved in their respective IO peripherals, as shown in 1108 and 1109. As depicted in this FIG. 11B, only node A 1100 discovers stereo output peripherals 1102. In command 2 any node (e.g. node A 1100 and node B 1104) queries their kernel PCI managing software to discover any HDMI outputs and add any discovered HDMI output peripherals to their respective IO peripheral lists (1108, 1109). Further note that only node A 1100 discovers HDMI output peripherals 1103. Next, in command 3 any node (e.g. node A 1100 and node B 1104) queries their operating systems for analog pins and add any discovered analog pin peripherals to their respective IO peripheral lists (1108, 1109). In this example, only node B 1104 discovers analog pins 1106, and further discovers that they are both capable of input and output 1109. In command 4, the any of the nodes (e.g. node A 1100 and node B 1104) queries their kernels for USB cameras and add any discovered cameras to their respective IO peripheral lists (1108, 1109). In this example, only node B 1104 discovers a camera 1107. The resulting IO peripherals lists 1108, 1109 are depicted in the "After" list. Each node's IO peripheral list 1108, 1109 are available as a resource to other software on each of the any other local nodes (e.g. node A 1100 and node B 1104), as well as other nodes via a node-capable messaging library that are not local. Note that an IO peripheral loading process may be run at any time (e.g. run the commands each time D-Bus alerts the connection of a new hardware device), may include more or fewer steps (e.g. starting ALSA could be a step), and may be device-specific (e.g. a node could have different code than another node).

Figure 11C:
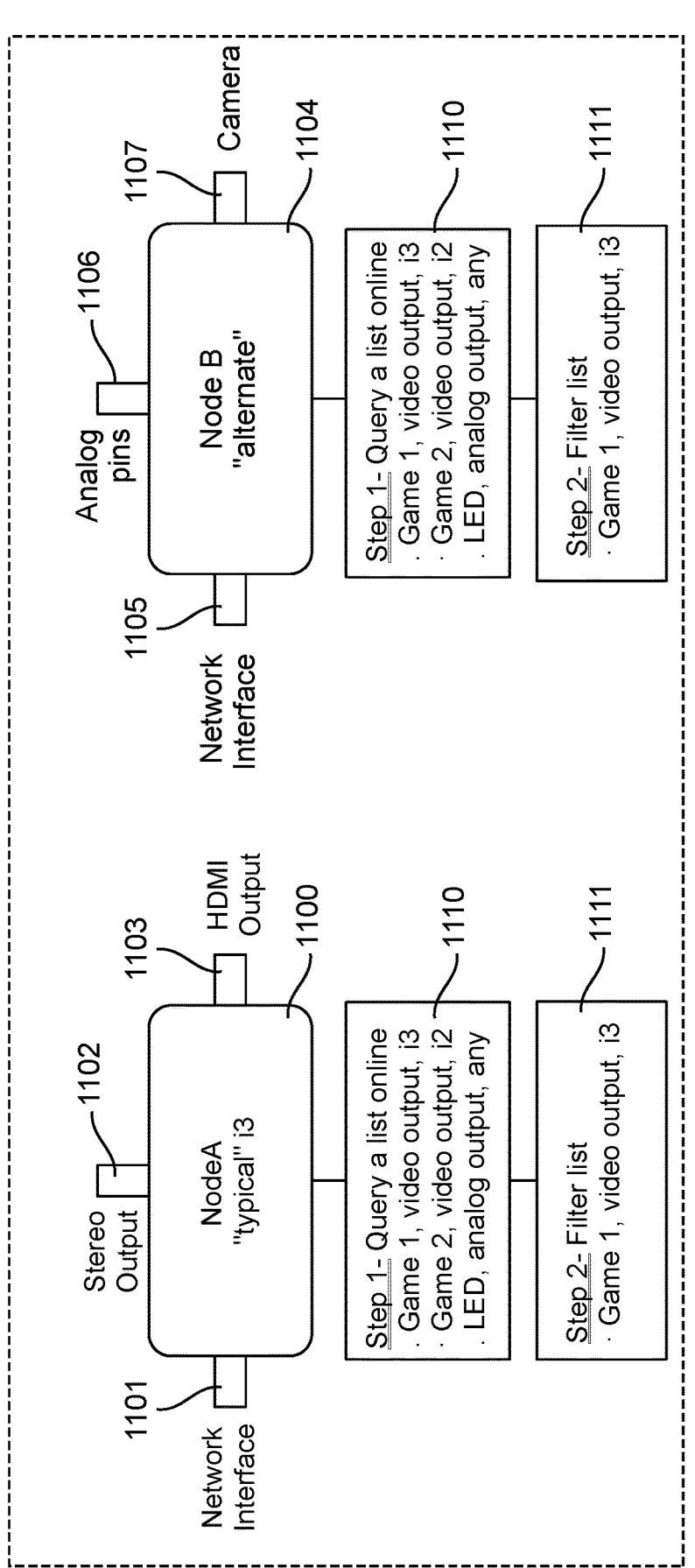

FIG. 11C depicts a possible setup process for discovering, loading, and organizing available applications. In this example, node A 1100 and node B 1104 have already discovered, organized, and exposed their IO peripheral devices, as well as their processors. In this embodiment, as depicted in step 1 1110 each of the nodes 1100, 1104 queries a list of possibly available applications from a remote server on the internet, perhaps including in the query user information and authentication. The list of initial applications could also have been stored locally, or synthesized in any other way. In this case, the list of possibly available applications includes the system requirements for running said application, including required IO peripherals and required minimum processor. Also, as depicted in step 1211, each of nodes 1100, 1104 filter the lists of possibly available applications using its own list of IO peripherals and processor information. The final filtered list 1111 of available applications for node A 1100 includes only game 1, since game 2 requires a more powerful processor and LED requires analog output pins. The final filtered list 11 of available applications for node B 1104 includes only LED, since both game 1 and game 2 require a video output. The list of available applications for each node is accessible through a node-capable messaging library.

Figure 11D:
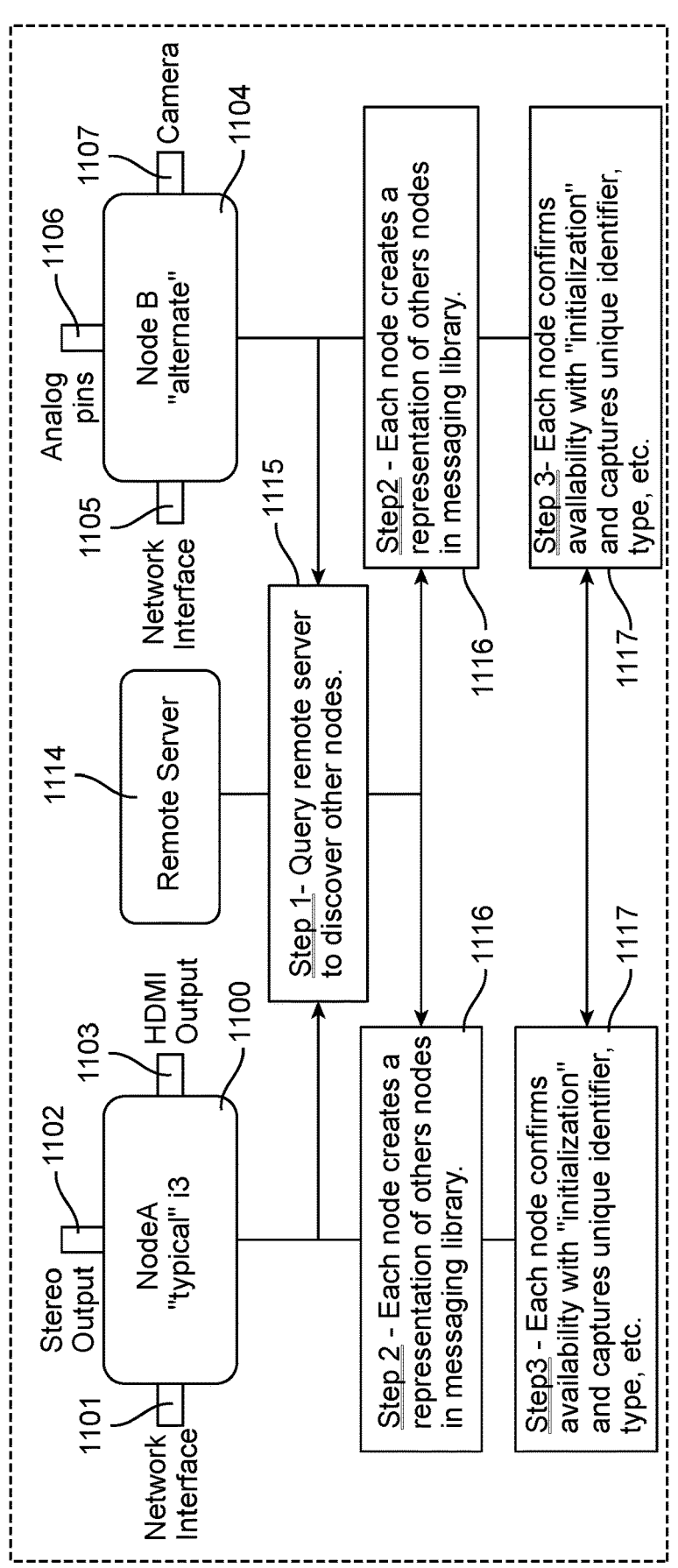

FIG. 11D depicts a possible setup (e.g. resource loading) process for discovering and tracking other nodes. Given the network interfaces 1101, 1105 made available by the operating system and a pre-loaded messaging library, nodes 1100, 1104 can discover other nodes and their types. In step 1 1115 of one embodiment, both node A 1100 and node B 1104 are configured to query a remote server for a list of other nodes to connect to (e.g. a "connection group") and their IP addresses. There are other methods for discovering a connection group (e.g. UPnP, etc.) and other protocols for connecting and passing messages (e.g. IPv6 or ARPANET). In step 2 1116, both node A 1100 and node B 1104 creates a connection representation of other nodes available to the node-capable messaging library. A list of other nodes may be further refined as shown in step 3 1117, where both node A 1100 and node B 1104 confirms their availability to other nodes with an "initialization" message. Such an initialization message may also include information such as unique identification of the node.

In an embodiment, node A 1100 and node B 1104 are capable of connecting to other nodes and passing "meaningful" messages. Here, meaningful is defined as the ability to send information which an analogous messaging library receiving said message can interpret as data able to be used by a node's software (e.g. resource loading, application, or core). One way to send meaningful messages is through the use of an Internet Protocol (IP) network socket protocol, such as Transmission Control Protocol (TCP) or User Datagram Protocol (UDP). While there are many networking protocols (e.g. Bluetooth, Radio Frequency, etc.), TCP is particularly useful in illustrating an example embodiment of a node-capable messaging library: TCP requires a connection to initialize, and this connection stays live throughout its use, unlike HTTP or UDP which are "stateless" (e.g. each message is independent of the previous ones), TCP connections are bi-directional (e.g. either end can initiate a message), and TCP protocol has low over-head relative to HTTP or other protocols built on top of TCP. Thus, each node has a connection representation implemented in some networking protocol connecting the node to other nodes, depicted in FIG. 12A. Another type of protocol other than TCP may have a connection abstraction representation with these similar properties (e.g. cookies do part of this in HTTP).

Figures 12A, 12B:
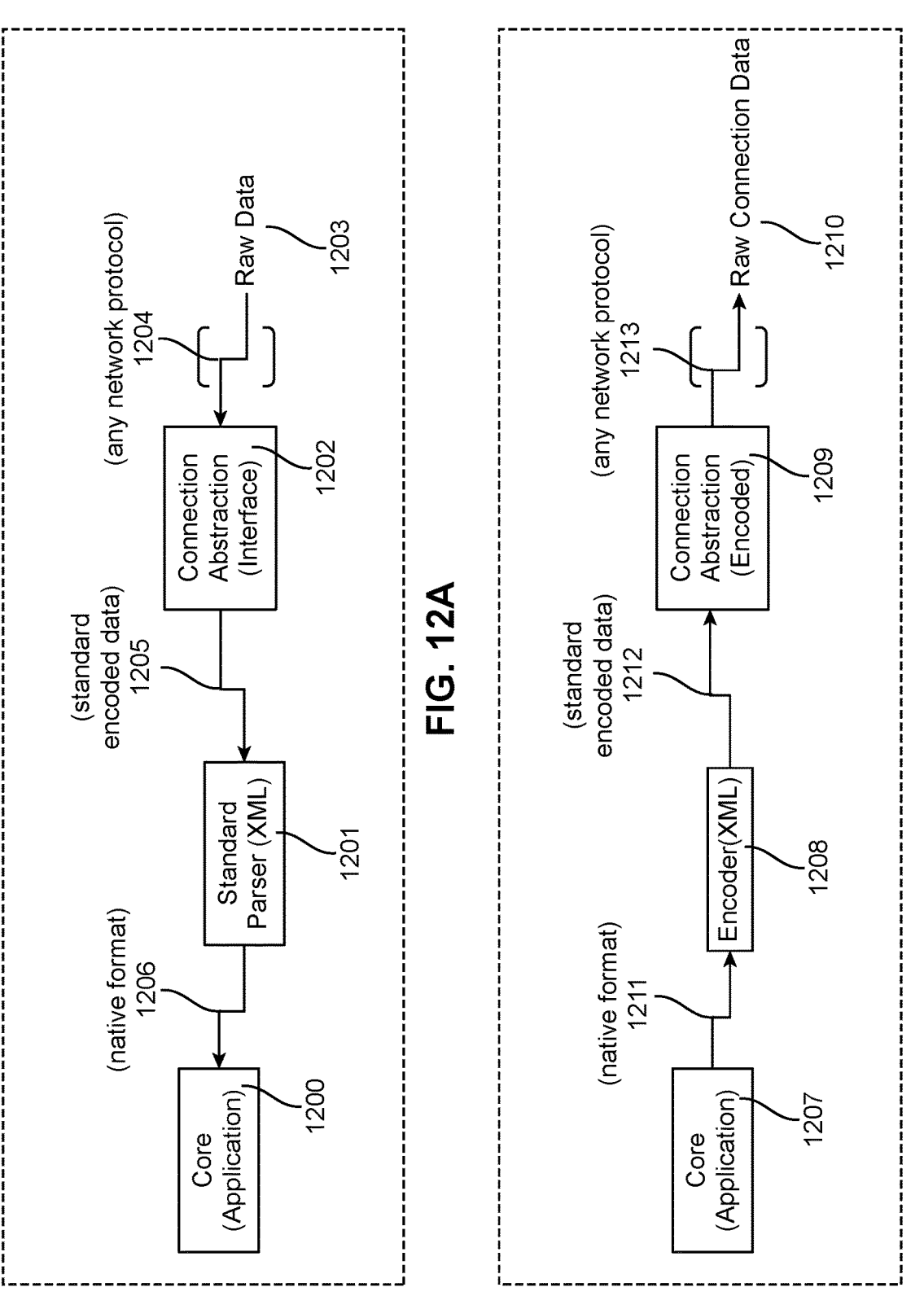
FIGS. 12A-12C illustrates examples of the key embodiment within the invention as associated with connection representation for messaging library.
Figure 12C:
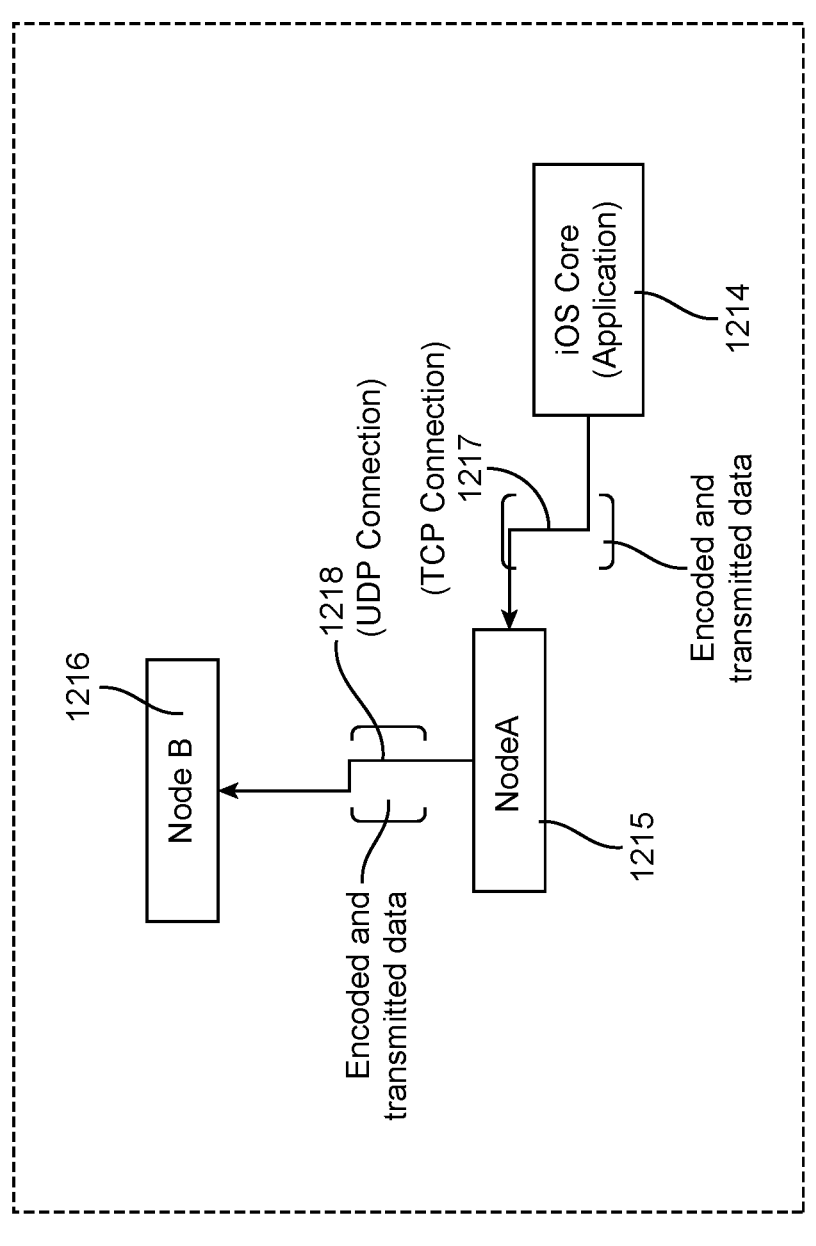

FIGS. 12A-12C further represents an encoding/decoding library. In this embodiment, a node's core or application software 1200, 1207 is capable of exchanging meaningful information (e.g. send/receive data, remote function calls, etc.) regardless of the language or native format 1206, 1211 of the node. In this embodiment, a node uses two tools to accomplish this goal which are 1) a standard parser 1201 or standard encoder 1208, and 2) a connection abstraction 1202, 1209.

FIG. 12A represents a node receiving data. First, raw data 1203 is received over a network over some protocol. This protocol could be any protocol, such as TCP, UDP, HTTP, morse code, ARPANET, etc. A connection abstraction 1202 specific to the network protocol interprets the raw data and transforms it into standard encoded data 1205. Standard encoded data 1205 could be XML, string standards. Thus, a connection abstraction provides a consistent interface for its appropriate network protocol. A TCP socket abstraction is a standard connection abstraction provided by an operating system such as Linux. It provides a standard interface to connect, send or receive messages initiated by either end of the connection, and persistence of the abstraction across messages. Thus, a connection abstraction can be created around an otherwise connectionless protocol. For example, HTTP, which is connectionless since only clients can initiate a message and there is no persistence between messages, can be encapsulated in an abstraction in which both ends act as servers (e.g. either side may initiate a message) and tokens and cookies are used to establish persistence between messages. Standard encoded data 1205 can be parsed by a standard parser 1201 and converted into a node's core or application 1200 native formats 1206, which can be interpreted by a node's core or application 1200. The node's core or application 1200 can be written in any e language supported by a given standard parser 1201.

Similarly, FIG. 12B demonstrates a method for sending a message in any formatted core application across a network. First, a node's core or application 1207 written in any language or format sends natively formatted data 1211 to an encoder 1208. Again, this encoder 1208 must be specific to the native format 1211. The encoder 1208 encodes natively formatted data into a standard format such as XML, and this standard encoded data 1212 is sent to a connection abstraction 1209. This connection abstraction interprets standard encoded data 1212 and converts it to raw connection data 1210 encoded in the network connection protocol the specific connection abstraction 1209 is capable of handling.

With FIGS. 12A and 12B, it is demonstrated that any node written in any native language may communicate to any other node with meaningful messages at any given time. FIG. 12C demonstrates and clarifies the established functionality in a concrete example case where an iOS application sends a message to an indirectly connected node's application written in JAVA. First, the iOS application 1207 sends its natively formatted data 1211 to an XML encoder 1208. This specific XML encoder is written to accept iOS formatted data inputs and output XML standard encoded data 1212. The standard encoded data 1212 enters a TCP connection abstraction and sends the data to the other end of the connection abstraction via the TCP network 1217.

Node A receives the data using steps described in FIG. 12C. The node's core, upon reading the message, could determine that node B 1216 is the desired recipient. Then, using the process described in FIG. 12B, it could send the data to node B 1216. Note that the core of node A 1215 could be written in any language independent of the language of the iOS application 1214 and node B 1216. Further note that node A 1215 requires a connection abstraction 1209 capable sending data over a UDP network in order to communicate with node B 1216. Node B 1216 receives the UDP encoded message 1204 in its connection abstraction 1202, and using the method described in FIG. 12A, passes the message into its application 1200.

Figures 13A, 13B:
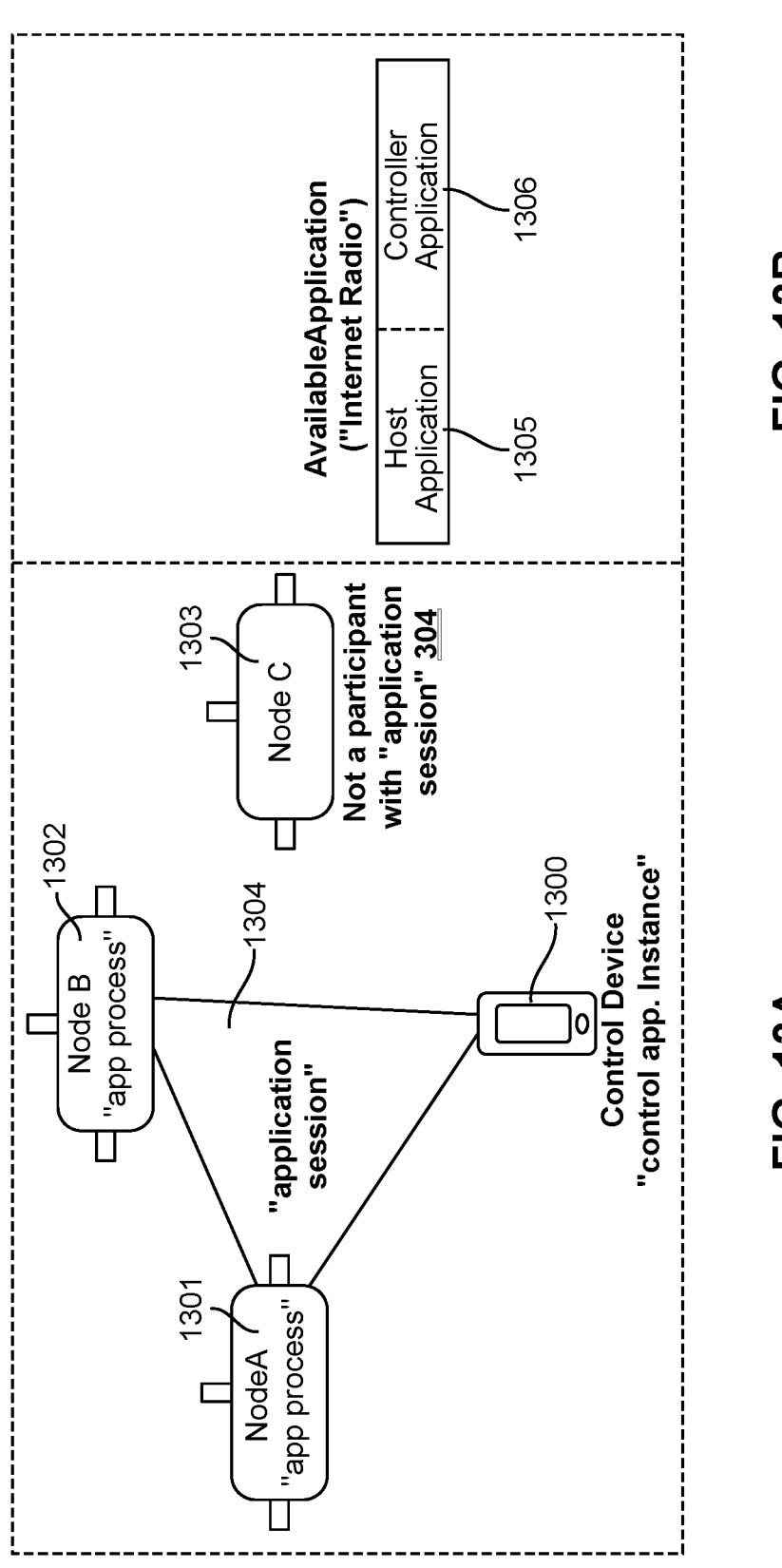
FIG. 13A illustrates and example of the key embodiment within the invention as associated with the relationship between application sessions and application processes.
FIG. 13B illustrates an example of the key embodiment within the invention as associated with the relationship between control applications and host applications.

The definition and usages of available applications, application sessions, application processes, host applications, and control applications are further explained in FIG. 13A. An available application (e.g. internet radio, etc.) does not refer to a specific existing instance of internet radio, but rather the code that allows it to be instantiated. This is in contrast to an application process, which refers to a running instance of a process which is part of an application, rather than the whole. A process (e.g. application process) can run only on a single node (e.g. by the definition of process in terms of standard operating systems), but a group of processes can act together as a single instance of an available application, known as an application session 1304. Thus, an application session 1304 is a collection of one or more application processes (e.g. node A "application process" 1301 and node B "application process" 1302, and control device 1300), whose code was defined in an available application. Further note that the application session 1304 control application instance is shown on control device 1300. Also, note that in this example if FIG. 13A, the node C 1303 is not sharing in the application processes of node A 1301 and node B 1302, thus is not a "participant" in the active session application 1304.

FIG. 13B shows how a single available application 1305 could have various different executables designed to be run on different nodes. In this example, the available application (e.g. internet radio) is comprised of both a host application 1305 and a controller application 1306. Upon instantiation, a host application 1305 process of the internet radio may accept messages (e.g. using a node-capable messaging library) from a controller application 1306 process, as these application processes would have been designed to communicate meaningfully to act as a single unit, or as a uniquely identifiable application session 1304 (as shown in FIG. 13A).

In a preferred embodiment, information regarding resources (application sessions, available applications, IO peripherals, and general message exchange) in a network of nodes can be communicated and aggregated. First, we must establish that a resource on any node can be reached by any other node. This is true for any connected graph of nodes, where edges are network connections between nodes. Thus, when a node comes on line by connecting to any node already in a connection group, it becomes part of that connection group and can receive messages from any other node. In the extreme case where message routing is simplified, each node can make a direct connection to every other node, forming a fully connected graph. Thus, any node may now exchange messages with any other node directly. In a graph that is not fully connected, any from a number of existing algorithms for graph search (including Dijkstra's Algorithm) can be used to locate another node and pass messages. A number of other improvements in message passing efficiency can be used, but the fact that each node can exchange messages with any other node is now established.

The ability of any node to exchange messages with any other node allows for an embodiment where a control device can aggregate all resource information in a single interface.

Figure 14A:
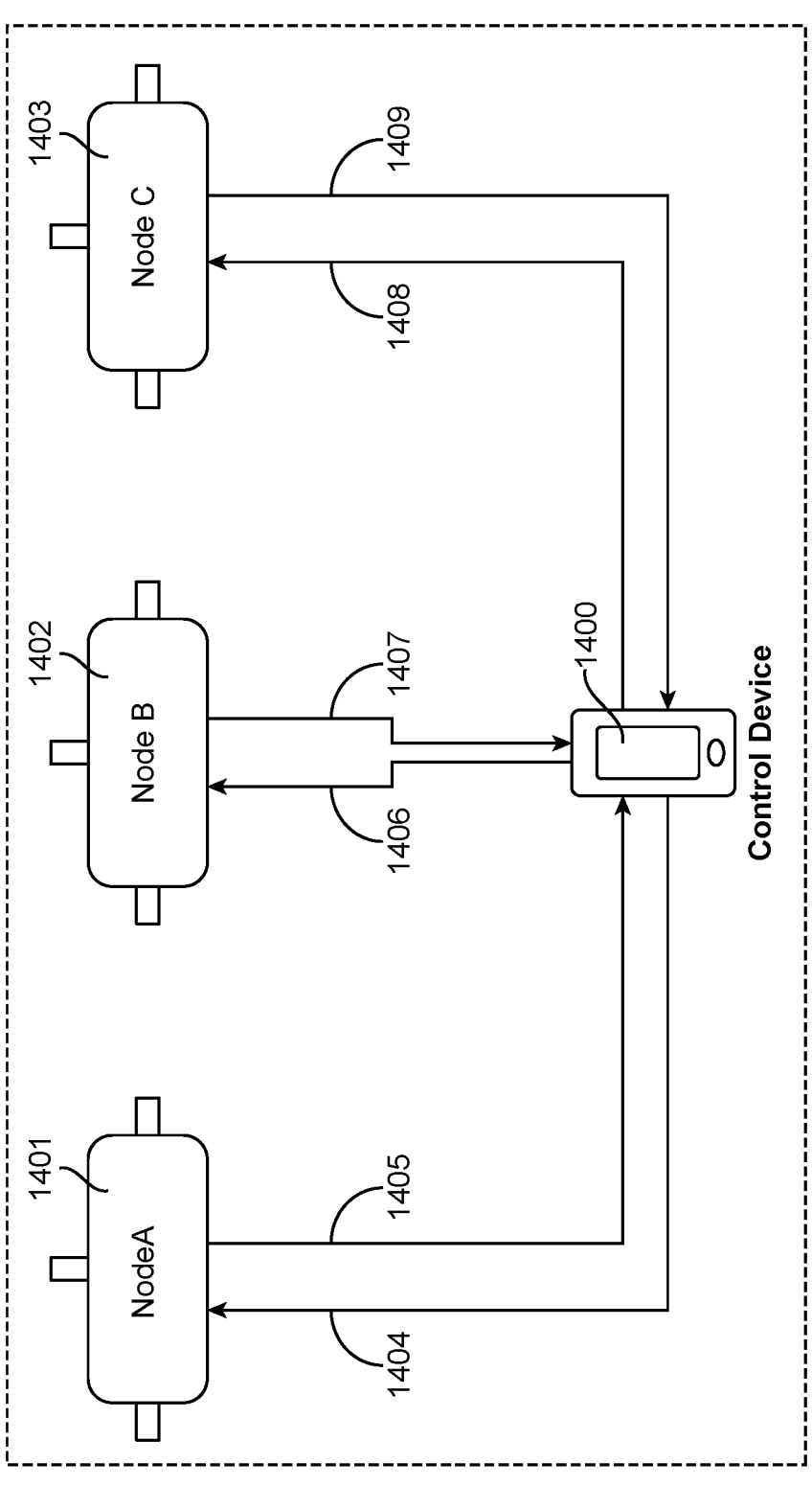
FIG. 14A-14C illustrates an example of the key embodiment within the invention as associated with resource aggregation in a fully connected graph for an aggregation interface.

FIG. 14A demonstrates how a single control device 1400 can individually send three messages 1404, 1406, 1408 to nodes A 1401, B 1402, C 1402 and aggregate all resource information. In this embodiment, each node is connected to every other node (1401, 1402, and 1403), and message scan be sent via single direct connection as shown in 1405, 1407, and 1409). In other embodiments different numbers of messages can be sent, and message routing can follow any connection path, as long as the control device 1400 candidate is a member of the graph.

Figure 14B:
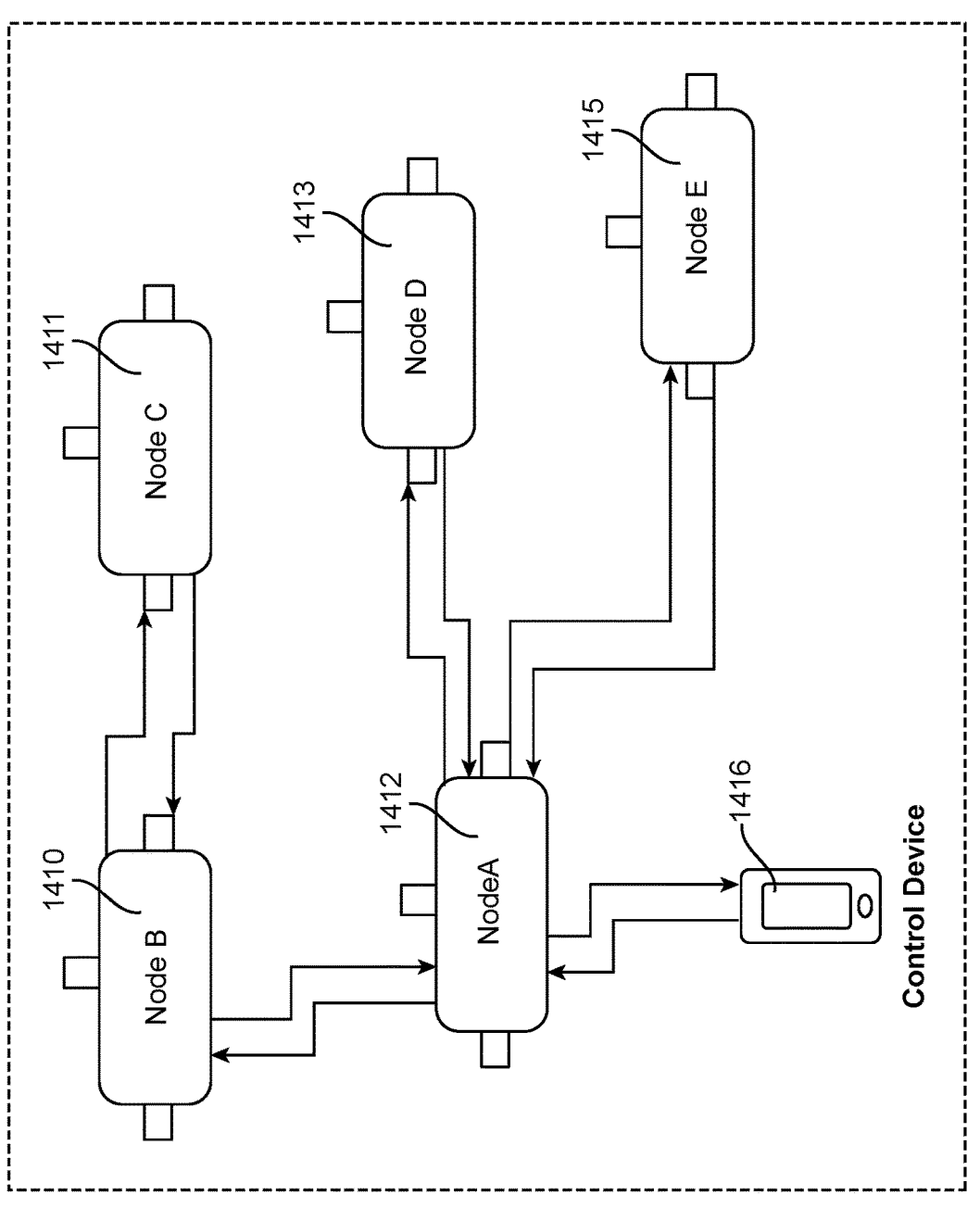

As depicted in FIG. 14B, is another preferred embodiment for a single host node (e.g. node A 1412) acting as an interface for a control device 1416. In this embodiment, the interface host 1412 could have previously aggregated all resource data, or could aggregate it upon receiving an initialization message from a control device 1416, or at any other time. Any of the other nodes (e.g. node B 1410, node C 1411, node D 1413, and node E 1415) reports their IO peripherals, available applications, and application processes as well as the unique identifier of the application session to which it belongs. Note that node D 1413 is connected only to node A 1412, and uses node A 1412 to relay its messages to the rest of the system.

Figure 14C:
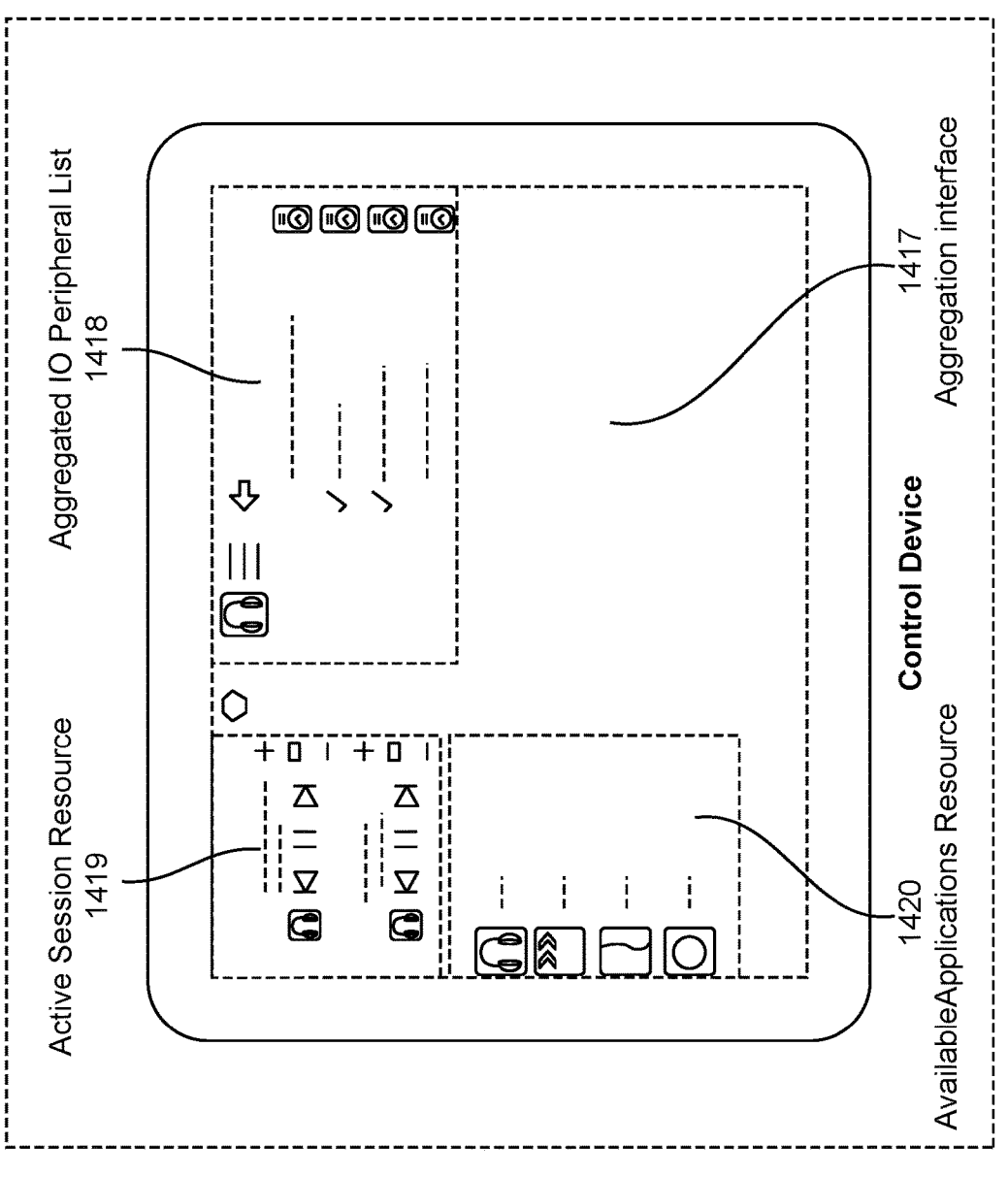

FIG. 14C depicts an example of an embodiment with resource aggregation in a control device. In this embodiment, all resources can be aggregated using a method such as those described in FIGS. 14A and 14B. The aggregation interface 1417 displays aggregated information from all nodes where information is displayed with no indication to the user which node provided any given information. The available applications resource 1420 displays a list of available applications aggregated from all nodes. Upon selecting an available application to instantiate, an aggregated list of available, allowable IO peripherals 1418 can be displayed. Upon selecting a peripheral, a session is activated, and then appears with other the active sessions viewable within the active session resource 1419 list. Note that this is just one possible way to create a user interface in such a system.

Figure 15A:
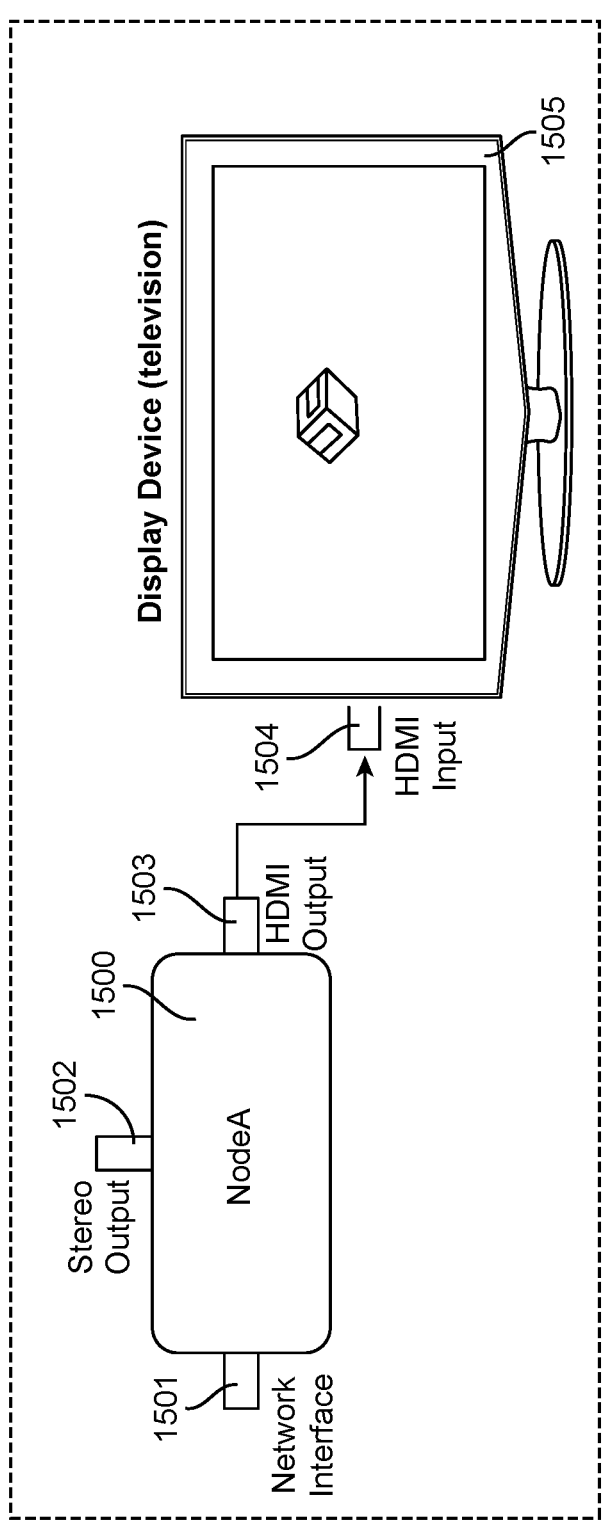
FIG. 15A illustrates example device embodiments within the invention, such as a smart TELEVISION dongle.

Note that any of these nodes (e.g. nodes 1410, 1411, 1412, 1413, and/or 1415) can be embodied in a variety of mechanical and electronic devices. An embodiment of a node A 1500 is a TELEVISION dongle, which has a single video or HDMI output peripheral 1503 connected to an HDMI input peripheral 1504 on a display device (television) 1505, as depicted in FIG. 15A. Furthermore, a node could include a node packaged with a television, making a smart-television with a single HMDI or video output peripheral 1503. In this embodiment, available applications could include, but are certainly not limited to, internet television, video games, picture viewing, word processing, web browsing, etc. Appropriate, optimized control applications and host applications can be instantiated separately. Multiple control devices or nodes could participate in the same session (e.g. a two player game on two nodes).

Figure 15B:
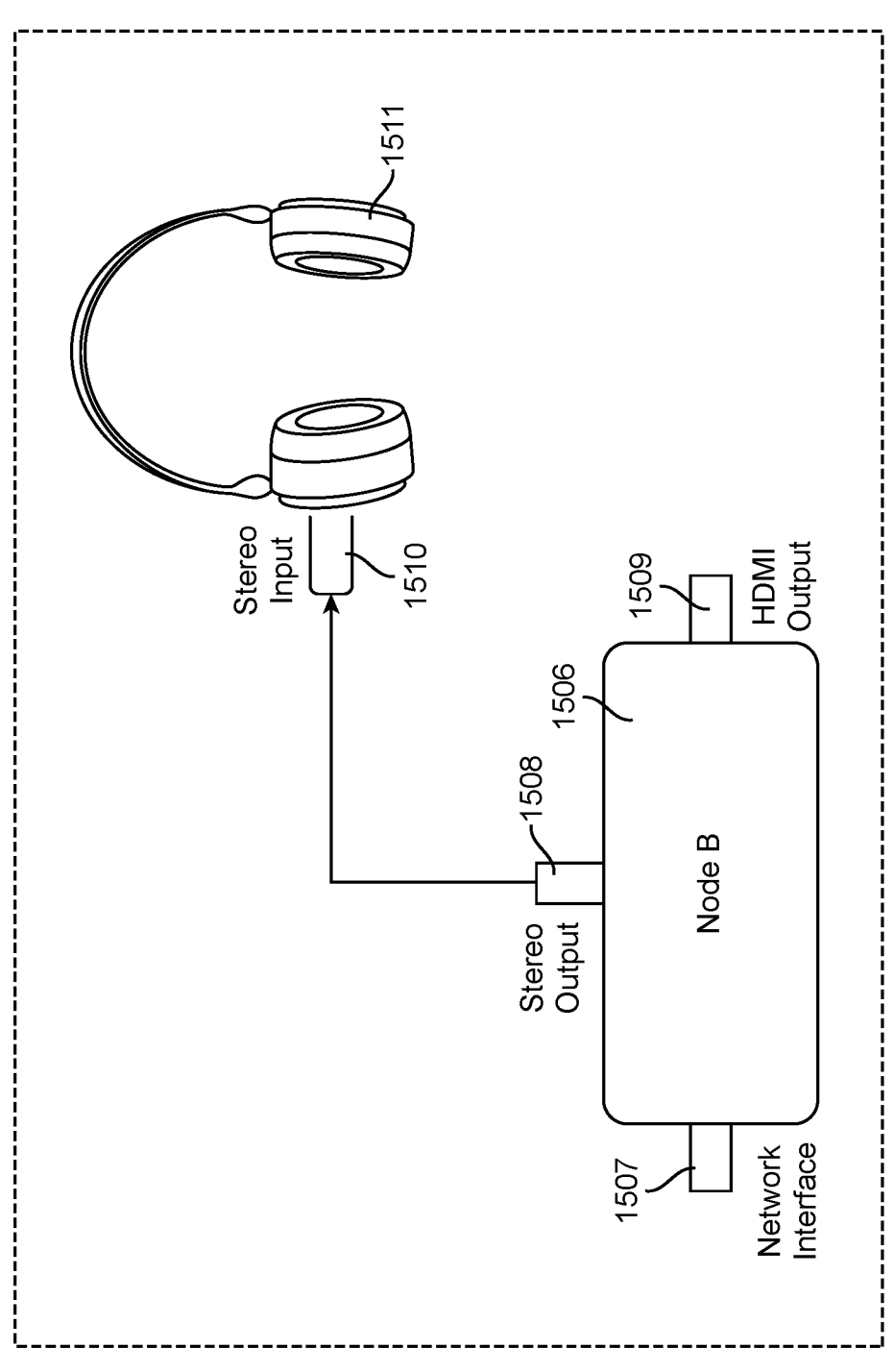
FIG. 15B illustrates example device embodiments within the invention, such as headphones.

Furthermore, any wearable with IO (e.g. an electrical blanket has a thermal output as a peripheral, glasses could have a video and audio out, etc) can be a node. FIG. 15B depicts a node B 1506 in a pair of headphones 1511 with a stereo output peripheral 508 connected to an input 1510.

Figure 15C:
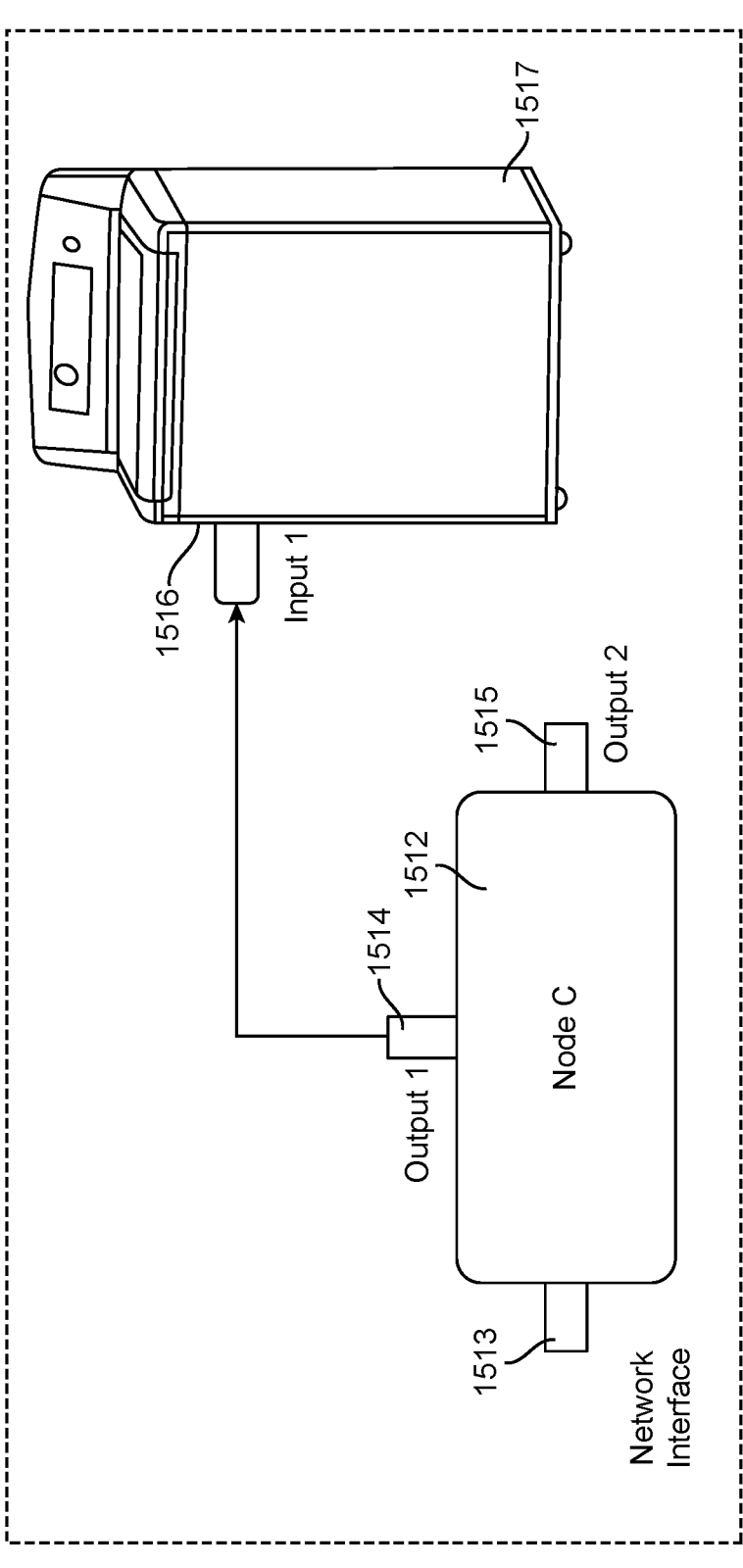
FIG. 15C illustrates example device embodiments within the invention, such as a laundry machine.

Home appliances constitute another possible category of nodes. For example, a thermostat may have input peripherals constituting various temperature sensors in a building, and output peripheral constituting a controller for temperature. The thermostat may then be set up to host a "thermostat" available application. Alternatively, a laundry machine could be configured with output peripheral controlling the laundry machine, input peripheral receiving digital information from the laundry machine. A laundry machine application, shown in FIG. 15C, could include a host application on the laundry machine node C 1512 capable of manipulating physical laundry machine to perform tasks (e.g. "quick wash", "change temperature", etc.), and a control application could present a user interface for all such functions. The laundry machine node C 1512 and the availability of the laundry application could be visible to the user via a singular interface or the like.

A large variety of devices can be configured to participate on a network and share resources. Applications of such a system and method are diverse and may comprise, but are not limited to, some of the following examples such as 1) entertainment based themes such as gaming consoles, televisions, amplifiers, projectors, etc. 2) wearable items such as glasses, clothing, headphones, watches, shoes (e.g. how far have I walked, timing lights to footstep), etc. 3) appliance items such as laundry machine, dryer, dish washer, coffee maker, toaster, oven, thermostat, refrigerator, etc, and 4) other application types such as automobile, airplane seats, any entertainment device in hotel rooms, jukebox at a bar, etc.

Further embodiments of the present disclosure include applications of the aforementioned system and method for configuring, networking, and controlling uniquely identifiable network capable devices and associated nodes types, all of which are described in detail in the summary above.

Embodiments of democratically (e.g. non-discriminatively) managing the separation and distribution of digital content and associated controls in a network may include, but are not limited to, uses of processing nodes that are described herein. These embodiments benefit from the descriptions and figures relating to non-discriminative control device operation in co-pending application U.S. Ser. No. 14/147,397 filed Jan. 4, 2014. Processing node embodiments include operations including receiving a request from any one of a plurality of control devices that participate in an active control session, responding democratically via a processing node configured to perform host server functions to any one of the control device requests, and delivering content and/or control elements via a processing node to a real-world input/output device that is connected to the processing node. Delivering the content may rely upon a control session application function being executed by the processing node. The request from any one of a plurality of control devices may be in the form of data that is representative of command gestures captured in a native user interface of the control device. Such a request may be forwarded to the function configured node that interprets the command gesture data and adjusts the real-world input/output device operation (e.g. change in displayed content) based thereon. The request from any one or more of the plurality of control devices may include a session state change request (e.g. zone change). A processing node receiving such a request may determine an appropriate action (e.g. transferring output to a different display device) and may query other nodes to determine which node best meets the requirements of the request. The result may be a transfer of the specific session application function from the node receiving the request to execute on the node that best meets the requirements of the request. These democratic (e.g. non-discriminative) themed examples of management of separation and distribution of digital content are also user experience optimized for various application types and associated controls, digital content, status information, and the like. Each node may be adapted to participate in user experience optimization during an active content distribution and control session that includes a host node, control devices, real-world connectable processing nodes, and input/output by performing its specific application function in a cooperative manner with other processing nodes across a commonly shared network.

Embodiments of autocratically (e.g. discriminatively) managing the separation and distribution of digital content and associated controls in a network of real-world connectable processing nodes includes handling requests from control devices by the nodes in a control device-specific way. This may enable capabilities such, as users being limited to manipulating only a portion of content being presented through a real-world I/O device via one of the real-world connectable processing nodes (to which the I/O device connects), Discriminative methods and systems for content distribution and control are further described in co-pending application U.S. Ser. No. 14/149,541 filed Jan. 7, 2014.

An embodiment of heads-up content item selection of content presented on one or more output devices may include a plurality of uniquely identifiable control devices participating in a control session to control a portion of the presented content that is uniquely associated with the control device. A request to control such an associated content item may be received by a processing node (e.g. a host application configured node, and the like) that may connect directly to a real-world output device on which the content is presented. The processing node may be configured with a functional portion of a session application so that the processing node may execute the function in response to receiving the request. In an example, the request may be to manipulate a content interaction indicator that is presented on the output device and the function may facilitate updating the output display.

In another example, a processing node may be used, such as to provide a host server capability in a heads-down content item selection embodiment for providing a list of content items to a control device to be presented in its heads-down display. Upon the host server operative processing node (aka host node) receiving a user selection of a content item, the host node may communicate with another node that interfaces with a real-world display to cause the selected content item to be displayed. A processing node in this example may also provide a content list filtering function to generate a control device-specific list of content items. Such content list filtering may be based on a participant class of the control device, so that only content items that are compatible with the participant class are selectable on the control device.

Another embodiment of a processing node as described herein may include discriminative control for a plurality of players within a session for a multi-player game application. A processing node that connects to a real-world output display device may facilitate presenting a plurality of content items that are separately controlled by alternate unique control devices participating in the session. Each unique control device may communicate directly over a local network to the output-connected processing node, which may manipulate each separately controllable content item based on communication from the corresponding control device. The processing node may take on a host server role, a complete application role, a set of functions of the application, and the like.

Another example embodiment of the present disclosure includes a non-transitory computer readable medium having computer readable program codes embodied therein for managing and distributing digital content media and associated controls given the application type in a network system, the computer readable program codes including instructions that, when executed by a processor, cause the processor to receive a request from any one of a plurality of control devices to deliver at least one item of digital content either stored on or provided via Internet access of a host server through the network system from the host server. Further, the code causes the processor to uniquely identify and decide to discriminate between any of the plurality of control devices and similarly to any of the plurality of output devices when a given specific application types requires the host server to do so. Further, the code causes the processor to serve the at least one item of digital content and/or the session state information via the selected outputs in response to receiving the command from any one of the control devices. Similarly, given the specific application type the code causes the processor to either uniquely identify and include control and output device information in the session state information. Further note that the code may reside both on host server operating system and associated processor and additionally on the control device resident operating system and resident operating system and associated processor.

In addition, the code causes the processor to provide any one of the control devices with session state information associated with the digital content and session state information for a plurality of outputs of the host server connected to the network system in response to receiving the request. The code also causes the processor to receive a command from the any one of the control devices to serve the at least one item of digital content or the session state information associated with the digital content or the session state information for the plurality of outputs of the host server via a selected output, the selected output being selected by a user of any one of the plurality of control devices based on at least the session state information associated with the plurality of outputs connected to the network system. Further, the code causes the processor to serve the at least one item of digital content or the session state information via the selected outputs in response to receiving the command from any one of the control devices.

Further example embodiments of the present disclosure may be configured using a computer program product; for example, controls may be programmed in software for implementing example embodiments of the present disclosure. Further example embodiments of the present disclosure may include a non-transitory computer readable medium containing instruction that may be executed by a processor, and, when executed, because the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the disclosure.

Yet another embodiment of discriminative control device-specific content distribution and control session operation discriminative control for a plurality of participants for a party themed (e.g. DJ) application session may be embodied in a network of processing nodes as described herein. A processing node in the network may be configured with a function that facilitates handling of a plurality of party participants that share a common participant class (e.g. party guest). Such a function may effectively cause the plurality of party guest participants to be treated as a single guest so that requests for content items, content manipulation, and the like may be aggregated and coordinated. A resulting single guest view of this plurality of control devices may be communicated to a display output processing node that accepts this input and determines appropriate display related actions to take.

Procedure or method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an aSIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques and approaches can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques and approaches can be implemented in a distributed computing system that includes a back-end component. The back-end component can, for example, be a data server, a middleware component, and/or an application server. The above described techniques and approaches can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and host servers. A client and a host server are generally remote from each other and typically interact through a communication network. The relationship of client and host server arises by virtue of computer programs running on the respective computers and having a client-host server relationship to each other.

Packet-based networks can include, for example, the Internet, a carrier Internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer. RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types: processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated in their entirety by reference.

The invention claimed is:

1. A system for distributing video and audio over a network during a content distribution control session, comprising:

an audio/video control application executing on a mobile device for preparing distribution control data that corresponds to user actions of a user in a native user interface, the native user interface being native to the mobile device; and at least one content interaction indicator adapted for presentation on at least one audio/video output device that visually depicts user actions in a content interaction indicator portion of the native user interface of the mobile device.

2. The system of claim 1, wherein the at least one content interaction indicator facilitates a user of the mobile device interacting via the native user interface with content presented on the at least one audio/video output device.

3. The system of claim 1, wherein the audio/video control application is one of a plurality of instances of the audio/video control application, wherein each instance is executable on individual mobile devices.

4. The system of claim 1, wherein a host server is configured to retrieve audio and/or video based on the distribution control data.

5. The system of claim 1, wherein the audio/video control application determines which user actions in the native user interface constitute control actions and which user actions in the native user interface constitute content manipulation actions.

6. The system of claim 5, wherein determining if a user action in the native user interface is for control or content manipulation is based on a context of the content distribution control session and retrieved content.

7. The system of claim 1, wherein the audio/video control application receives data representing control elements for presentation of graphical control elements to the user.

8. The system of claim 7, wherein distribution control data results from user actions that manipulate the control elements.

9. The system of claim 1, wherein the audio/video control application is one of a plurality of instances executing on a plurality of mobile devices.

10. The system of claim 9, wherein the at least one content interaction indicator is capable of being manipulated by any of the plurality of mobile devices.

11. The system of claim 9, wherein a status of the content distribution control session is pushed from a host server to each of the plurality of mobile devices in response to any of the plurality of mobile devices impacting the status.

12. The system of claim 1, wherein the at least one content interaction indicator comprises a web browser-like pointer on an audio/video output device.

13. The system of claim 1, wherein the at least one content interaction indicator comprises a change in visual representation of a content item based on corresponding user actions in the native user interface.

14. The system of claim 1, wherein the at least one content interaction indicator comprises metadata associated with a content item presented on an audio/video output device.

15. A method, comprising:

configuring at least one mobile distribution control device and at least one audio/video output device in a content distribution control session;

receiving control data representing user interaction with distribution control elements of a user interface native to the at least one mobile distribution control device;

retrieving content items from one or more content sources to satisfy a content query aspect of the control data;

distributing at least one of the content items to the at least one audio/video output device;

receiving content selection input data from the at least one mobile distribution control device that corresponds to user interaction with a content interaction indicator zone of the user interface; and selecting at least one of the content items based on matching a location of a content item on the at least one audio/video output device to content interaction indicator zone location information in the content selection input data.

16. The method of claim 15, wherein distributing the at least one of the content items is based on the control data.

17. The method of claim 15, wherein the at least one of the content items is selectable via the user interface native to the at least one mobile distribution control device.

18. The method of claim 15, wherein content items selected in a control session are selectable only by the at least one mobile distribution control device configured in the control session.

19. The method of claim 15, wherein the content items distributed to the at least one audio/video output device are selectable through the user interface native to the at least one mobile distribution control device via manipulation of a content interaction indicator.

20. The method of claim 19, wherein a representation of the content interaction indicator is presented on at least one audio/video output device.

21. The method of claim 19, wherein the content interaction indicator comprises a web browser-like pointer presented on the at least one audio/video output device.

22. The method of claim 19, wherein the content interaction indicator comprises a change in visual representation of a content item based on a user content manipulation action.

23. The method of claim 19, wherein the content interaction indicator is capable of being manipulated by any of a plurality of mobile devices.

24. The method of claim 19, wherein the content interaction indicator comprises metadata associated with a content item presented on the at least one audio/video output device.

25. The method of claim 15, wherein distributing comprises transmitting the at least one of the content items via an IP-based network to the at least one audio/video output device.

26. A system, comprising:

a content control and a distribution session controller configured to service a plurality of mobile distribution control devices and at least one audio/video output device;

a content interaction indicator associated with the distribution session controller, wherein the content interaction indicator is responsive to user interaction with a content interaction indicator zone of a native user interface native to at least one of the plurality of mobile distribution control devices;

session operational data that corresponds to user interaction with distribution control elements of the native user interface;

a content sourcing facility of a host server for retrieving content items from one or more content sources to satisfy a content query aspect of the session operational data; and a processor associated with the host server, the processor controlling distribution of at least one of the content items to the at least one audio/video output device in response to an output device selection criteria of the session operational data.

27. The system of claim 26, wherein the session operational data received from any of the plurality of mobile distribution control devices is used by the content sourcing facility and the processor without requiring unique identification of any of the plurality of mobile distribution control devices from which the session operational data originates.

28. The system of claim 26, wherein the plurality of mobile distribution control devices is a subset of a plurality of distribution control-enabled mobile devices that are logically connected to a client manager of the host server.

29. The system of claim 28, wherein the host server broadcasts status of a session to the plurality of mobile distribution control devices in response to any of the plurality of mobile distribution control devices impacting the status of the session.

* * * * *